(12) United States Patent
Yamamoto

(10) Patent No.: US 9,383,566 B2
(45) Date of Patent: Jul. 5, 2016

(54) ZOOM IMAGE-FORMING OPTICAL SYSTEM AND MICROSCOPE EQUIPPED THEREWITH

(75) Inventor: Hirofumi Yamamoto, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 1009 days.

(21) Appl. No.: 13/480,784

(22) Filed: May 25, 2012

(65) Prior Publication Data
US 2012/0307036 A1 Dec. 6, 2012

(30) Foreign Application Priority Data
May 31, 2011 (JP) .................................. 2011-122211

(51) Int. Cl.
G02B 21/02 (2006.01)
G02B 21/08 (2006.01)

(52) U.S. Cl.
CPC ............ *G02B 21/025* (2013.01); *G02B 21/082* (2013.01)

(58) Field of Classification Search
CPC ............................ G02B 21/025; G02B 21/082
USPC .......................................................... 348/79
See application file for complete search history.

(56) References Cited

U.S. PATENT DOCUMENTS

| | | | | |
|---|---|---|---|---|
| 5,523,885 A * | 6/1996 | Aoki | .................... | G02B 3/0087 359/434 |
| 5,825,546 A * | 10/1998 | Matsui | .................. | G02B 27/646 359/554 |
| 5,959,772 A | 9/1999 | Yonezawa | | |
| 5,969,878 A * | 10/1999 | Koizumi | .............. | G02B 15/177 359/681 |
| 7,663,808 B2 * | 2/2010 | Ohashi | ................. | G02B 15/173 359/687 |
| 2003/0165021 A1 * | 9/2003 | Kawasaki | ............ | G02B 21/025 359/690 |
| 2004/0190155 A1 * | 9/2004 | Nagahara | ............. | G02B 15/177 359/680 |
| 2004/0246592 A1 | 12/2004 | Suzuki | | |
| 2005/0259330 A1 * | 11/2005 | Neil | ....................... | G02B 13/14 359/676 |
| 2006/0114554 A1 | 6/2006 | Suzuki et al. | | |
| 2009/0027769 A1 * | 1/2009 | Saito | ....................... | G02B 9/60 359/385 |
| 2009/0153956 A1 * | 6/2009 | Kusaka | .................. | G02B 21/08 359/385 |
| 2010/0014154 A1 | 1/2010 | Matsui | | |
| 2012/0050892 A1 * | 3/2012 | Lai | ..................... | G02B 13/0045 359/786 |

FOREIGN PATENT DOCUMENTS

| | | |
|---|---|---|
| JP | 9-274137 A | 10/1997 |
| JP | 2004-361778 A | 12/2004 |
| JP | 2006-154230 A | 6/2006 |

* cited by examiner

*Primary Examiner* — Anner Holder
(74) *Attorney, Agent, or Firm* — Holtz, Holtz & Volek PC

(57) ABSTRACT

A zoom image-forming optical system used in combination with an infinity-correction objective lens, the zoom image-forming optical system including: a tube lens for condensing a luminous flux from the objective lens to form an intermediate image; and a relay lens with a zoom function for projecting the intermediate image onto an image plane. The relay lens includes a first lens group with positive power, a second lens group that belongs to a movable group with positive power, a third lens group that belongs to a movable group with positive or negative power, and a fourth lens group with negative power, in this order from the intermediate image side. The zoom image-forming optical system changes its magnifying power by moving the second lens group and the third lens group in an optical axis direction.

14 Claims, 33 Drawing Sheets

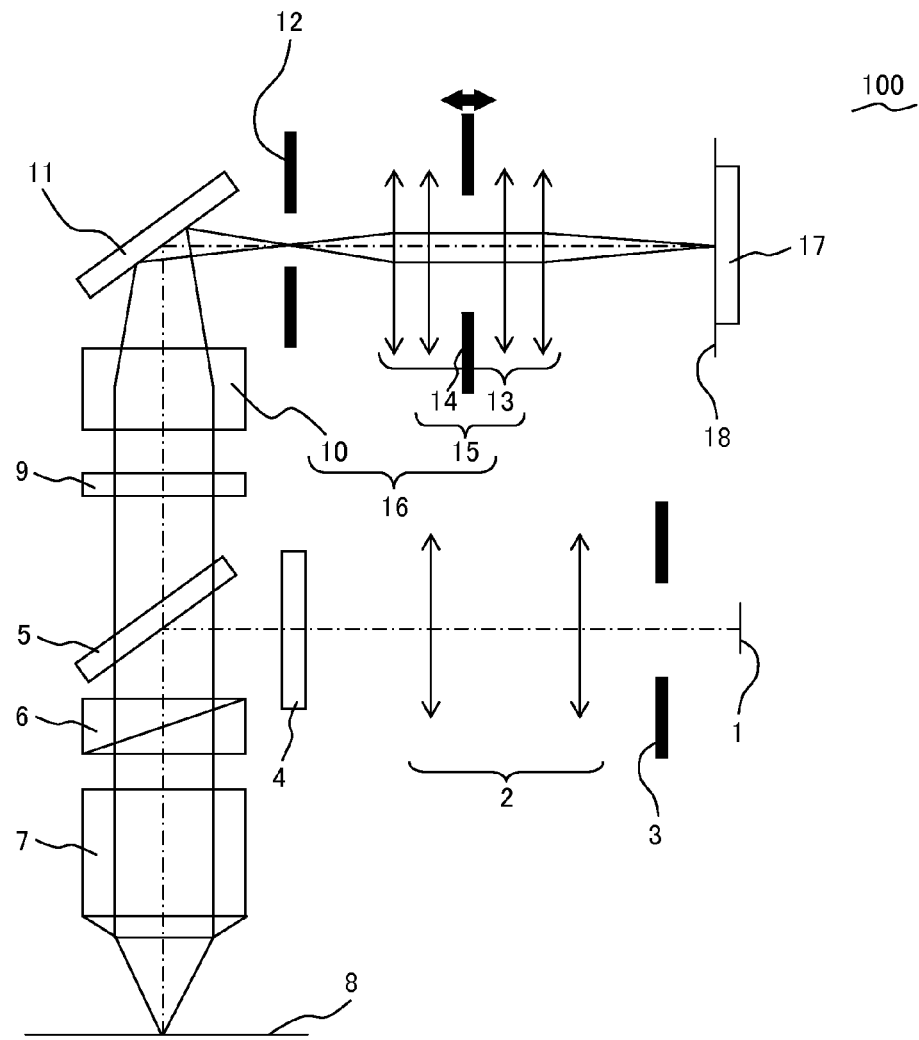
F I G. 1

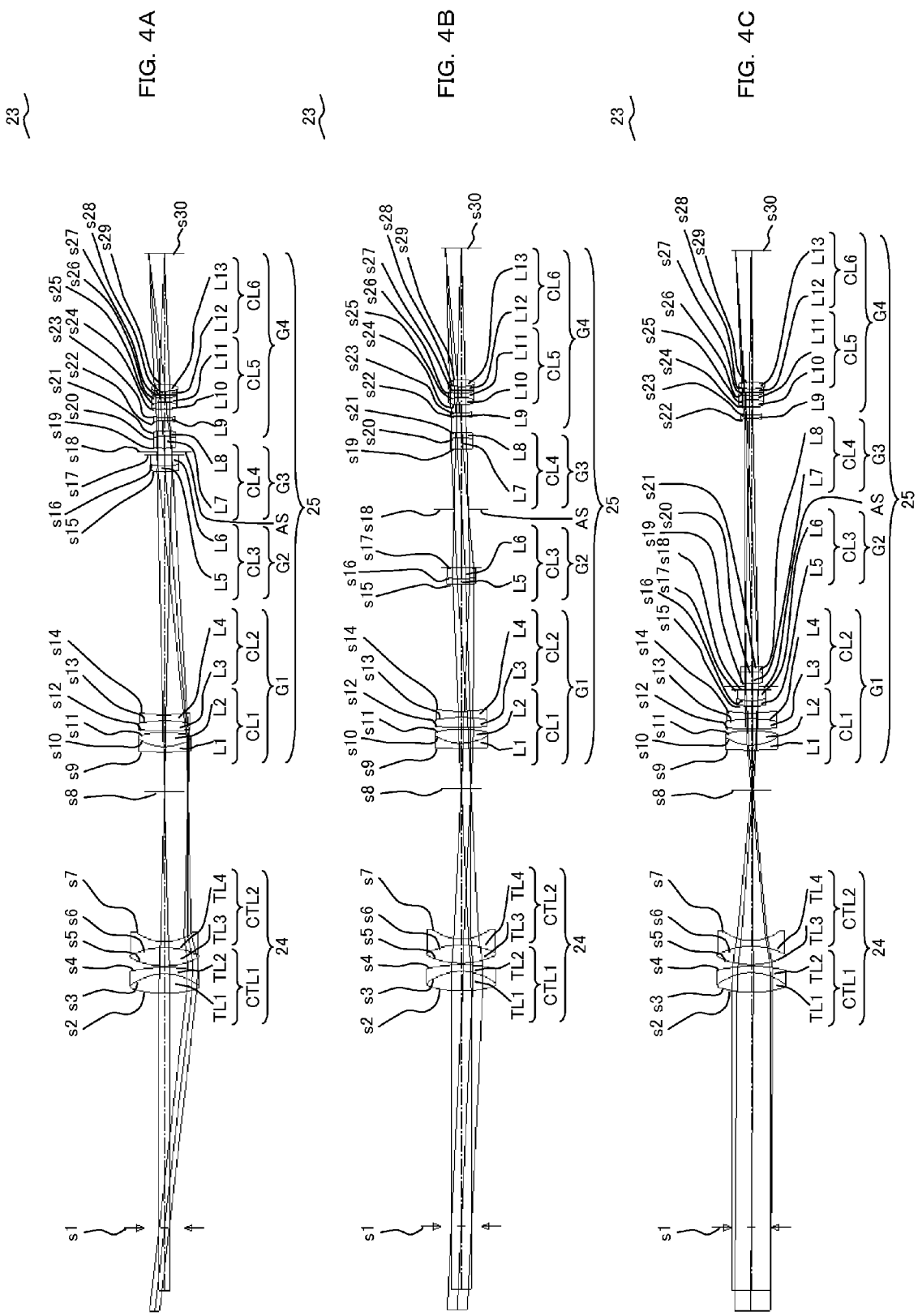

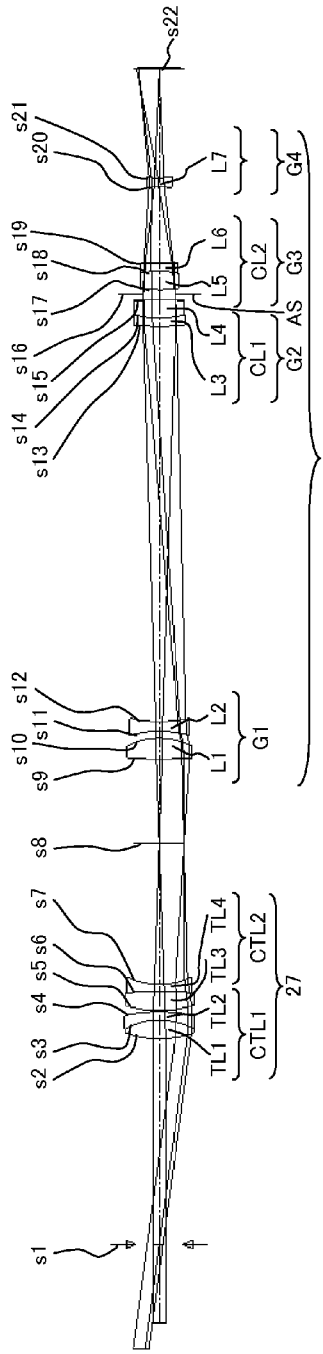
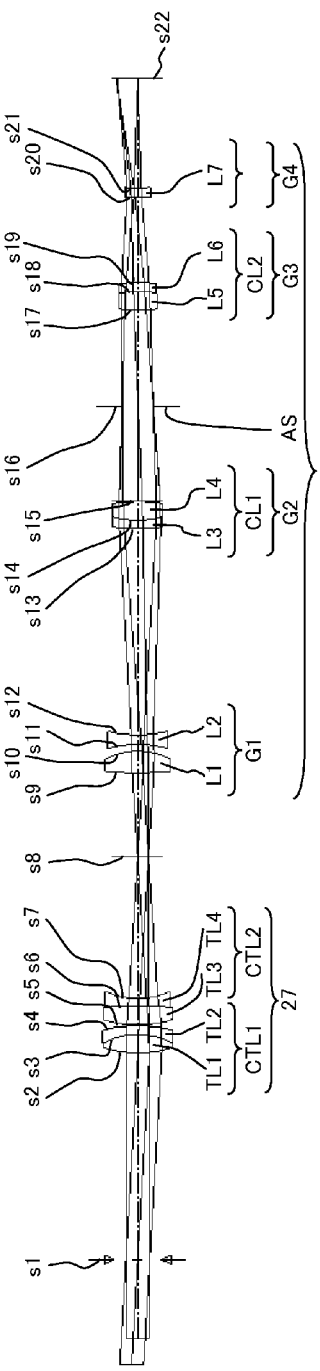
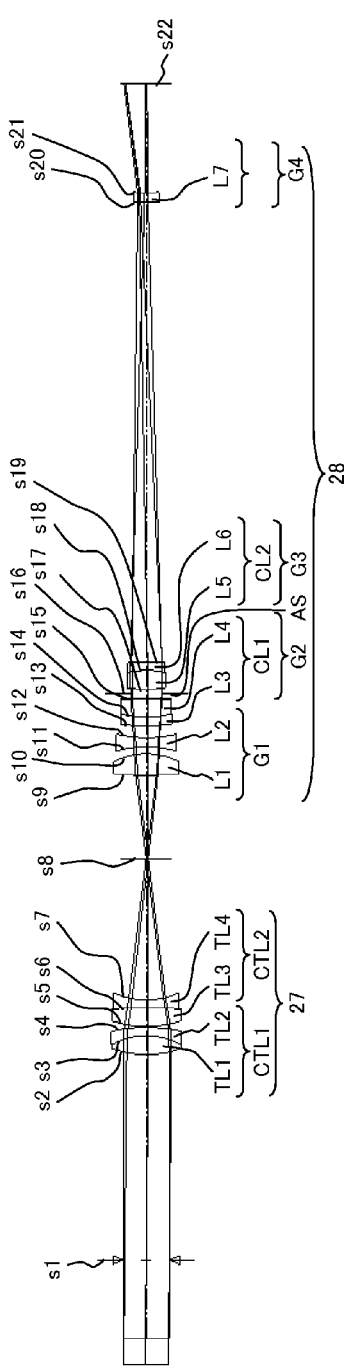

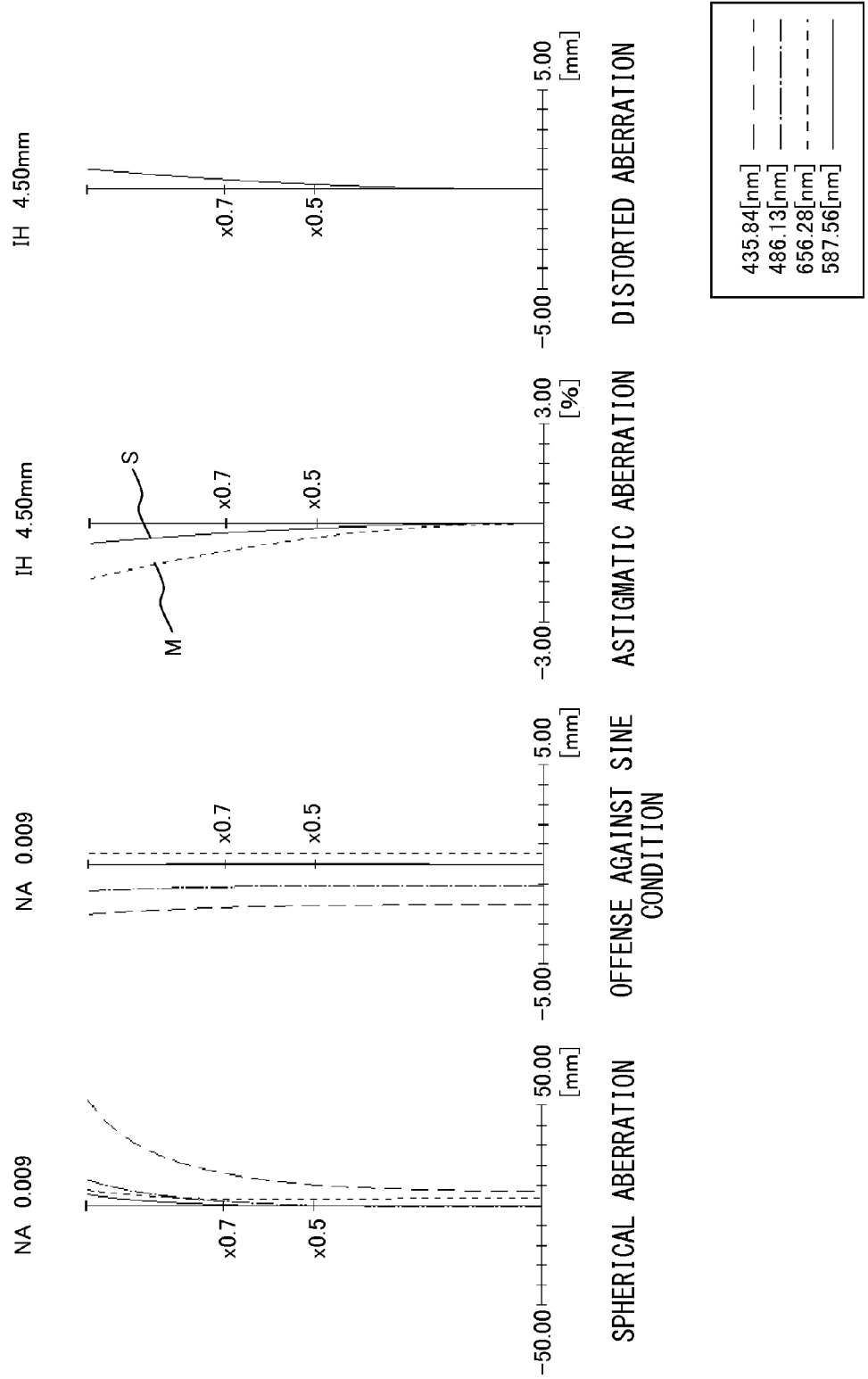
F I G. 7 C

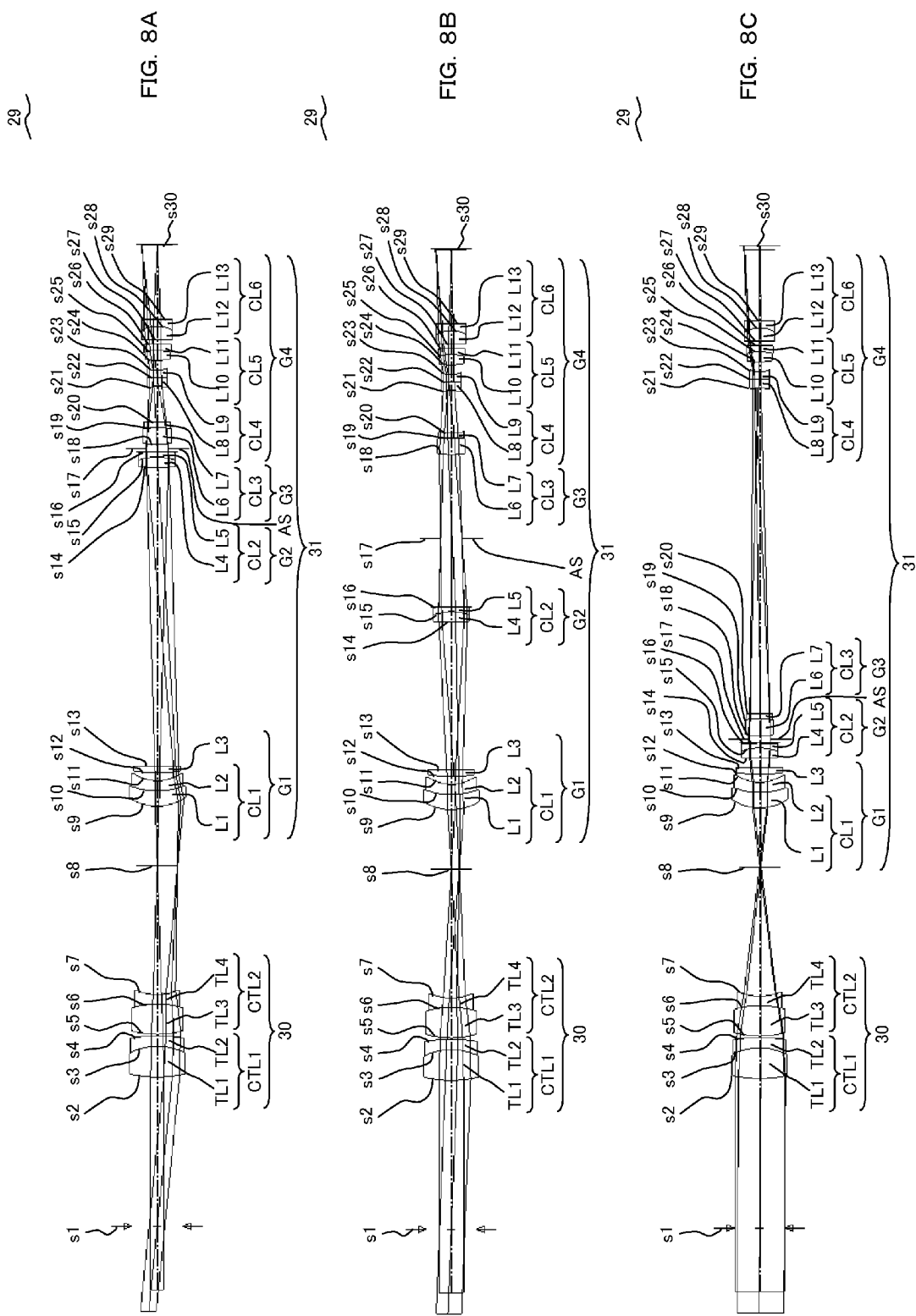

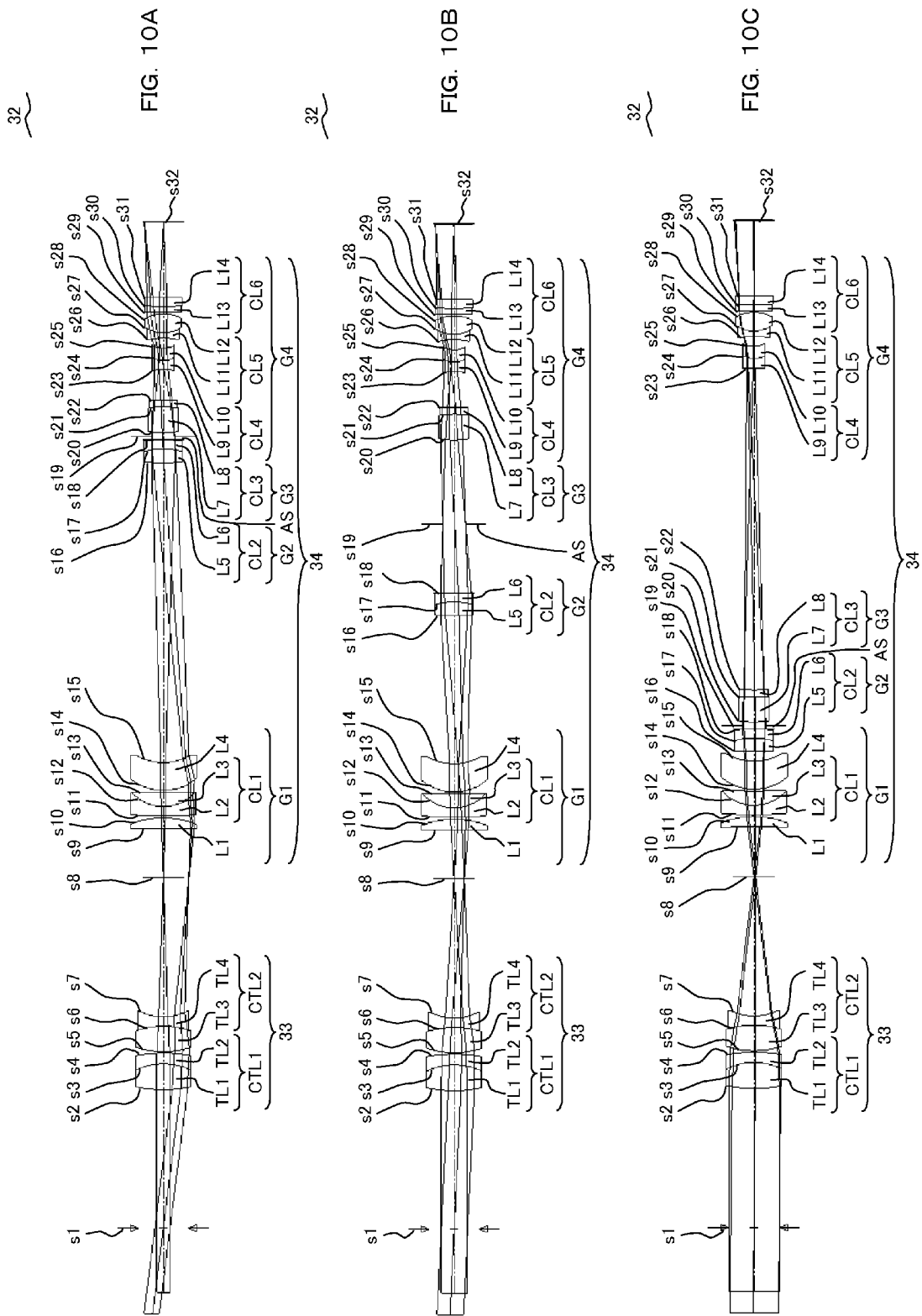

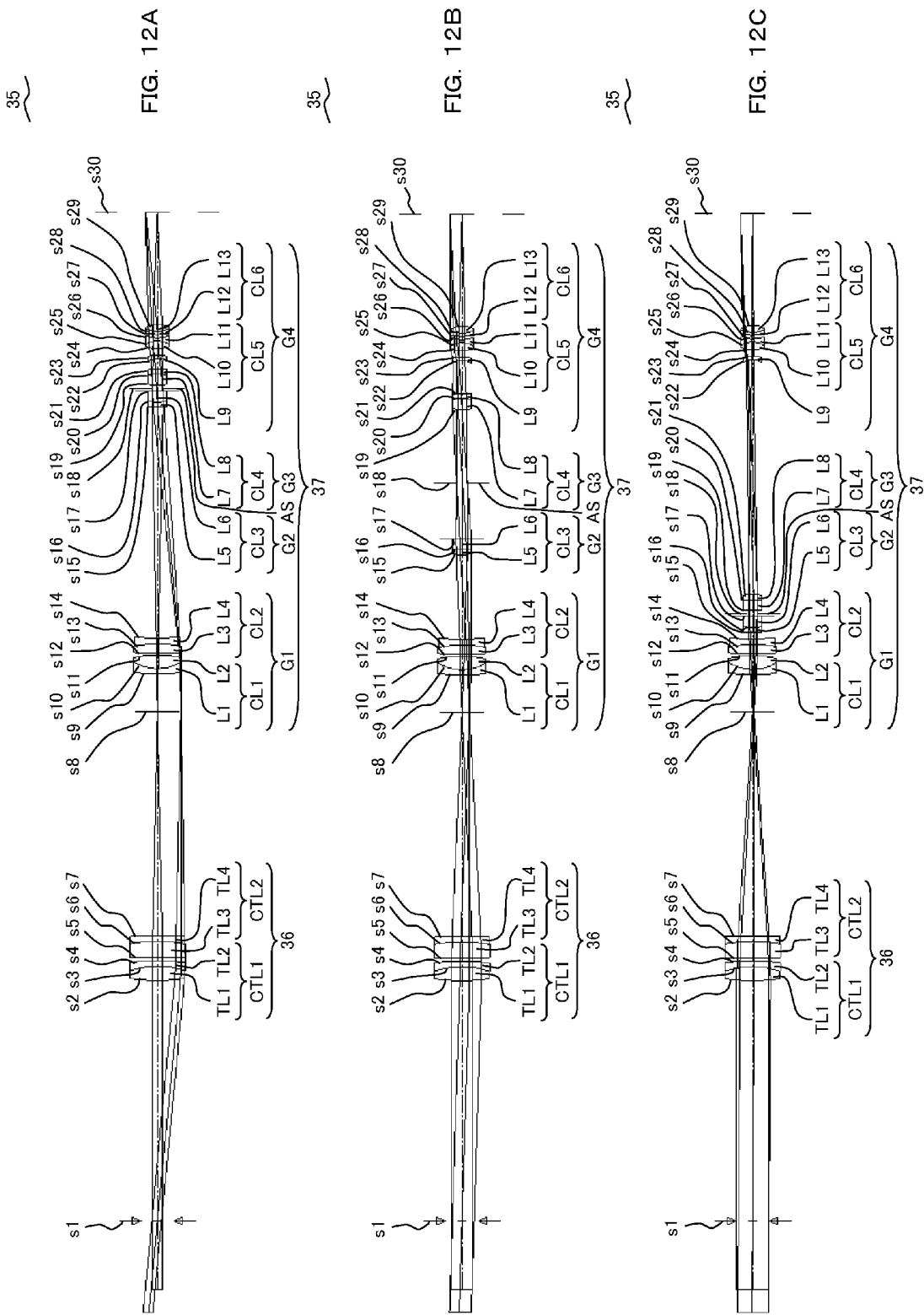

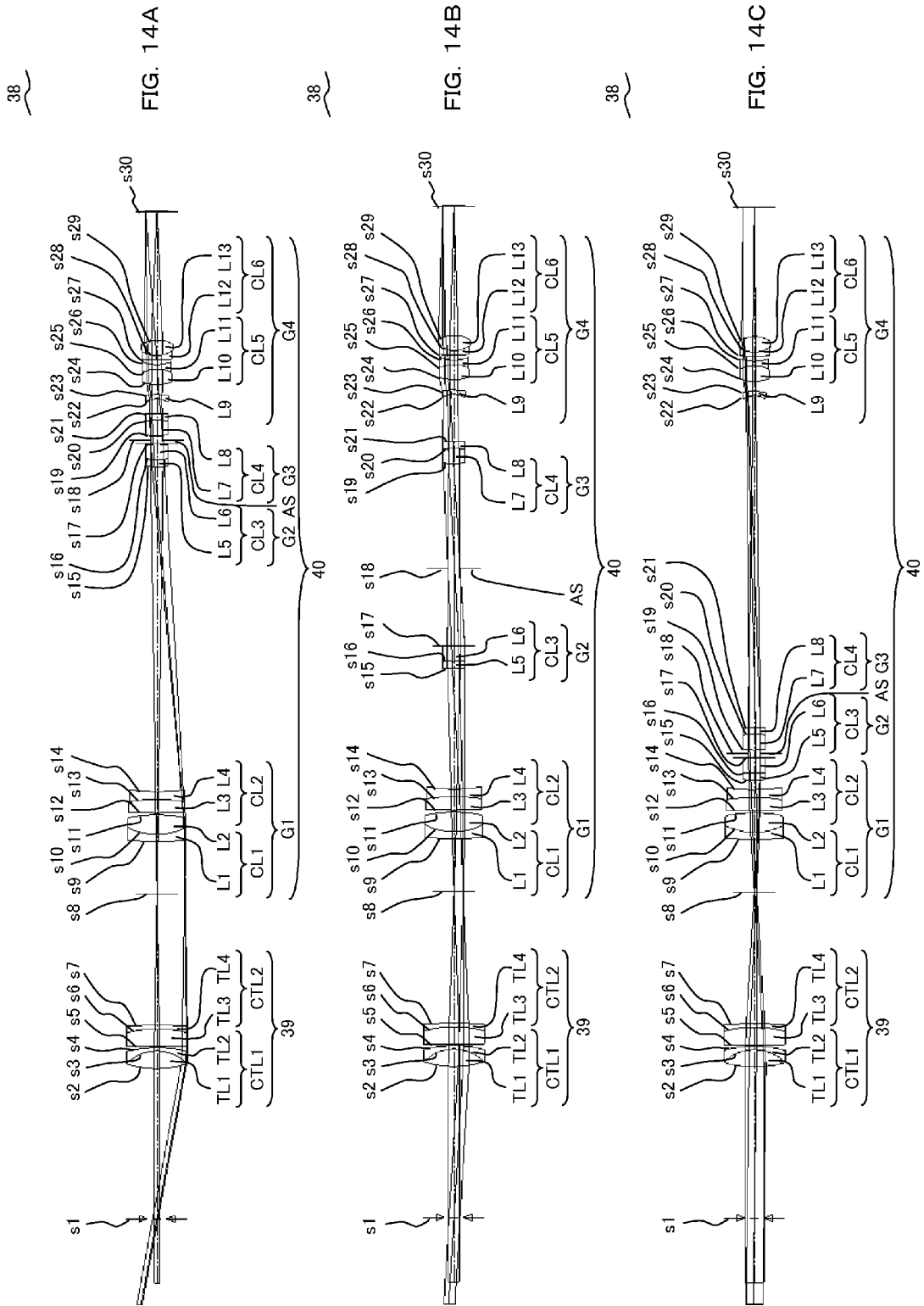

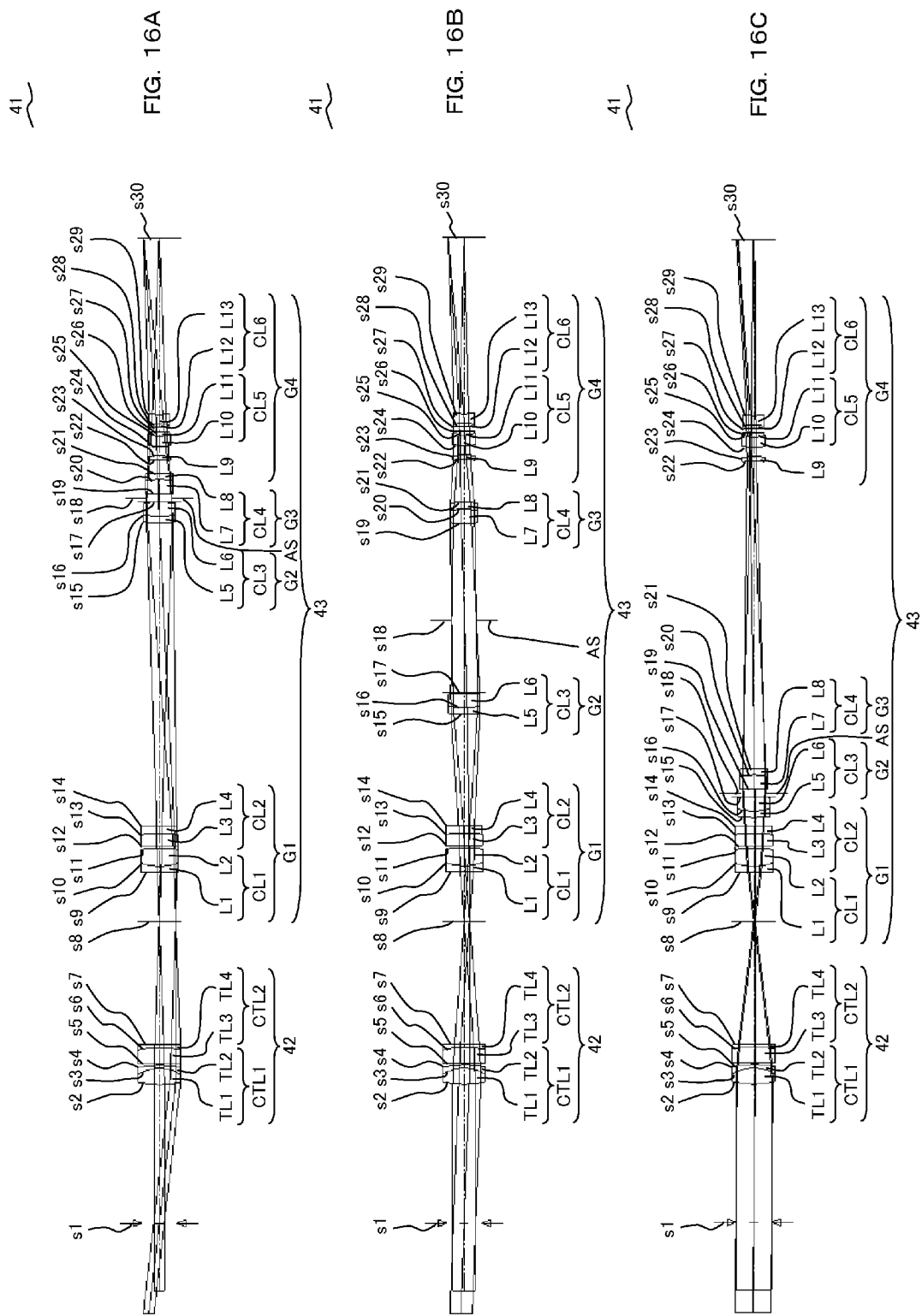

ZOOM IMAGE-FORMING OPTICAL SYSTEM AND MICROSCOPE EQUIPPED THEREWITH

CROSS REFERENCE TO RELATED APPLICATIONS

This application is based upon and claims the benefit of priority from prior Japanese Patent Application No. 2011-122211, filed May 31, 2011, the entire contents of which are incorporated herein by this reference.

BACKGROUND OF THE INVENTION

1. Field of the Invention

The present invention relates to a zoom image-forming optical system and a microscope that includes the zoom image-forming optical system.

2. Description of the Related Art

As a variable power system for a zoom microscope that includes a zoom image-forming optical system having a variable focal length, a system that condenses a luminous flux from an objective lens by using a tube lens to form an intermediate image and that projects a magnified image of that intermediate image onto an image plane by using a relay lens with a zoom function is conventionally known. A zoom microscope adopting such a system is disclosed, for example, in Japanese Laid-open Patent Publication No. 09-274137.

A system that directly changes the magnification of an image formed on an image plane by using a relay lens with a zoom function, where an intermediate image is not formed, is also known. A zoom microscope adopting such a system is disclosed, for example, in Japanese Laid-open Patent Publication No. 2004-361778 and Japanese Laid-open Patent Publication No. 2006-154230.

The variable power system of a zoom microscope is generally classified into the above-mentioned two systems.

SUMMARY OF THE INVENTION

The First Embodiment of the present invention relates to a zoom image-forming optical system used in combination with an infinity-correction objective lens, and the zoom image-forming optical system includes: a tube lens for condensing a luminous flux from the objective lens to form an intermediate image; and a relay lens with a zoom function for projecting the intermediate image onto an image plane, wherein the relay lens includes a first lens group with positive power, a second lens group that belongs to a movable group with positive power, a third lens group that belongs to a movable group with positive or negative power, and a fourth lens group with negative power, in an order from the intermediate image side, and the zoom image-forming optical system changes its magnifying power by moving the second lens group and the third lens group in an optical axis direction.

BRIEF DESCRIPTION OF THE DRAWINGS

The present invention will be more apparent from the following detailed description when the accompanying drawings are referenced.

FIG. 1 is a schematic diagram illustrating the configuration of a zoom microscope according to one embodiment of the present invention.

FIG. 4A is a section view of a zoom image-forming optical system in a low-power end state according to the Second Embodiment of the present invention.

FIG. 4B is a section view of a zoom image-forming optical system in an intermediate state according to the Second Embodiment of the present invention.

FIG. 4C is a section view of a zoom image-forming optical system in a high-power end state according to the Second Embodiment of the present invention.

FIG. 6A is a section view of a zoom image-forming optical system in a low-power end state according to the Third Embodiment of the present invention.

FIG. 6B is a section view of a zoom image-forming optical system in an intermediate state according to the Third Embodiment of the present invention.

FIG. 6C is a section view of a zoom image-forming optical system in a high-power end state according to the Third Embodiment of the present invention.

FIG. 7C illustrates an aberration of a zoom image-forming optical system in a high-power end state, which is illustrated in FIG. 6C.

FIG. 8A is a section view of a zoom image-forming optical system in a low-power end state according to the Fourth Embodiment of the present invention.

FIG. 8B is a section view of a zoom image-forming optical system in an intermediate state according to the Fourth Embodiment of the present invention.

FIG. 8C is a section view of a zoom image-forming optical system in a high-power end state according to the Fourth Embodiment of the present invention.

FIG. 10A is a section view of a zoom image-forming optical system in a low-power end state according to the Fifth Embodiment of the present invention.

FIG. 10B is a section view of a zoom image-forming optical system in an intermediate state according to the Fifth Embodiment of the present invention.

FIG. 10C is a section view of a zoom image-forming optical system in a high-power end state according to the Fifth Embodiment of the present invention.

FIG. 12A is a section view of a zoom image-forming optical system in a low-power end state according to the Sixth Embodiment of the present invention.

FIG. 12B is a section view of a zoom image-forming optical system in an intermediate state according to the Sixth Embodiment of the present invention.

FIG. 12C is a section view of a zoom image-forming optical system in a high-power end state according to the Sixth Embodiment of the present invention.

FIG. 14A is a section view of a zoom image-forming optical system in a low-power end state according to the Seventh Embodiment of the present invention.

FIG. 14B is a section view of a zoom image-forming optical system in an intermediate state according to the Seventh Embodiment of the present invention.

FIG. 14C is a section view of a zoom image-forming optical system in a high-power end state according to the Seventh Embodiment of the present invention.

FIG. 16A is a section view of a zoom image-forming optical system in a low-power end state according to the Eighth Embodiment of the present invention.

FIG. 16B is a section view of a zoom image-forming optical system in an intermediate state according to the Eighth Embodiment of the present invention.

FIG. 16C is a section view of a zoom image-forming optical system in a high-power end state according to the Eighth Embodiment of the present invention.

DESCRIPTION OF THE PREFERRED EMBODIMENTS

Figure 2A:
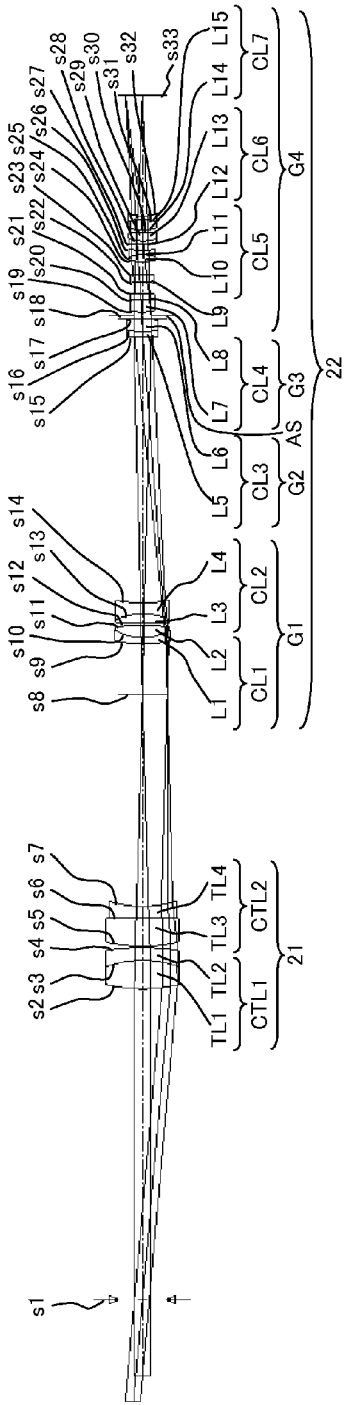
FIG. 2A is a section view of a zoom image-forming optical system in a low-power end state according to the First Embodiment of the present invention.

First, the configuration of a zoom microscope according to one embodiment of the present invention will be described. FIG. 1 is a schematic diagram illustrating the configuration of a zoom microscope according to one embodiment of the present invention. A zoom microscope 100 illustrated in FIG. 1 is a microscope having a zoom image-forming optical system, and the zoom microscope 100 may include a zoom image-forming optical system according to any of the embodiments that will be described later.

The zoom microscope 100 includes on an illumination light path, a light source 1 that emits illumination light, a field stop 3, an illumination optical system 2, a polarizer 4, a half mirror 5, a DIC(Differential Interference Contrast) prism 6, and an objective lens 7. Moreover, the zoom microscope 100 includes a zoom image-forming optical system 16 that includes a tube lens 10 and a relay lens 15 with a zoom function (hereinafter, such a lens will be referred to as a zoom lens) on an observation optical path. In more detail, the zoom microscope 100 includes an analyzer 9, a tube lens 10, a mirror 11, a field stop 12, a zoom lens 15, and a CCD 17 disposed on an image plane 18 on an observation optical path in addition to the objective lens 7, the DIC prism 6, and the half mirror 5 that are mentioned above. Note that the field stop 3 and the field stop 12 are arranged at an optically conjugated position with reference to a specimen surface 8.

The field stop 3 that is arranged at an optically conjugated position with reference to the specimen surface 8 is a variable stop of which the stop diameter is variable. If the stop diameter is adjusted such that only a necessary area will be irradiated with illumination light, illumination light is prevented from being irradiated outside the field and thus the amount of stray light may be reduced. As a result, the zoom microscope 100 may obtain a high-contrast image.

The half mirror 5 guides illumination light to the specimen surface 8, and also guides observation light from the specimen surface 8 to the tube lens 10. The polarizer 4, the DIC prism 6, and the analyzer 9 are arranged in a detachable manner from the optical path, and are arranged in the optical path as necessary in view of, for example, an observation system.

The objective lens 7 is an infinity-correction objective lens that irradiates illumination light onto the specimen surface 8 and emits observation light from the specimen surface 8 as a parallel luminous flux. The tube lens 10 condenses a parallel luminous flux from the objective lens 7 to form a primary image (intermediate image) of the specimen surface 8 on the field stop 12.

The mirror 11 is an optical element arranged to bend an observation optical path with the purpose of making the zoom microscope 100 compact. Moreover, the mirror 11 is arranged in a converged luminous flux between the field stop 12 on which an intermediate image is formed and the tube lens 10.

The field stop 12 that is arranged at an optically conjugated position with reference to the specimen surface 8 is a variable stop of which the stop diameter is variable. If the stop diameter is adjusted in accordance with the size of an intermediate image formed at the field stop 12, it becomes possible to reduce stray light. By so doing, the zoom microscope 100 may achieve a high-contrast image in which flare or ghosting is inhibited.

The zoom lens 15 is a relay lens with a zoom function for magnifying and projecting the intermediate image formed by the tube lens 10 onto the image plane 18. The zoom lens 15 includes a plurality of lens groups 13 that include a movable group and an aperture stop 14 arranged in a movable manner in the direction of an optical axis. The zoom lens 15 and the tube lens 10 configure a zoom image-forming optical system 16.

According to the zoom microscope 100, as will be described later, the zoom image-forming optical system 16 is a compact zoom image-forming optical system that precisely corrects an aberration in a wide magnification range, and thus a microscope may be configured in a compact manner as a whole and an aberration may be precisely corrected in a wide magnification range. The configuration of the observation optical path that is bent by the mirror 11 also contributes to the compact configuration of the zoom microscope 100. Moreover, the zoom microscope 100 may control the quantity of stray light that is detected by the CCD 17 by adjusting the stop diameters of the field stop 3 and the field stop 12 that are configured as variable stops. Accordingly, a high-contrast image may be achieved.

Next, the configuration and operation of zoom image-forming optical systems shared among the embodiments of the present invention will be described with reference to the zoom image-forming optical system 16 of FIG. 1 as an example.

The zoom image-forming optical system 16 is used in combination with the infinity-correction objective lens 7, and the zoom image-forming optical system 16 includes: a tube lens 10 for condensing a luminous flux from the objective lens 7 to form an intermediate image; and a zoom lens 15 with a zoom function for projecting the intermediate image onto an image plane 18.

The zoom lens 15 includes a first lens group with positive power, a second lens group that belongs to a movable group with positive power, an aperture stop 14 that moves in the direction of an optical axis, a third lens group that belongs to a movable group with a positive or negative power, and a fourth lens group with a negative power, in this order from the intermediate image side (i.e., specimen surface 8 side). The zoom lens 15 changes magnification of an image formed on the image plane 18 by moving the second lens group and the third lens group in the direction of an optical axis.

The first lens group and the second lens group utilize their positive power to form an optically conjugated position with reference to an exit pupil position of the objective lens 7 (hereinafter, this will be referred to as a pupil conjugate position) between the second lens group and the third lens group. The first lens group converts the luminous flux from an intermediate image into a converged luminous flux, and plays a role mainly in correcting a spherical aberration and a chromatic aberration. On the other hand, the second lens group utilizes its positive power to correct a pupil aberration. Also, the second lens group that belongs to a movable group plays a role in moving in the direction of an optical axis to change the magnifying power of the zoom lens 15. If one of the first lens group and the second lens group is configured to have negative power, it becomes difficult to form a pupil conjugate position between the second lens group and the third lens group.

The third lens group utilizes its positive or negative power to correct a spherical aberration and a chromatic aberration. In a similar manner to the second lens group, the third lens group also plays a role in moving in the direction of an optical axis to change the magnifying power of the zoom lens 15. The fourth lens group utilizes its negative power to mainly correct the curvature of field. Note that if the fourth lens group is configured to have a positive power, the Petzval sum will not be sufficiently small, and thus it will become difficult to correct the curvature of field. Both the second lens group and the third lens group move approximately towards the intermediate image along an optical axis as the magnifying power changes from a low-power end to a high-power end.

The aperture stop 14 plays a role mainly in appropriately blocking unwanted light. In the zoom image-forming optical system 16 involving the above-mentioned zoom lens 15 that includes the first through fourth lens groups, the aperture stop 14 is configured so as to be movable between the second lens group and the third lens group. As a result, despite its compact structure where the length is short, the zoom image-forming optical system 16 may precisely correct an aberration in a wide magnification range.

More specifically, as the aperture stop 14 is configured so as to be movable in the direction of an optical axis, it becomes possible to appropriately block unwanted light by moving the aperture stop 14 to a desired position, thereby appropriately adjusting the numerical aperture on the image side. Accordingly, it becomes possible to take into consideration the specifications in several magnification states such as the depth of focus and the resolution, each of which is dependent on the numerical aperture. In other words, the zoom image-forming optical system 16 may be designed such that the number of lenses in which the tube lens 10 and the zoom lens 15 include, the focal length, the whole length, or the like will be optimized depending on the specifications in several magnification states. Generally, if the focal length of a zoom lens is made short and the power is made large so as to keep the whole length of an optical system short, the height of a light beam becomes large, and thus it becomes difficult to correct an aberration. By contrast, the zoom lens 15 may appropriately block unwanted light by moving the aperture stop 14 to a desired position. For this reason, even if the focal length is made short, it becomes possible for the zoom lens 15 to precisely correct an aberration. Accordingly, it becomes possible to keep the length of the zoom image-forming optical system 16 short.

As the numerical aperture on the image side may be precisely adjusted by the aperture stop 14, it becomes possible to design the zoom image-forming optical system 16 in view of the relationship between the numerical aperture in several magnification states and the Nyquist frequency of an image pickup device such as the CCD 17. In other words, the zoom image-forming optical system 16 may be optimally designed by controlling the numerical aperture on the image side according to, for example, a Nyquist frequency determined by the dot pitch of the CCD 17. Accordingly, for the same reasons as described above, it becomes possible to keep the length of the zoom image-forming optical system 16 short.

Furthermore, in the zoom image-forming optical system 16 that is configured as above such that a pupil conjugate position will be formed between the second lens group and the third lens group and the pupil conjugate position will have fewer chances of being out of the range between the second lens group and the third lens group even when its magnifying power changes, it becomes possible to keep the height of a light beam low in both the first lens group and the fourth lens group by arranging the aperture stop 14 between the second lens group and the third lens group. By so doing, the curvature of field and the chromatic aberration are corrected, and thus it becomes possible to reduce a burden on the first lens group and the fourth lens group. Accordingly, it becomes possible to precisely correct an aberration in a wide magnification range. On the other hand, if the aperture stop 14 is not arranged between the second lens group and the third lens group, the height of the light beam becomes tall in at least one of the first lens group and the fourth lens group, and thus it becomes difficult to correct the curvature of field and the chromatic aberration. Accordingly, it becomes difficult to achieve a wide magnification range.

Thus, the zoom image-forming optical system 16 that is configured as above may precisely correct an aberration in a wide magnification range in spite of its compact structure.

In the zoom image-forming optical system 16, as the movable second and third lens groups move in the direction of an optical axis, the magnifying power changes in a continuous manner, and the pupil conjugate position also moves accordingly. If the aperture stop 14 is arranged at a position extensively away from the pupil conjugate position, vignetting of an off-axis luminous flux tends to occur at an objective lens or the like, and an image tends to be uneven on the periphery as the brightness decreases on the periphery of the field of view. For this reason, it is desired that the aperture stop 14 that moves in the direction of an optical axis move according to the magnifying power changes of the zoom image-forming optical system 16, and that the aperture stop 14 be arranged at the pupil conjugate position or in close proximity to the pupil conjugate position. By so doing, it becomes possible to reduce vignetting, and an aberration may be precisely corrected in a wide magnification range.

It is desired that the aperture stop 14 of the zoom image-forming optical system 16 have a variable stop of which the stop diameter is variable. If the stop diameter is fixed, the specifications in various magnification states such as the depth of focus and the resolution of the zoom image-forming optical system 16 are determined by a pupil diameter at the pupil conjugate position. In other words, as the pupil diameter at an exit pupil position of an objective lens is constant, the specifications in various magnification states such as the depth of focus and the resolution are determined by the pupil magnification that is defined by the pupil diameter at a pupil conjugate position with reference to the pupil diameter at an exit pupil position. The aperture stop 14 that is configured as a variable stop of which the stop diameter is variable in the XY direction orthogonal to an optical axis is preferable because specifications such as the depth of focus and the resolution may be arbitrarily determined for several magnification states.

It is desired that the zoom image-forming optical system 16 satisfy the following conditional expression (1).

$$-2.7 < F_{TL}/F_{MIN} < -0.9 \tag{1}$$

In the conditional expression (1), $F_{TL}$ indicates the focal length of the tube lens 10, and $F_{MIN}$ indicates the compound focal length of the tube lens 10 and the zoom lens 15 in a low-power end state.

The conditional expression (1) defines the relationship between the focal length of the tube lens 10 and the compound focal length of the tube lens 10 and the zoom lens 15 in a low-power end state. Note that a low-power end state indicates a state in which the compound focal length of the tube lens 10 and the zoom lens 15 (in other words, the focal length of the zoom image-forming optical system 16) becomes smallest, and is a state of the zoom lens 15 that projects the specimen surface 8 in combination with the objective lens 7 onto the image plane 18 with the lowest magnification.

If $F_{TL}/F_{MIN}$ exceeds the upper limit (-0.9) in the conditional expression (1), the power of the tube lens 10 becomes too large to correct the curvature of field in a low-power end state. In order to solve this problem, it is necessary to increase the amount of aberration correction at the zoom lens 15. However, this increases the number of lenses of the zoom lens 15 excessively, which is not preferable. On the other hand, if $F_{TL}/F_{MIN}$ falls behind the lower limit (-2.7), the power of the tube lens 10 becomes small, thereby reducing the burden of aberration correction on the tube lens 10. However, the focal length of the tube lens 10 becomes too long. Accordingly, the entire length of the zoom image-forming optical system 16 also becomes long. Moreover, if the focal length of the tube lens 10 becomes long and the magnification of an intermediate image becomes excessively large, the correction of curvature of field becomes difficult at the zoom lens 15.

It is desired that the zoom image-forming optical system 16 satisfy the following conditional expression (2).

$$-0.16 < F_{TL}/F_{MAX} < -0.07 \tag{2}$$

In the conditional expression (2), $F_{TL}$ indicates the focal length of the tube lens 10, and $F_{MAX}$ indicates the compound focal length of the tube lens 10 and the zoom lens 15 in a high-power end state.

The conditional expression (2) defines the relationship between the focal length of the tube lens 10 and the compound focal length of the tube lens 10 and the zoom lens 15 in a high-power end state. Note that a high-power end state indicates a state in which the compound focal length of the tube lens 10 and the zoom lens 15 (in other words, the focal length of the zoom image-forming optical system 16) becomes largest, and is a state of the zoom lens 15 that projects the specimen surface 8 in combination with the objective lens 7 onto the image plane 18 with the highest magnification.

If $F_{TL}/F_{MAX}$ exceeds the upper limit (-0.07) in the conditional expression (2), the power of the tube lens 10 becomes too large to correct the chromatic aberration in a high-power end state. In order to solve this problem, it is necessary to increase the amount of aberration correction at the zoom lens 15. However, this increases the number of lenses of the zoom lens 15 excessively, which is not preferable. On the other hand, if $F_{TL}/F_{MAX}$ falls behind the lower limit (-0.16), the power of the tube lens 10 becomes small, thereby reducing the burden of aberration correction on the tube lens 10. However, the focal length of the tube lens 10 becomes too long. Accordingly, the entire length of the zoom image-forming optical system 16 also becomes long.

It is desired that the zoom image-forming optical system 16 satisfy the following conditional expression (3).

$$0.05 < \phi E/L_{PI} < 0.17 \tag{3}$$

In the conditional expression (3), $\phi E$ indicates the pupil diameter of the objective lens 7 in a high-power end state, and $L_{PI}$ indicates the distance from an exit pupil position of the objective lens 7 to a primary image-forming position at which an intermediate image is formed by the tube lens 10.

The conditional expression (3) defines the relationship between the pupil diameter of the objective lens 7 in a high-power end state and the distance from an exit pupil position to an intermediate image position (primary image-forming position). If $\phi E/L_{PI}$ exceeds the upper limit in the conditional expression (3), the exit pupil position gets too far away from the zoom lens 15, and the lens diameter of the zoom lens 15 becomes excessively large. Accordingly, it becomes difficult to correct the curvature of field. On the other hand, if $\phi E/L_{PI}$ falls below the lower limit, the distance from an exit pupil position to an intermediate image position becomes too long, and a lens diameter of the tube lens 10 becomes excessively large. Accordingly, it becomes difficult to correct the curvature of field.

It is desired that the zoom image-forming optical system 16 satisfy the following conditional expressions (4) and (5).

$$-17<L_{PC}/F_{MIN}<-5 \quad (4)$$

$$-1.3<L_{PC}/F_{MAX}<-0.3 \quad (5)$$

In the conditional expressions (4) and (5), $F_{MIN}$ indicates the compound focal length of the tube lens 10 and the zoom lens 15 in a low-power end state, and $F_{MAX}$ indicates the compound focal length of the tube lens 10 and the zoom lens 15 in a high-power end state. Moreover, $L_{PC}$ indicates the distance from an exit pupil position of the objective lens 7 to a secondary image-forming position (image plane 18) at which an image is formed by the zoom lens 15.

The conditional expression (4) defines a condition for involving a wide magnification range and obtaining a wide field of view in that low-power end state. If $L_{PC}/F_{MIN}$ exceeds the upper limit (−5) in the conditional expression (4), the aberration correction burden on the zoom image-forming optical system 16 is reduced. However, the length of the entire zoom image-forming optical system 16 becomes long. On the other hand, if $L_{PC}/F_{MIN}$ falls below the lower limit (−17), the image height of an intermediate image becomes too large compared with the length of the zoom image-forming optical system 16. Accordingly, it becomes difficult to precisely correct a curvature of field by using the tube lens 10 and the zoom lens 15.

The conditional expression (5) defines a condition for involving a wide magnification range and achieving a large magnification in that high-power end state. If $L_{PC}/F_{MAX}$ exceeds the upper limit (−0.3) in the conditional expression (5), the aberration correction burden on the zoom image-forming optical system 16 is reduced. However, the entire length of the zoom image-forming optical system 16 becomes long. On the other hand, if $L_{PC}/F_{MAX}$ falls behind the lower limit (−1.3), the length of the tube lens 10 and the zoom lens 15 becomes smaller than the length required for correcting a chromatic aberration. Accordingly, it becomes difficult to precisely correct a chromatic aberration.

It is desired that the zoom image-forming optical system 16 satisfy the following conditional expression (6)

$$120<vd_{TLP}*nd_{TLP}<140 \quad (6)$$

In the conditional expression (6), $vd_{TLP}$ indicates the Abbe number of at least one of the convex lenses that are included in the tube lens 10, and $nd_{TLP}$ indicates the index of refraction for the d Line of that convex lens.

The conditional expression (6) defines a condition for involving a wide magnification range and precisely correcting a chromatic aberration. If $vd_{TLP}*nd_{TLP}$ exceeds the upper limit in the conditional expression (6), it becomes difficult to precisely correct the chromatic aberration in an intermediate image by using the tube lens 10. Accordingly, the burden on the zoom lens 15 for correcting a chromatic aberration becomes too large to correct a chromatic aberration in the image plane. On the other hand, if $vd_{TLP}*nd_{TLP}$ falls below the lower limit, it becomes difficult to precisely correct the curvature of field in an intermediate image by using the tube lens 10. Accordingly, the burden on the zoom lens 15 for correcting a curvature of field becomes too large to correct a curvature of field in the image plane.

Note that the conditional expressions (1) through (6) may be independently used or used in any combination.

A zoom image-forming optical system according to some embodiments will be described below in detail.

<First Embodiment>

Figure 2B:
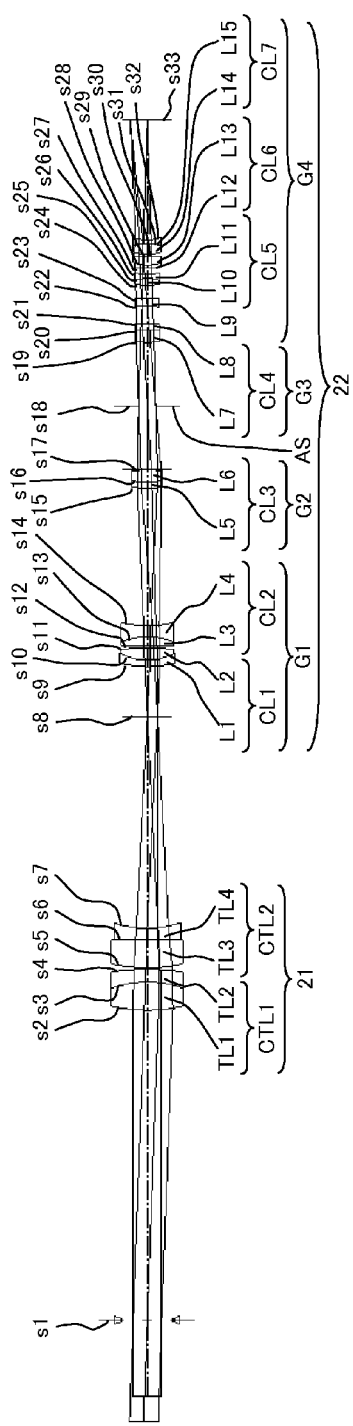
FIG. 2B is a section view of a zoom image-forming optical system in an intermediate state according to the First Embodiment of the present invention.
Figure 2C:
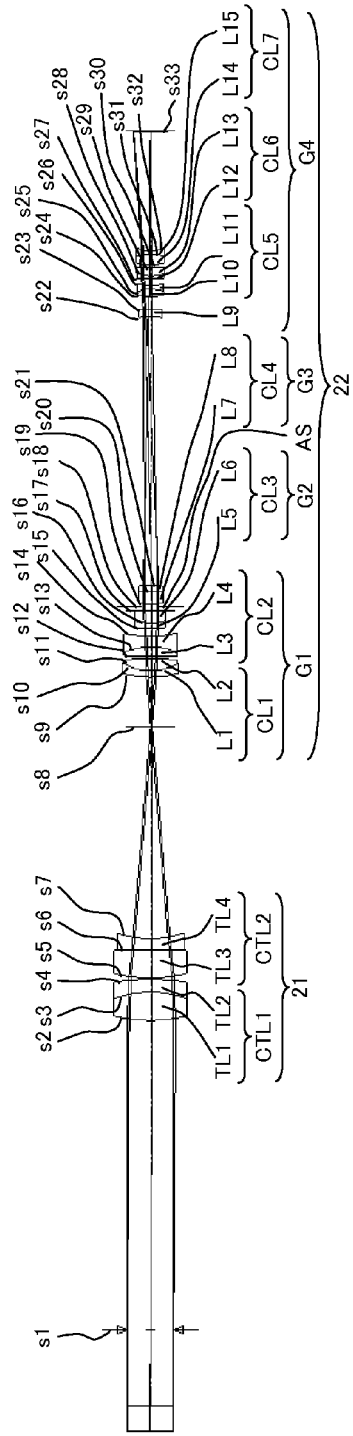
FIG. 2C is a section view of a zoom image-forming optical system in a high-power end state according to the First Embodiment of the present invention.

FIGS. 2A through 2C are section views of a zoom image-forming optical system according to the present embodiment. FIG. 2A, FIG. 2B, and FIG. 2C illustrate a low-power end state, an intermediate state, and a high-power end state, respectively. A zoom image-forming optical system 20 illustrated in FIGS. 2A through 2C is used in combination with an infinity-correction objective lens (not illustrated), and the zoom image-forming optical system 20 includes: a tube lens 21 for condensing a luminous flux from the objective lens to form an intermediate image; and a zoom lens 22 with a zoom function for projecting the intermediate image onto an image plane.

The tube lens 21 includes a cemented lens CTL1 having a biconvex lens TL1 and a meniscus lens TL2 whose concavity is oriented toward an object side, and a cemented lens CTL2 having a biconvex lens TL3 and a biconcave lens TL4, in this order from an object side (i.e., objective lens side).

The zoom lens 22 includes a first lens group G1 with positive power, a second lens group G2 that is a movable group with positive power, an aperture stop AS that moves in the direction of an optical axis, a third lens group G3 that is a movable group with positive power, and a fourth lens group G4 with a negative power, in this order from the intermediate image formed by the tube lens 21. The zoom lens 22 changes magnification of an image formed on an image plane by moving the second lens group G2 and the third lens group G3 in the direction of an optical axis.

The first lens group G1 includes a cemented lens CL1 having a meniscus lens L1 whose concavity is oriented toward an image side and a biconvex lens L2, and a cemented lens CL2 having a biconvex lens L3 and a biconcave lens L4, in this order from an intermediate image side.

The second lens group G2 is movable in the direction of an optical axis, and includes a cemented lens CL3 having a meniscus lens L5 whose concavity is oriented toward an image side and a biconvex lens L6, in this order from an intermediate image side.

The third lens group G3 is movable in the direction of an optical axis, and includes a cemented lens CL4 having a biconvex lens L7 and a meniscus lens L8 whose concavity is oriented toward an object side, in this order from an intermediate image side.

The fourth lens group G4 includes a biconcave lens L9, a cemented lens CL5 having a biconvex lens L10 and a biconcave lens L11, a cemented lens CL6 having a meniscus lens L12 whose concavity is oriented toward an image side and a biconvex lens L13, as well as a cemented lens CL7 having a biconvex lens L14 and a biconcave lens L15, in this order from an intermediate image side.

The various kinds of data of the zoom image-forming optical system 20 according to the present embodiment will be described. Note that the reference wavelength is the d Line (587.56 nm).

The focal length $F_{TL}$ of the tube lens 21, the compound focal length $F_{MIN}$ between the tube lens 21 and the zoom lens 22 in a low-power end state, the compound focal length $F_{MAX}$ between the tube lens 21 and the zoom lens 22 in a high-power end state, the distance $L_{PI}$ between an exit pupil position and a primary image-forming position (intermediate image position), the distance $L_{IC}$ between a primary image-forming position and a secondary image-forming position (image plane), and the distance $L_{PC}$ between an exit pupil position and a secondary image-forming position are as follows.

$F_{TL}$=89.146 mm, $F_{MIN}$=−61.1 mm, $F_{MAX}$=−830.6 mm, $L_{PI}$=191.329 mm, $L_{IC}$=188.729 mm, $L_{PC}$=380.058 mm

The stop diameter ϕ of an aperture stop AS and the pupil diameter ϕE of an objective lens in a high-power end state which is illustrated in FIG. 2C are as follows.

ϕ=5.54 mm, ϕE=15 mm

The present embodiment relates to an image pickup device of a CCD of ⅔ inch or the like, and the diagonal length is 11 mm (image height IH=5.5 mm).

The lens data of the zoom image-forming optical system 20 according to the present embodiment is as follows.

ZOOM IMAGE-FORMING OPTICAL SYSTEM 20

| s | r | d | nd | vd |
|---|---|---|----|----|
| 1 | INF | 98.141 | | |
| 2 | 52.1991 | 9.000 | 1.497 | 81.54 |
| 3 | −34.3313 | 4.000 | 1.72047 | 34.71 |
| 4 | −82.2406 | 0.500 | | |
| 5 | 55.7603 | 9.000 | 1.72342 | 37.95 |
| 6 | −251.2977 | 3.500 | 1.6134 | 44.27 |
| 7 | 36.2202 | 67.188 | | |
| 8 | INF | 15.664 | | |
| 9 | 38.0153 | 2.000 | 1.72047 | 34.71 |
| 10 | 17.7201 | 4.000 | 1.48749 | 70.23 |
| 11 | −47.5765 | 0.500 | | |
| 12 | 120.0000 | 3.000 | 1.8081 | 22.76 |
| 13 | −21.9602 | 3.470 | 1.72047 | 34.71 |
| 14 | 37.1922 | D14 | | |
| 15 | 46.4387 | 1.816 | 1.7552 | 27.51 |
| 16 | 20.9425 | 4.011 | 1.56384 | 60.67 |
| 17 | −36.2791 | D17 | | |
| 18 | INF | D18 | | |
| 19 | 36.2791 | 4.011 | 1.56384 | 60.67 |
| 20 | −20.9425 | 1.816 | 1.7552 | 27.51 |
| 21 | −46.4387 | D21 | | |
| 22 | −22.9648 | 2.299 | 1.741000 | 52.64 |
| 23 | 41.0097 | 4.154 | | |
| 24 | 17.2300 | 2.291 | 1.834 | 37.16 |
| 25 | −11.3752 | 1.127 | 1.741 | 52.64 |
| 26 | 12.9604 | 2.000 | | |
| 27 | 53.3076 | 1.124 | 1.74 | 28.3 |
| 28 | 13.5951 | 2.811 | 1.516330 | 64.14 |
| 29 | −32.7286 | 0.562 | | |
| 30 | 14.6817 | 3.373 | 1.723420 | 37.95 |
| 31 | −15.1827 | 1.124 | 1.613400 | 44.27 |
| 32 | 10.7655 | 37.958 | | |
| 33 | INF | | | |

Here, "s" indicates a plane number, and "r" indicates a radius of curvature (mm). Moreover, "d" indicates a lens plane interval (mm), "nd" indicates an index of refraction for the d Line, and "vd" indicates an Abbe number. The planes indicated by plane numbers s1, s8, s18, and s33 indicate the exit pupil position of an objective lens, a primary image (intermediate image) position, a pupil conjugate position, and an image plane, respectively. A lens plane interval d1 indicates the distance from an exit pupil position (plane number s1) to a first plane (plane number s2) that is closest to the object lens of the tube lens 21. A lens plane interval d32 indicates the distance from the last plane (plane number s32) of the zoom lens 22 to the image plane (plane number s33). lens plane intervals d14, d17, d18, and d21 are variables D14, D17, D18, and D21, which vary according to the zoom operation of the zoom lens 22, and they respectively indicate the distance between the first lens group G1 and the second lens group G2, the distance between the second lens group G2 and the aperture stop AS, the distance between the aperture stop AS and the third lens group G3, and the distance between the third lens group G3 and the fourth lens group G4.

The compound focal lengths of the tube lens 21 and the zoom lens 22 in a low-power end state illustrated in FIG. 2A, an intermediate state illustrated in FIG. 2B, and in a high-power end state illustrated in FIG. 2C, that is, the focal lengths (mm) of the zoom image-forming optical system 20 and the lens plane intervals (mm) of variables in the respective states, are as follows.

FOCAL LENGTH AND LENS PLANE INTERVAL OF ZOOM IMAGE-FORMING OPTICAL SYSTEM 20

| STATE | HIGH-POWER END | INTERMEDIATE | LOW-POWER END |
|-------|----------------|--------------|---------------|
| FOCAL LENGTH | −830.6 | −145.8 | −61.1 |
| D14 | 2.424 | 43.530 | 83.838 |
| D17 | 1.000 | 20.000 | 1.000 |
| D18 | 1.000 | 20.450 | 1.157 |
| D21 | 85.232 | 5.676 | 3.660 |

The zoom image-forming optical system 20 according to the present embodiment satisfies conditional expressions (1) through (6) as expressed in expressions (11) through (16) below. The expressions (11) through (16) correspond to the conditional expressions (1) through (6), respectively. Note that the ν $d_{TLP}$ and the $nd_{TLP}$ of the expression (16) are an Abbe number and an index of refraction for the d Line of a biconvex lens TL1, respectively.

$$F_{TL}/F_{MIN}=-1.46 \tag{11}$$

$$F_{TL}/F_{MAX}=-0.11 \tag{12}$$

$$ϕE/L_{PI}=0.08 \tag{13}$$

$$L_{PC}/F_{MIN}=-6.22 \tag{14}$$

$$L_{PC}/F_{MAX}=-0.46 \tag{15}$$

$$ν\,d_{TLP}*nd_{TLP}=122.1 \tag{16}$$

Figure 3A:
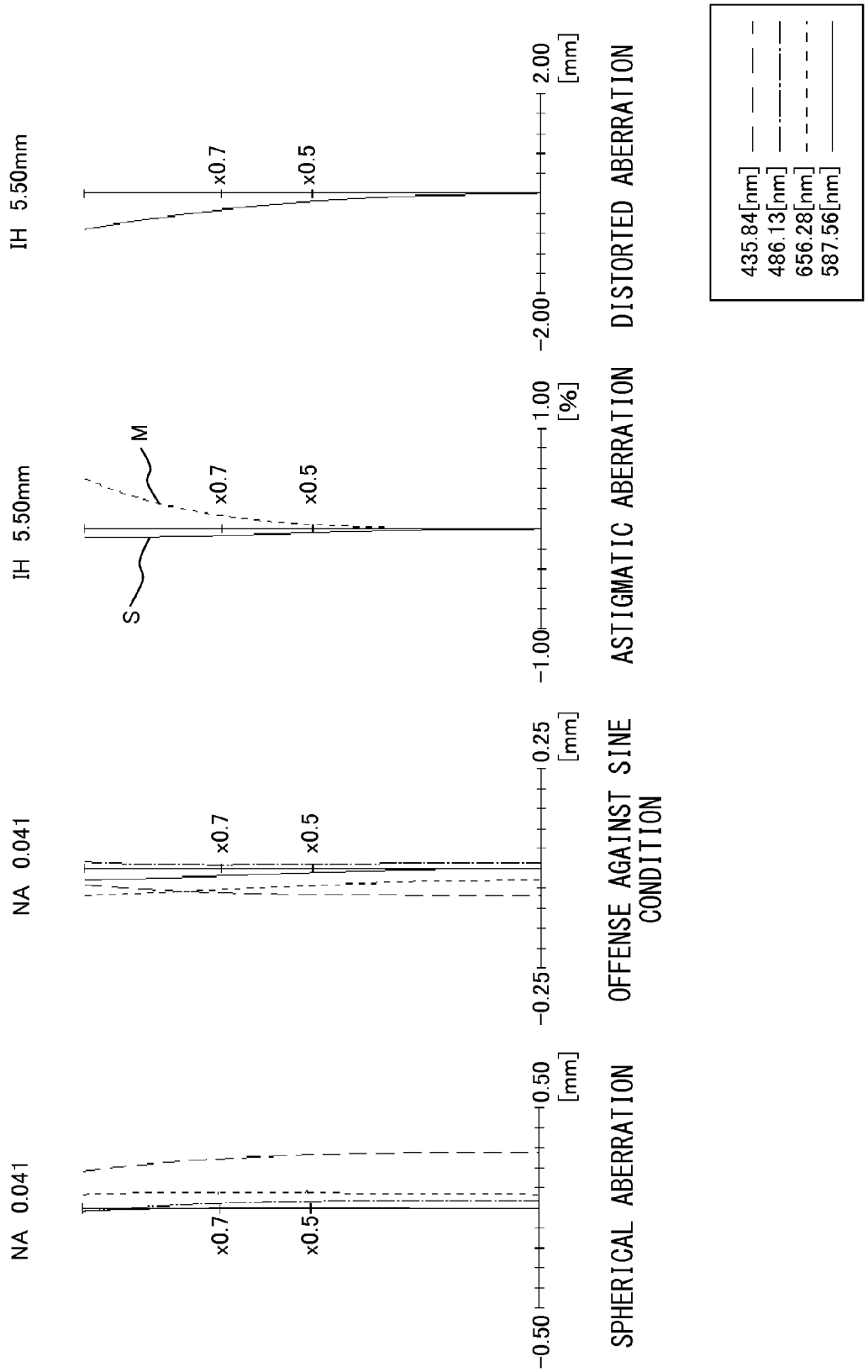
FIG. 3A illustrates an aberration of a zoom image-forming optical system in a low-power end state, which is illustrated in FIG. 2A.
Figure 3B:
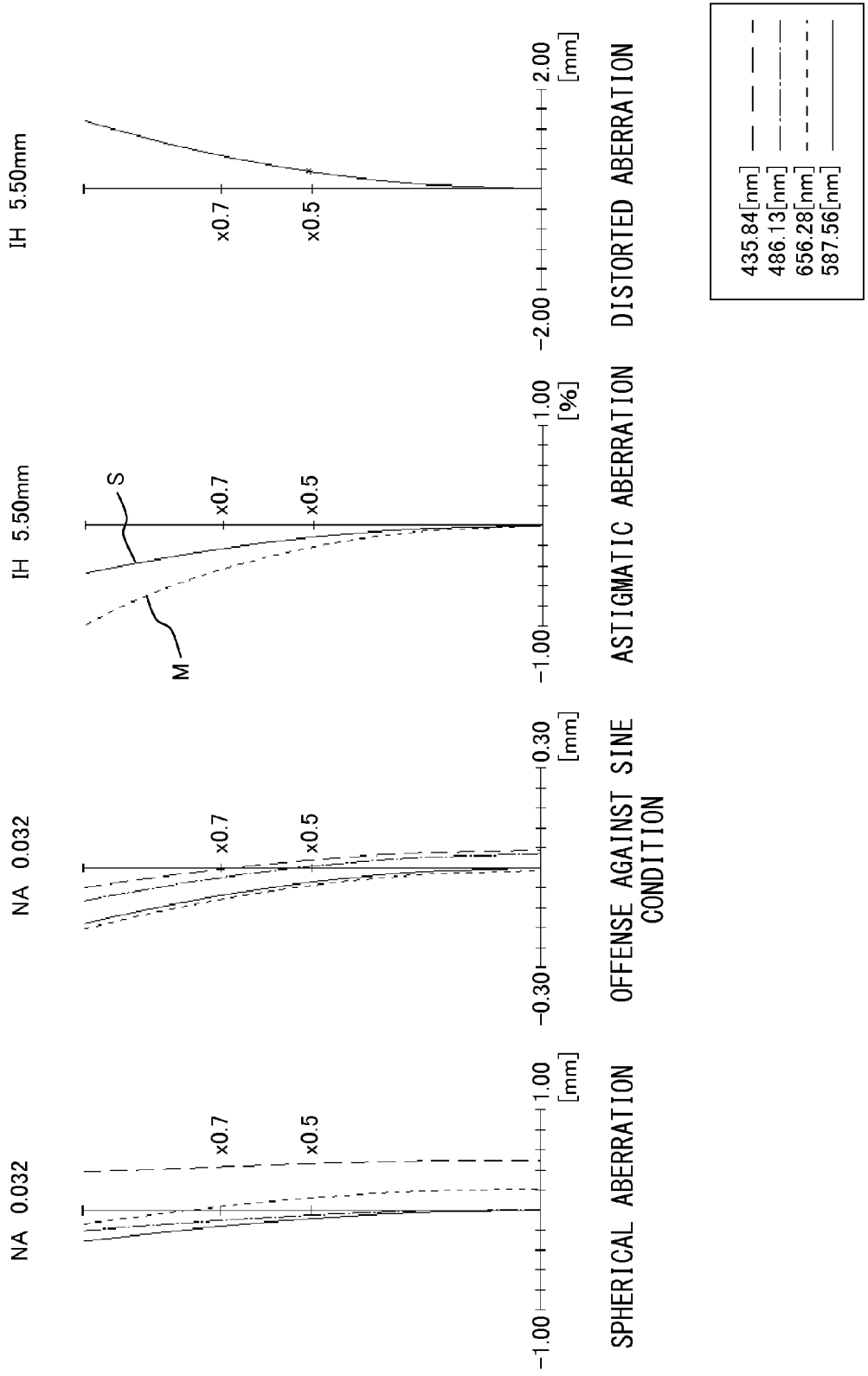
FIG. 3B illustrates an aberration of a zoom image-forming optical system in an intermediate state, which is illustrated in FIG. 2B.
Figure 3C:
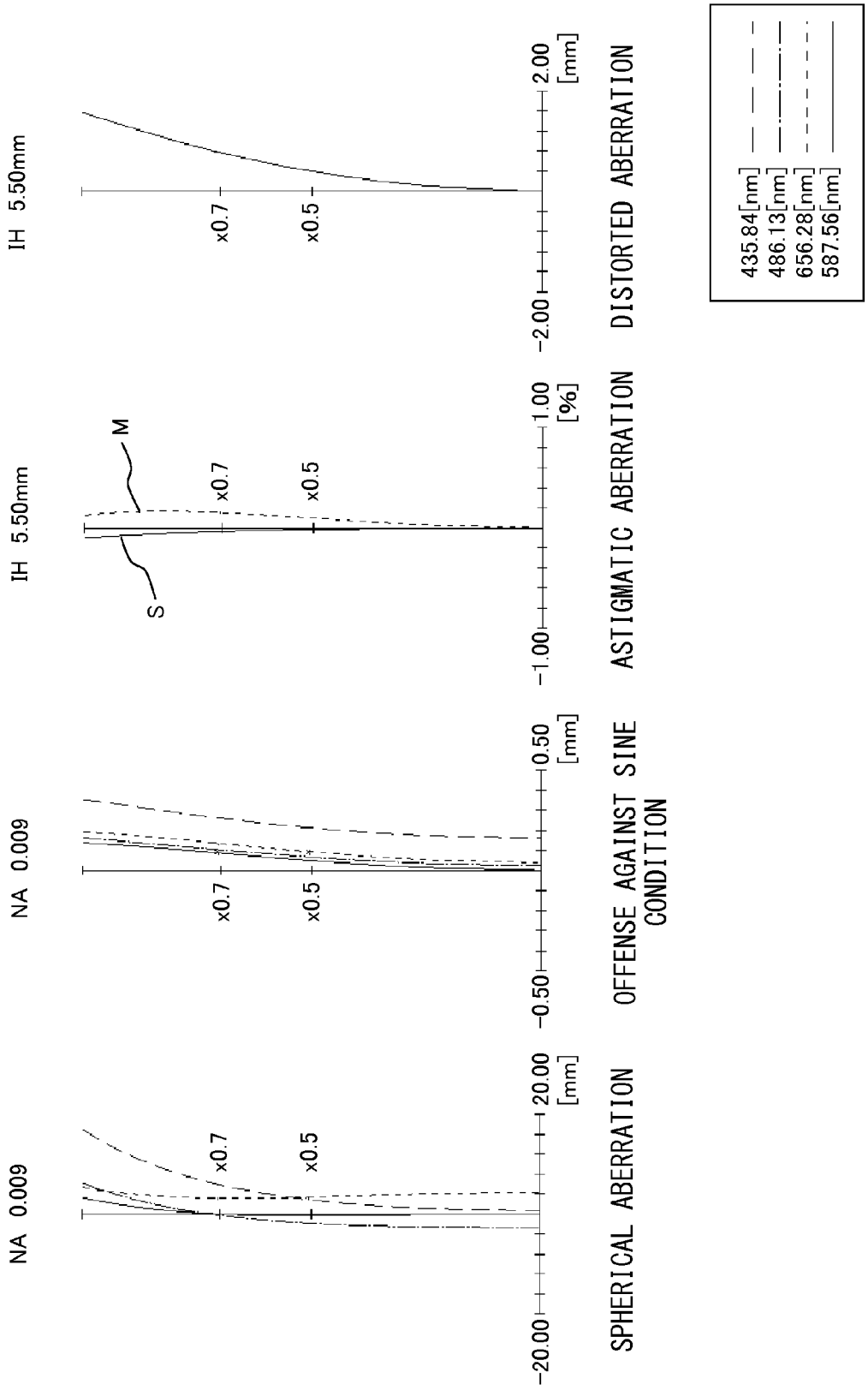
FIG. 3C illustrates an aberration of a zoom image-forming optical system in a high-power end state, which is illustrated in FIG. 2C.

FIGS. 3A, 3B, and 3C are diagrams illustrating aberrations of the zoom image-forming optical system 20 respectively in a low-power end state illustrated in FIG. 2A, an intermediate state illustrated in FIG. 2B, and in a high-power end state illustrated in FIG. 2C, respectively. In FIGS. 3A through 3C, aberrations in the image plane in cases where a parallel luminous flux is incident from an object side are illustrated. Each of FIGS. 3A, 3B, and 3C illustrates a spherical aberration, an offense against the sine condition, an astigmatic aberration, and a distorted aberration, in order from left to right. It is also indicated that the aberrations are precisely corrected in any states. Here, "NA" in FIGS. 3A through 3C indicates the numerical aperture on the image side of the zoom image-forming optical system 20, and "IH" indicates the image height (mm). Moreover, "M" indicates a meridional component, and "S" indicates a sagittal component. Note that similar reference characters will be used in the drawings of the Second through Eighth Embodiments, which will be described later.

<Second Embodiment>

FIGS. 4A through 4C are section views of a zoom image-forming optical system according to the present embodiment. FIG. 4A, FIG. 4B, and FIG. 4C illustrate a low-power end state, an intermediate state, and a high-power end state, respectively. The zoom image-forming optical system 23 illustrated in FIGS. 4A through 4C is used in combination with an infinity-correction objective lens (not illustrated), and the zoom image-forming optical system 23 includes: a tube lens 24 for condensing a luminous flux from the objective lens to form an intermediate image; and a zoom lens 25 with a zoom function for projecting the intermediate image onto an image plane.

The tube lens 24 includes a cemented lens CTL1 having a biconvex lens TL1 and a meniscus lens TL2 whose concavity is oriented toward an object side, and a cemented lens CTL2 having a biconvex lens TL3 and a biconcave lens TL4, in this order from an object side (i.e., objective lens side).

The zoom lens 25 includes a first lens group G1 with positive power, a second lens group G2 that is a movable group with positive power, an aperture stop AS that moves in the direction of an optical axis, a third lens group G3 that is a movable group with positive power, and a fourth lens group G4 with negative power, in this order from the intermediate image formed by the tube lens 24. The zoom lens 25 changes magnification of an image formed on an image plane by moving the second lens group G2 and the third lens group G3 in the direction of an optical axis.

The first lens group G1 includes a cemented lens CL1 having a meniscus lens L1 whose concavity is oriented toward an image side and a biconvex lens L2, and a cemented lens CL2 having a biconvex lens L3 and a biconcave lens L4, in this order from an intermediate image side.

The second lens group G2 is movable in the direction of an optical axis, and includes a cemented lens CL3 having a meniscus lens L5 whose concavity is oriented toward an image side and a biconvex lens L6, in this order from an intermediate image side.

The third lens group G3 is movable in the direction of an optical axis, and includes a cemented lens CL4 having a biconvex lens L7 and a meniscus lens L8 whose concavity is oriented toward an object side, in this order from an intermediate image side.

The fourth lens group G4 includes a biconcave lens L9, a cemented lens CL5 having a biconvex lens L10 and a biconcave lens L11, as well as a cemented lens CL6 having a meniscus lens L12 whose concavity is oriented toward an image side and a biconvex lens L13, in this order from an intermediate image side.

The various kinds of data of the zoom image-forming optical system 23 according to the present embodiment will be described. Note that the reference wavelength is the d Line (587.56 nm).

The focal length $F_{TL}$ of the tube lens 24, the compound focal length $F_{MIN}$ between the tube lens 24 and the zoom lens 25 in a low-power end state, the compound focal length $F_{MAX}$ between the tube lens 24 and the zoom lens 25 in a high-power end state, the distance $L_{PI}$ between an exit pupil position and a primary image-forming position (intermediate image position), the distance $L_{IC}$ between a primary image-forming position and a secondary image-forming position (image plane), and the distance $L_{PC}$ between an exit pupil position and a secondary image-forming position are as follows.

$F_{TL}$=70.004 mm, $F_{MIN}$=−46.3 mm, $F_{MAX}$=−629.7 mm, $L_{PI}$=150.303 mm, $L_{IC}$=185.057 mm, $L_{PC}$=335.359 mm

The stop diameter φ of an aperture stop AS and the pupil diameter φE of an objective lens in a high-power end state which is illustrated in FIG. 4C, are as follows.

φ=5.04 mm, φE=14 mm

The present embodiment relates to an image pickup device having a CCD of ⅔ inch or the like, and having a diagonal length of 11 mm (image height IH=5.5 mm).

The lens data of the zoom image-forming optical system 23 according to the present embodiment is as follows.

| ZOOM IMAGE-FORMING OPTICAL SYSTEM 23 | | | | |
|---|---|---|---|---|
| s | r | d | nd | vd |
| 1 | INF | 80.688 | | |
| 2 | 39.2015 | 6.800 | 1.497 | 81.54 |
| 3 | −20.0397 | 2.250 | 1.72047 | 34.71 |
| 4 | −55.7616 | 0.500 | | |
| 5 | 27.6094 | 6.300 | 1.72342 | 37.95 |
| 6 | −27.6091 | 1.950 | 1.6134 | 44.27 |
| 7 | 16.4468 | 51.815 | | |
| 8 | INF | 13.547 | | |
| 9 | 110.2500 | 1.800 | 1.58913 | 61.14 |
| 10 | 17.1167 | 5.000 | 1.51742 | 52.43 |
| 11 | −37.8129 | 0.500 | | |
| 12 | 110.2300 | 3.500 | 1.80518 | 25.42 |
| 13 | −45.0035 | 2.000 | 1.738 | 32.26 |
| 14 | 50.9481 | D14 | | |
| 15 | 45.5048 | 1.800 | 1.74 | 28.3 |
| 16 | 18.7325 | 4.024 | 1.56883 | 56.36 |
| 17 | −36.6004 | D17 | | |
| 18 | INF | D18 | | |
| 19 | 36.6004 | 4.024 | 1.56883 | 56.36 |
| 20 | −18.7324 | 1.800 | 1.740000 | 28.3 |
| 21 | −45.5048 | D21 | | |
| 22 | −17.2629 | 1.100 | 1.741 | 52.64 |
| 23 | 41.6569 | 2.601 | | |
| 24 | 15.4354 | 2.800 | 1.834 | 37.16 |
| 25 | −10.4843 | 1.100 | 1.741 | 52.64 |
| 26 | 12.3165 | 1.300 | | |
| 27 | 97.1448 | 1.100 | 1.720470 | 34.71 |
| 28 | 17.7228 | 2.500 | 1.487490 | 70.23 |
| 29 | −14.0024 | 44.908 | | |
| 30 | INF | | | |

Here, "s" indicates a plane number, and "r" indicates a radius of curvature (mm). Moreover, "d" indicates a lens plane interval (mm), "nd" indicates an index of refraction for the d Line, and "vd" indicates an Abbe number. The planes indicated by plane numbers s1, s8, s18, and s30 indicate the exit pupil position of an objective lens, a primary image (intermediate image) position, a pupil conjugate position, and an image plane, respectively. A lens plane interval d1 indicates the distance from an exit pupil position (plane number s1) to a first plane (plane number s2) that is closest to the object lens of the tube lens 24. A lens plane interval d29 indicates the distance from the last plane (plane number s29) of the zoom lens 25 to the image plane (plane number s30). Lens plane intervals d14, d17, d18, and d21 are variables D14, D17, D18, and D21, which vary according to the zoom operation of the zoom lens 25, and they respectively indicate the distance between the first lens group G1 and the second lens group G2, the distance between the second lens group G2 and the aperture stop AS, the distance between the aperture stop AS and the third lens group G3, and the distance between the third lens group G3 and the fourth lens group G4.

The compound focal lengths of the tube lens 24 and the zoom lens 25 in a low-power end state illustrated in FIG. 4A, an intermediate state illustrated in FIG. 4B, and in a high-power end state illustrated in FIG. 4C, that is, the focal lengths (mm) of the zoom image-forming optical system 23 and the lens plane intervals (mm) of variables in the respective states, are as follows.

FOCAL LENGTH AND LENS PLANE INTERVAL OF ZOOM
IMAGE-FORMING OPTICAL SYSTEM 23

| STATE | HIGH-POWER END | INTERMEDIATE | LOW-POWER END |
|---|---|---|---|
| FOCAL LENGTH | −629.7 | −110.5 | −46.3 |
| D14 | 2.424 | 43.530 | 83.838 |
| D17 | 1.000 | 20.000 | 1.000 |
| D18 | 1.000 | 20.450 | 1.157 |
| D21 | 85.232 | 5.676 | 3.660 |

The zoom image-forming optical system 23 according to the present embodiment satisfies conditional expressions (1) through (6) as expressed in expressions (21) through (26) below. The expressions (21) through (26) correspond to the conditional expressions (1) through (6), respectively. Note that the $vd_{TLP}$ and the $nd_{TLP}$ of the expression (26) are an Abbe number and an index of refraction for the d Line of a biconvex lens TL1, respectively.

$$F_{TL}/F_{MIN} = -1.51 \quad (21)$$

$$F_{TL}/F_{MAX} = -0.11 \quad (22)$$

$$\phi E/L_{PI} = 0.09 \quad (23)$$

$$L_{PC}/F_{MIN} = -7.24 \quad (24)$$

$$L_{PC}/F_{MAX} = -0.53 \quad (25)$$

$$v\,d_{TLP} * nd_{TLP} = 122.1 \quad (26)$$

Figure 5A:
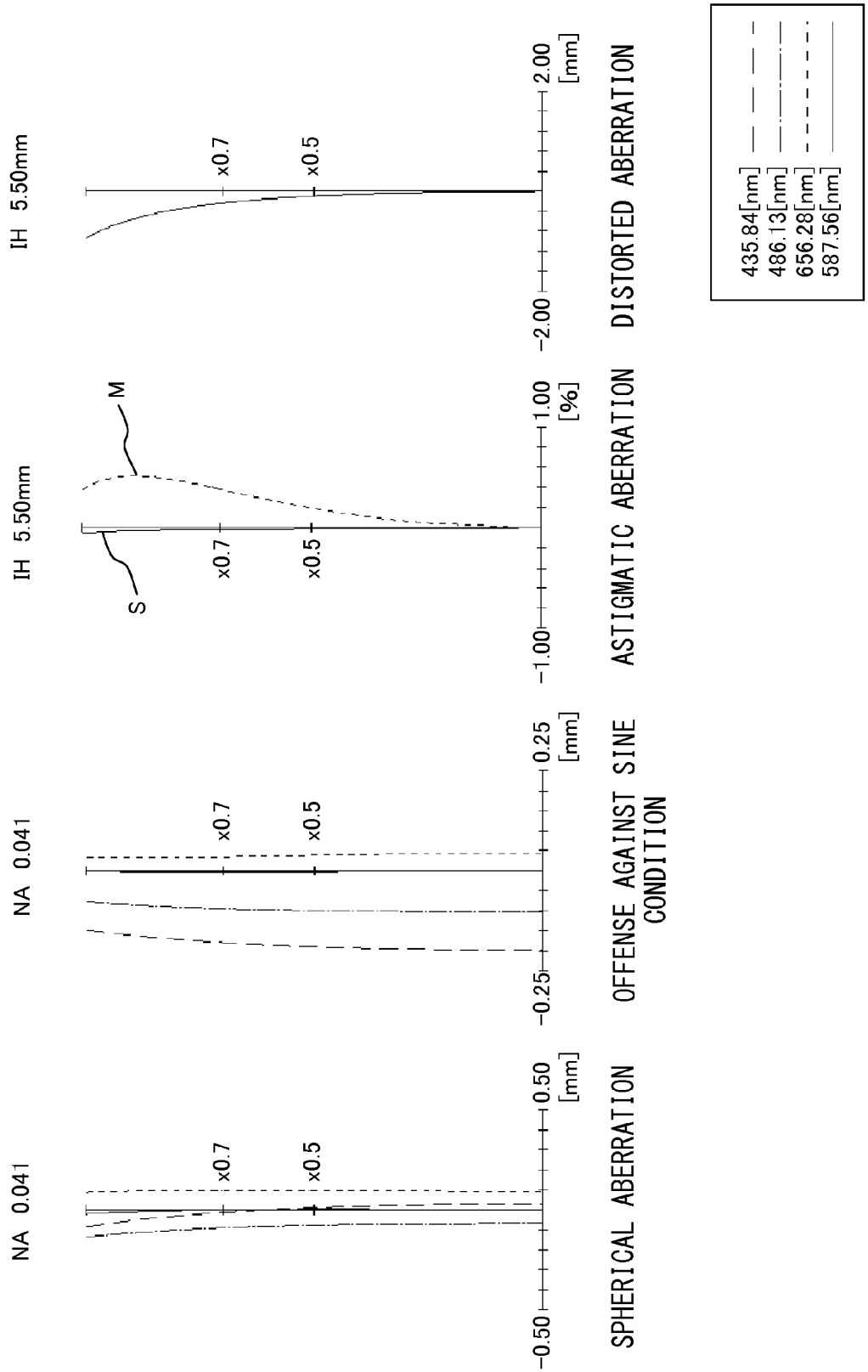
FIG. 5A illustrates an aberration of a zoom image-forming optical system in a low-power end state, which is illustrated in FIG. 4A.
Figure 5B:
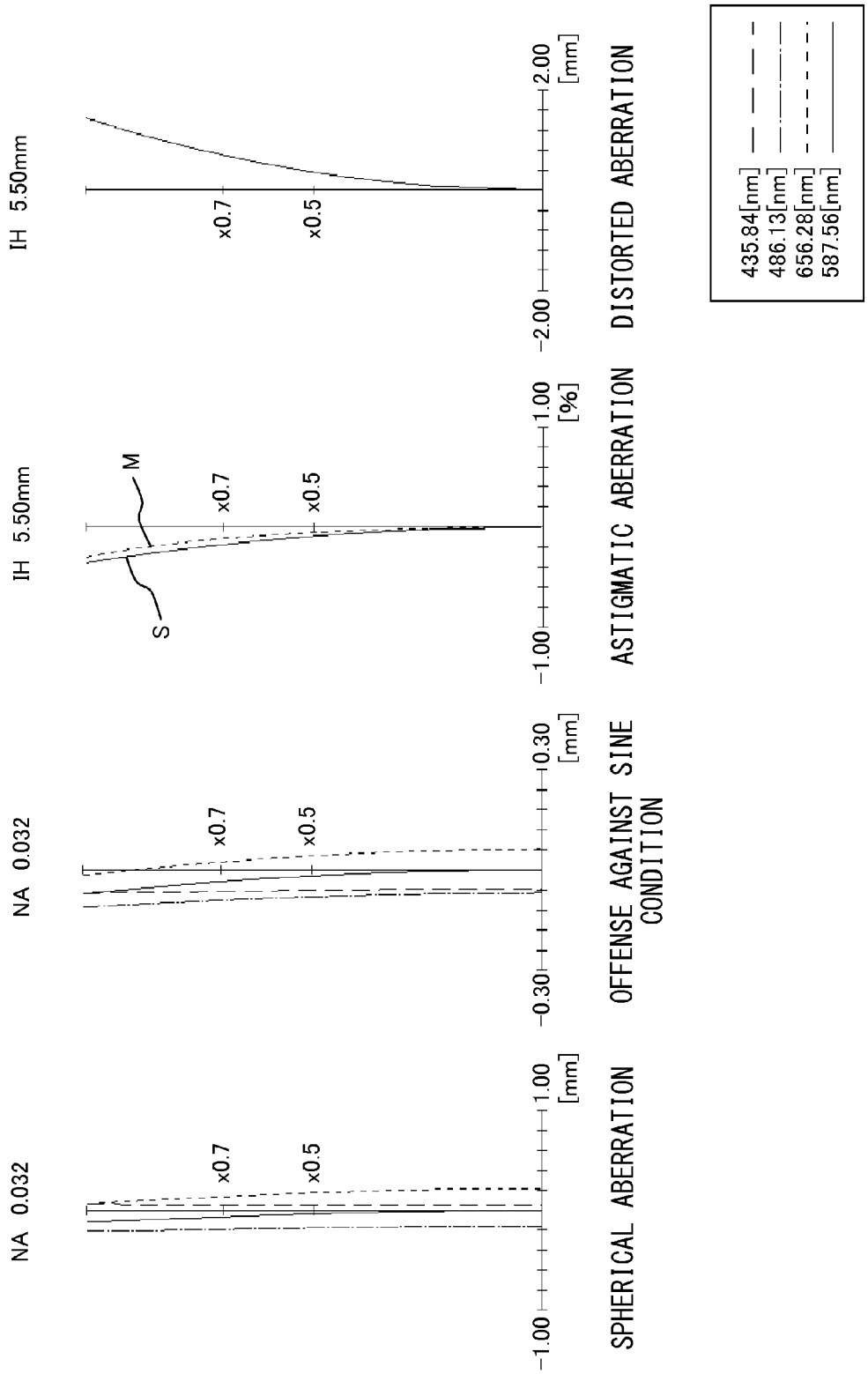
FIG. 5B illustrates an aberration of a zoom image-forming optical system in an intermediate state, which is illustrated in FIG. 4B.
Figure 5C:
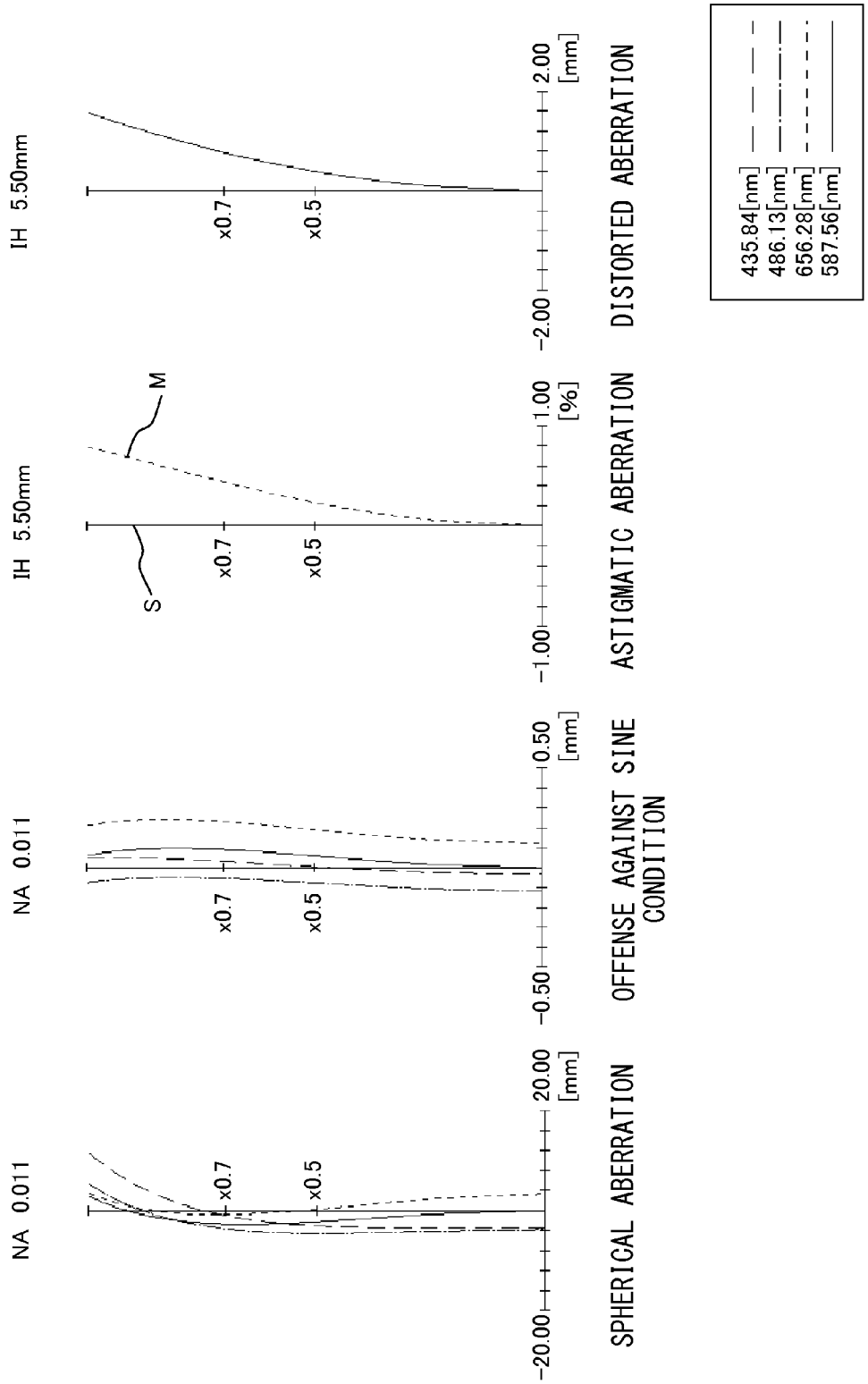
FIG. 5C illustrates an aberration of a zoom image-forming optical system in a high-power end state, which is illustrated in FIG. 4C.

FIGS. 5A, 5B, and 5C are diagrams illustrating aberrations of the zoom image-forming optical system 23 in a low-power end state illustrated in FIG. 4A, an intermediate state illustrated in FIG. 4B, and in a high-power end state illustrated in FIG. 4C, respectively. In 5A, 5B, and 5C, aberrations in the image plane in cases where a parallel luminous flux is incident from an object side are illustrated. FIGS. 5A, 5B, and 5C illustrate a spherical aberration, an offense against the sine condition, an astigmatic aberration, and a distorted aberration, respectively, in order from left to right. It is also indicated that the aberrations are precisely corrected in any state.

<Third Embodiment>

FIGS. 6A through 6C are section views of a zoom image-forming optical system according to the present embodiment. FIG. 6A, FIG. 6B, and FIG. 6C illustrate a low-power end state, an intermediate state, and a high-power end state, respectively. The zoom image-forming optical system 26 illustrated in FIGS. 6A through 6C is used in combination with an infinity-correction objective lens (not illustrated), and the zoom image-forming optical system 26 includes: a tube lens 27 for condensing a luminous flux from the objective lens to form an intermediate image; and a zoom lens 28 with a zoom function for projecting the intermediate image onto an image plane.

The tube lens 27 includes a cemented lens CTL1 having a biconvex lens TL1 and a meniscus lens TL2 whose concavity is oriented toward an object side, and a cemented lens CTL2 having a biconvex lens TL3 and a biconcave lens TL4, in this order from an object side (i.e., objective lens side).

The zoom lens 28 includes a first lens group G1 with positive power, a second lens group G2 that is a movable group with positive power, an aperture stop AS that moves in the direction of an optical axis, a third lens group G3 that is a movable group with positive power, and a fourth lens group G4 with negative power, in this order from the intermediate image formed by the tube lens 27. The zoom lens 28 change magnification of an image formed on an image plane by moving the second lens group G2 and the third lens group G3 in the direction of an optical axis.

The first lens group G1 includes a biconvex lens L1 and a biconcave lens L2 in this order from an intermediate image side. The second lens group G2 is movable in the direction of an optical axis, and includes a cemented lens CL1 having a meniscus lens L3 whose concavity is oriented toward an image side and a biconvex lens L4, in this order from an intermediate image side. The second lens group G3 is movable in the direction of an optical axis, and includes a cemented lens CL2 having a biconvex lens L5 and a meniscus lens L6 whose concavity is oriented toward an object side, in this order from an intermediate image side. The fourth lens group G4 includes a biconcave lens L7.

The various kinds of data of the zoom image-forming optical system 26 according to the present embodiment will be described. Note that the reference wavelength is the d Line (587.56 nm).

The focal length $F_{TL}$ of the tube lens 27, the compound focal length $F_{MIN}$ between the tube lens 27 and the zoom lens 28 in a low-power end state, the compound focal length $F_{MAX}$ between the tube lens 27 and the zoom lens 28 in a high-power end state, the distance $L_{PI}$ between an exit pupil position and a primary image-forming position (intermediate image position), the distance $L_{IC}$ between a primary image-forming position and a secondary image-forming position (image plane), and the distance $L_{PC}$ between an exit pupil position and a secondary image-forming position are as follows.

$F_{TL}$=39.620 mm, $F_{MIN}$=−31.6 mm, $F_{MAX}$=−427.9 mm, $L_{PI}$=85.035 mm, $L_{IC}$=164.566 mm, $L_{PC}$=249.600 mm

The stop diameter $\phi$ of an aperture stop AS and the pupil diameter $\phi E$ of an objective lens in a high-power end state which is illustrated in FIG. 6C are as follows.

$\phi$=6.8 mm, $\phi E$=10 mm

The present embodiment relates to an image pickup device having a CCD of 1/1.8 inch or the like, and a diagonal length of 9 mm (image height IH=4.5 mm).

The lens data of the zoom image-forming optical system 26 according to the present embodiment is as follows.

ZOOM IMAGE-FORMING OPTICAL SYSTEM 26

| s | r | d | nd | vd |
|---|---|---|---|---|
| 1 | INF | 43.618 | | |
| 2 | 23.1996 | 4.000 | 1.497 | 81.54 |
| 3 | −15.2584 | 1.778 | 1.72047 | 34.71 |
| 4 | −36.5514 | 0.222 | | |
| 5 | 24.7824 | 4.000 | 1.72342 | 37.95 |
| 6 | −111.6879 | 1.556 | 1.6134 | 44.27 |
| 7 | 16.0979 | 29.861 | | |
| 8 | INF | 17.898 | | |
| 9 | 86.2150 | 4.500 | 1.57135 | 52.95 |
| 10 | −15.7764 | 1.500 | | |
| 11 | −23.7549 | 2.000 | 1.48749 | 70.23 |
| 12 | 28.5793 | D12 | | |
| 13 | 45.5042 | 1.800 | 1.74 | 28.28 |
| 14 | 19.7410 | 4.000 | 1.55963 | 61.17 |
| 15 | −36.0087 | D15 | | |
| 16 | INF | D16 | | |
| 17 | 36.0081 | 4.000 | 1.55963 | 61.17 |
| 18 | −19.7405 | 1.800 | 1.74 | 28.28 |
| 19 | −45.5049 | D19 | | |
| 20 | −29.9530 | 1.830 | 1.755000 | 52.32 |
| 21 | 16.1386 | 23.130 | | |
| 22 | INF | | | |

Here, "s" indicates a plane number and "r" indicates a radius of curvature (mm). Moreover, "d" indicates a lens plane interval (mm), "nd" indicates an index of refraction for the d Line, and "vd" indicates an Abbe number. The planes indicated by plane numbers s1, s8, s16, and s22 indicate the exit pupil position of an objective lens, a primary image (intermediate image) position, a pupil conjugate position, and an image plane, respectively. A lens plane interval d1 indicates the distance from an exit pupil position (plane number s1) to a first plane (plane number s2) that is closest to the object lens of the tube lens 27. A lens plane interval d21 indicates the distance from the last plane (plane number s21) of the zoom lens 28 to the image plane (plane number s22). Lens plane intervals d12, d15, d16, and d19 are variables D12, D15, D16, and D19, which vary according to the zoom operation of the zoom lens 28, and they respectively indicate the distance between the first lens group G1 and the second lens group G2, the distance between the second lens group G2 and the aperture stop AS, the distance between the aperture stop AS and the third lens group G3, and the distance between the third lens group G3 and the fourth lens group G4.

The compound focal lengths of the tube lens 27 and the zoom lens 28 in a low-power end state illustrated in FIG. 6A, an intermediate state illustrated in FIG. 6B, and in a high-power end state illustrated in FIG. 6C, that is, the focal lengths (mm) of the zoom image-forming optical system 26 and the lens plane intervals (mm) of variables in the respective states, are as follows.

| FOCAL LENGTH AND LENS PLANE INTERVAL OF ZOOM IMAGE-FORMING OPTICAL SYSTEM 26 | | | |
| --- | --- | --- | --- |
| STATE | HIGH-POWER END | INTERMEDIATE | LOW-POWER END |
| FOCAL LENGTH | −427.9 | −75.6 | −31.6 |
| D12 | 2.424 | 43.530 | 83.838 |
| D15 | 1.000 | 20.000 | 1.000 |
| D16 | 1.000 | 20.450 | 1.157 |
| D19 | 97.679 | 18.123 | 16.107 |

The zoom image-forming optical system 26 according to the present embodiment satisfies conditional expressions (1) through (6) as expressed in expressions (31) through (36) below. The expressions (31) through (36) correspond to the conditional expressions (1) through (6), respectively. Note that the ν $d_{TLP}$ and the $nd_{TLP}$ of the expression (36) are an Abbe number and an index of refraction for the d Line of a biconvex lens TL1, respectively.

$$F_{TL}/F_{MIN} = -1.25 \quad (31)$$

$$F_{TL}/F_{MAX} = -0.09 \quad (32)$$

$$\phi E/L_{PI} = 0.12 \quad (33)$$

$$L_{PC}/F_{MIN} = -7.91 \quad (34)$$

$$L_{PC}/F_{MAX} = -0.58 \quad (35)$$

$$\nu\, d_{TLP} * nd_{TLP} = 122.1 \quad (36)$$

Figure 7A:
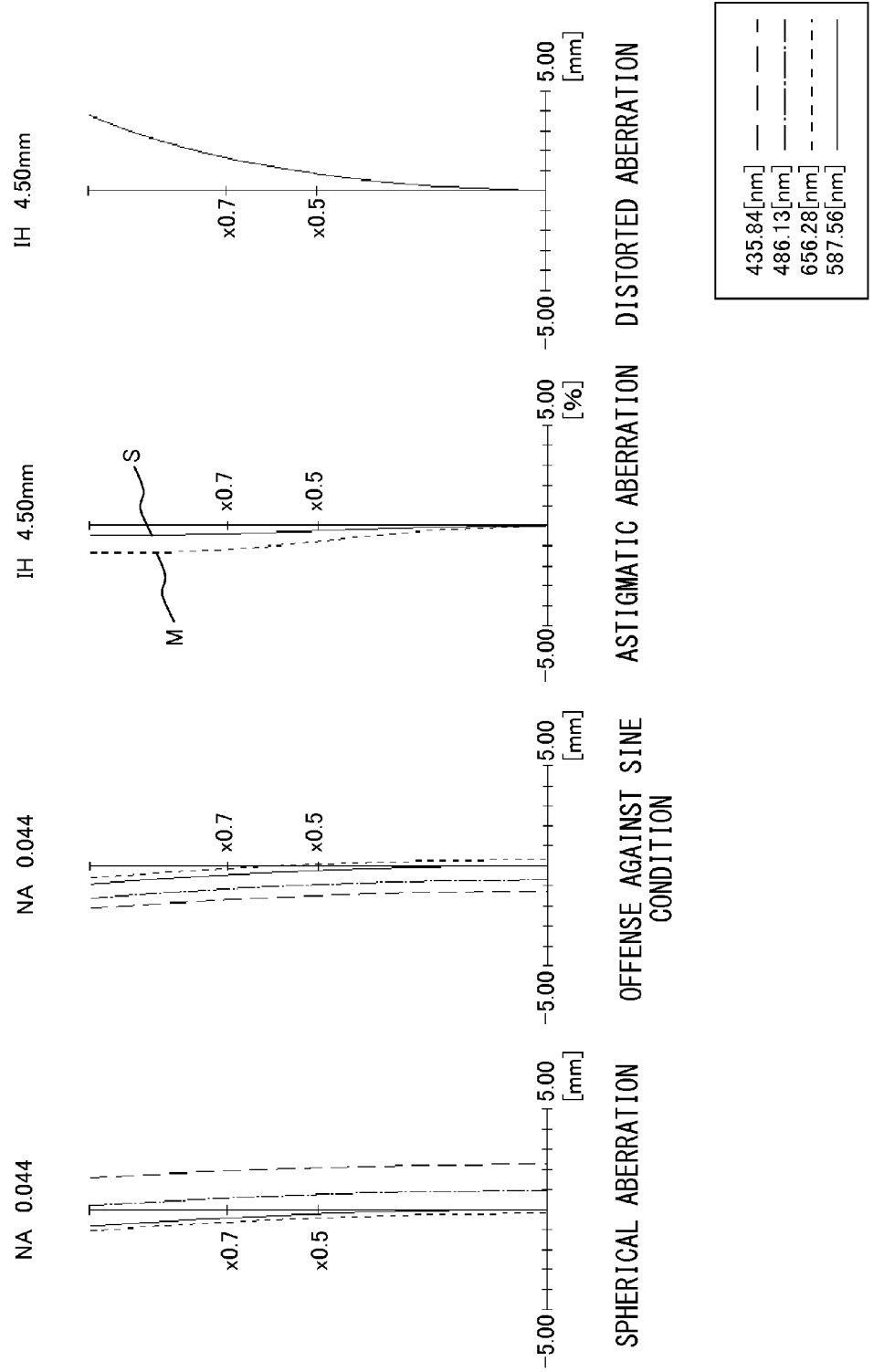
FIG. 7A illustrates an aberration of a zoom image-forming optical system in a low-power end state, which is illustrated in FIG. 6A.
Figure 7B:
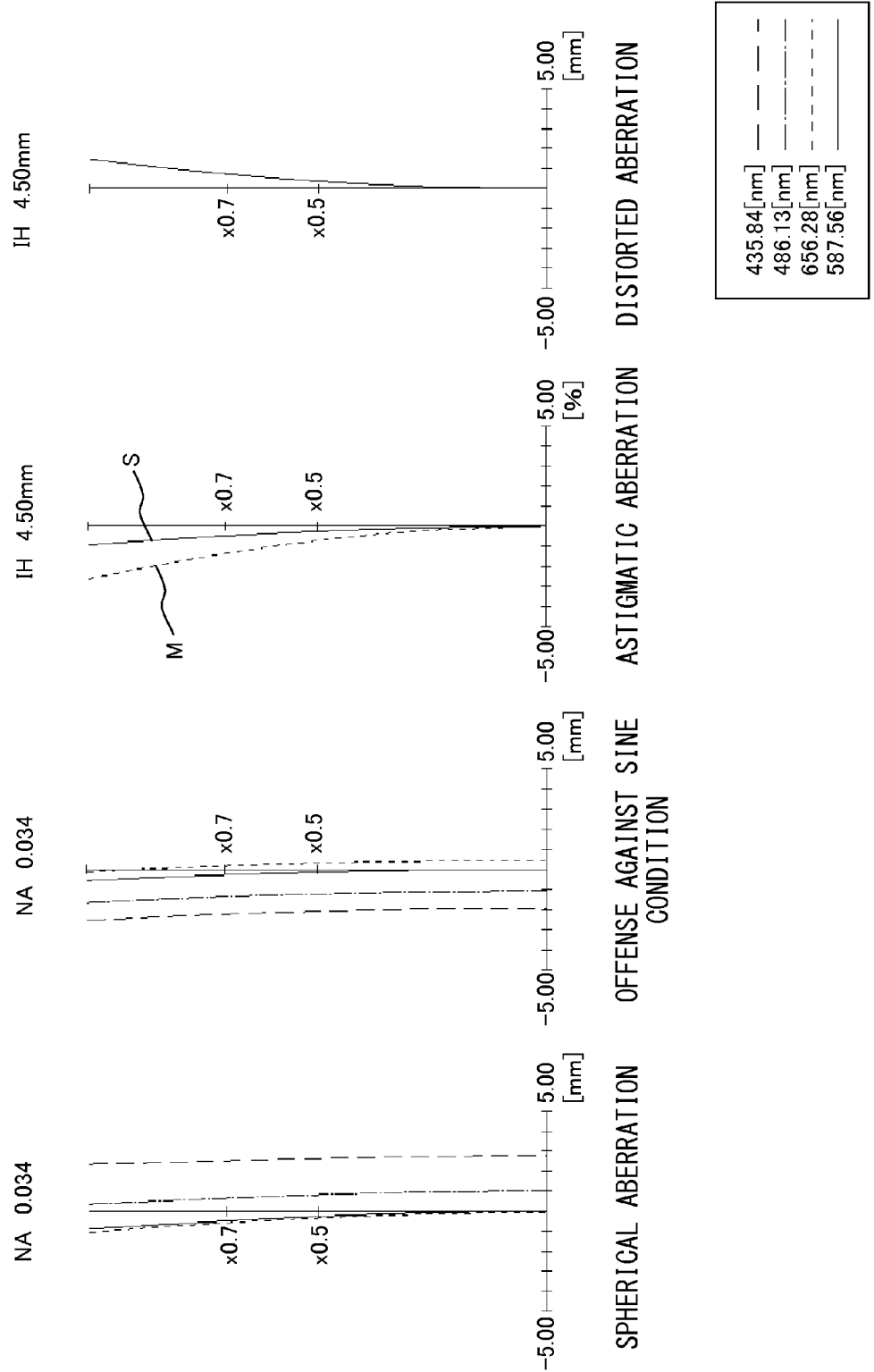
FIG. 7B illustrates an aberration of a zoom image-forming optical system in an intermediate state, which is illustrated in FIG. 6B.

FIGS. 7A, 7B, and 7C are diagrams illustrating aberrations of the zoom image-forming optical system 26 in a low-power end state illustrated in FIG. 6A, an intermediate state illustrated in FIG. 6B, and in a high-power end state illustrated in FIG. 6C, respectively. In FIGS. 7A, 7B, and 7C, aberrations in the image plane in cases where a parallel luminous flux is incident from an object side are illustrated. FIGS. 7A, 7B, and 7C illustrate a spherical aberration, an offense against the sine condition, an astigmatic aberration, and a distorted aberration, respectively, in order from left to right. It is also indicated that the aberrations are precisely corrected in any states.

<Fourth Embodiment>

FIGS. 8A through 8C are section views of a zoom image-forming optical system according to the present embodiment. FIG. 8A, FIG. 8B, and FIG. 8C illustrate a low-power end state, an intermediate state, and a high-power end state, respectively. The zoom image-forming optical system 29 illustrated in FIGS. 8A through 8C is used in combination with an infinity-correction objective lens (not illustrated), and the zoom image-forming optical system 29 includes: a tube lens 30 for condensing a luminous flux from the objective lens to form an intermediate image and a zoom lens 31 with a zoom function for projecting the intermediate image onto an image plane.

The tube lens 30 includes a cemented lens CTL1 having a biconvex lens TL1 and a meniscus lens TL2 whose concavity is oriented toward an object side, and a cemented lens CTL2 having a biconvex lens TL3 and a biconcave lens TL4, in this order from an object side (i.e., objective lens side).

The zoom lens 31 includes a first lens group G1 with positive power, a second lens group G2 that is a movable group with positive power, an aperture stop AS that moves in the direction of an optical axis, a third lens group G3 that is a movable group with positive power, and a fourth lens group G4 with negative power, in this order from the intermediate image formed by the tube lens 30. The zoom lens 31 changes magnification of an image formed on an image plane by moving the second lens group G2 and the third lens group G3 in the direction of an optical axis.

The first lens group G1 includes a cemented lens CL1 having a meniscus lens L1 whose concavity is oriented toward an image side and a meniscus lens L2 whose concavity is oriented toward an image side, and a meniscus lens L3 whose concavity is oriented toward an image side.

The second lens group G2 is movable in the direction of an optical axis, and includes a cemented lens CL2 having a biconvex lens L4 and a meniscus lens L5 whose concavity is oriented toward an object side, in this order from an intermediate image side.

The second lens group G3 is movable in the direction of an optical axis, and includes a cemented lens CL3 having a biconvex lens L6 and a biconcave lens L7 in this order from an intermediate image side.

The fourth lens group G4 includes a cemented lens CL4 having a meniscus lens L8 whose concavity is oriented toward an object side and a biconcave lens L9, a cemented lens CL5 having a biconvex lens L10 and a meniscus lens L11 whose concavity is oriented toward an object side, and a cemented lens CL6 having a meniscus lens L12 whose concavity is oriented toward an object side and a biconcave lens L13.

The various kinds of data of the zoom image-forming optical system 29 according to the present embodiment will be described. Note that the reference wavelength is the d Line (587.56 nm).

The focal length $F_{TL}$ of the tube lens 30, the compound focal length $F_{MIN}$ between the tube lens 30 and the zoom lens 31 in a low-power end state, the compound focal length $F_{MAX}$ between the tube lens 30 and the zoom lens 31 in a high-power end state, the distance $L_{PI}$ between an exit pupil position and a primary image-forming position (intermediate image position), the distance $L_{IC}$ between a primary image-forming position and a secondary image-forming position (image plane), and the distance $L_{PC}$ between an exit pupil position and a secondary image-forming position are as follows.

$F_{TL}$=60.058 mm, $F_{MIN}$=−42.4 mm, $F_{MAX}$=−670.7 mm, $L_{PI}$=106.060 mm, $L_{IC}$=181.528 mm, $L_{PC}$=287.588 mm

The stop diameter φ of an aperture stop AS and the pupil diameter φE of an objective lens in a high-power end state which is illustrated in FIG. 8C, are as follows.

φ=6.4 mm, φE=15 mm

The present embodiment relates to an image pickup device having a CCD of 1/1.8 inch or the like, and a diagonal length of 9 mm (image height IH=4.5 mm).

The lens data of the zoom image-forming optical system 29 according to the present embodiment is as follows.

ZOOM IMAGE-FORMING OPTICAL SYSTEM 29

| s | r | d | nd | vd |
|---|---|---|---|---|
| 1 | INF | 43.845 | | |
| 2 | 37.2830 | 9.000 | 1.497 | 81.54 |
| 3 | −18.6967 | 3.111 | 1.72047 | 34.71 |
| 4 | −49.6206 | 0.389 | | |
| 5 | 27.7522 | 9.000 | 1.72342 | 37.95 |
| 6 | −25.4867 | 2.722 | 1.6134 | 44.27 |
| 7 | 15.0818 | 37.993 | | |
| 8 | INF | 17.409 | | |
| 9 | 15.3564 | 4.500 | 1.834 | 37.16 |
| 10 | 23.7809 | 3.000 | 1.6134 | 44.27 |
| 11 | 12.5082 | 2.300 | | |
| 12 | 40.6731 | 2.000 | 1.51633 | 64.14 |
| 13 | 160.6160 | D13 | | |
| 14 | 108.2635 | 3.000 | 1.883 | 40.76 |
| 15 | −17.2113 | 1.500 | 1.738 | 32.26 |
| 16 | −123.4327 | D16 | | |
| 17 | INF | D17 | | |
| 18 | 23.8516 | 5.007 | 1.834000 | 37.16 |
| 19 | −39.1201 | 1.500 | 1.922860 | 18.9 |
| 20 | 76.4049 | D20 | | |
| 21 | −49.7226 | 2.700 | 1.805180 | 25.42 |
| 22 | −18.3531 | 2.000 | 1.677900 | 55.34 |
| 23 | 6.953 | 3.000 | | |
| 24 | 23.6499 | 3.000 | 1.438750 | 94.93 |
| 25 | −13.999 | 2.000 | 1.846660 | 23.78 |
| 26 | −30.1343 | 1.000 | | |
| 27 | −1320.279 | 4.000 | 1.834000 | 37.16 |
| 28 | −9.2895 | 2.000 | 1.487490 | 70.23 |
| 29 | 58.5085 | 22.000 | | |
| 30 | INF | | | |

Here, "s" indicates a plane number and "r" indicates a radius of curvature (mm). Moreover, "d" indicates a lens plane interval (mm), "nd" indicates an index of refraction for the d Line, and "vd" indicates an Abbe number. The planes indicated by plane numbers s1, s8, s17, and s30 indicate the exit pupil position of an objective lens, a primary image (intermediate image) position, a pupil conjugate position, and an image plane, respectively. A lens plane interval d1 indicates the distance from an exit pupil position (plane number s1) to a first plane (plane number s2) that is closest to the object lens of the tube lens 30. A lens plane interval d29 indicates the distance from the last plane (plane number s29) of the zoom lens 31 to the image plane (plane number s30). Lens plane intervals d13, d16, d17, and d20 are variables D13, D16, D17, and D20, which vary according to the zoom operation of the zoom lens 31, and they respectively indicate the distance between the first lens group G1 and the second lens group G2, the distance between the second lens group G2 and the aperture stop AS, the distance between the aperture stop AS and the third lens group G3, and the distance between the third lens group G3 and the fourth lens group G4.

The compound focal lengths of the tube lens 30 and the zoom lens 31 in a low-power end state illustrated in FIG. 8A, an intermediate state illustrated in FIG. 8B, and in a high-power end state illustrated in FIG. 8C, that is, the focal lengths (mm) of the zoom image-forming optical system 29 and the lens plane intervals (mm) of variables in the respective states, are as follows.

FOCAL LENGTH AND LENS PLANE INTERVAL OF ZOOM IMAGE-FORMING OPTICAL SYSTEM 29

| STATE | HIGH-POWER END | INTERMEDIATE | LOW-POWER END |
|---|---|---|---|
| FOCAL LENGTH | −670.7 | −110.0 | −42.4 |
| D13 | 2.795 | 43.530 | 83.838 |
| D16 | 1.000 | 20.000 | 1.000 |
| D17 | 1.000 | 24.820 | 1.157 |
| D20 | 95.77 | 12.214 | 10.569 |

The zoom image-forming optical system 29 according to the present embodiment satisfies conditional expressions (1) through (6) as expressed in expressions (41) through (46) below. The expressions (41) through (46) correspond to the conditional expressions (1) through (6), respectively. Note that the $\nu\,d_{TLP}$ and the $nd_{TLP}$ of the expression (46) are an Abbe number and an index of refraction for the d Line of a biconvex lens TL1, respectively.

$$F_{TL}/F_{MIN}=-1.42 \tag{41}$$

$$F_{TL}/F_{MAX}=-0.09 \tag{42}$$

$$\phi E/L_{PI}=0.14 \tag{43}$$

$$L_{PC}/F_{MIN}=-6.78 \tag{44}$$

$$L_{PC}/F_{MAX}=-0.43 \tag{45}$$

$$\nu\,d_{TLP}*nd_{TLP}=122.1 \tag{46}$$

Figure 9A:
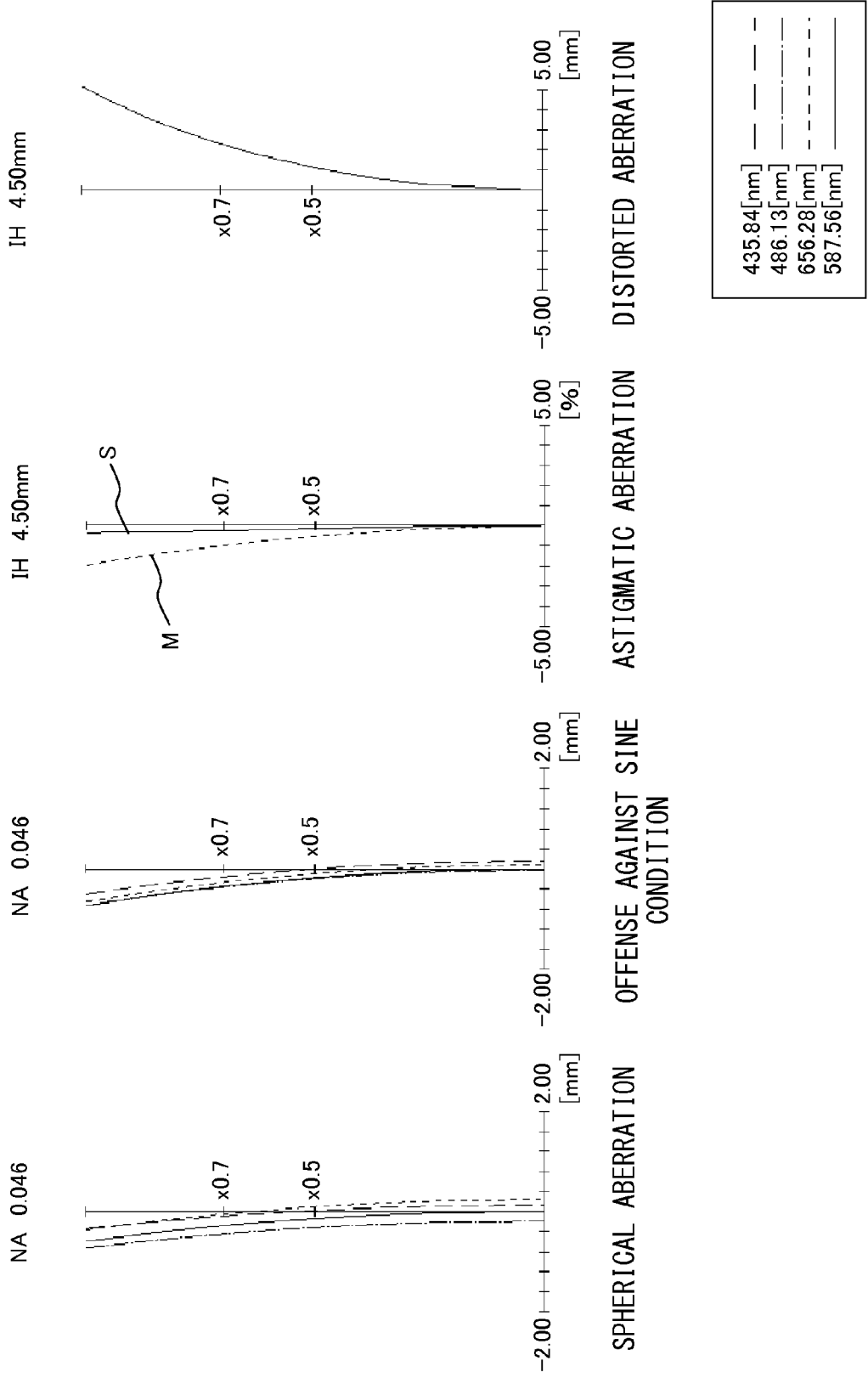
FIG. 9A illustrates an aberration of a zoom image-forming optical system in a low-power end state, which is illustrated in FIG. 8A.
Figure 9B:
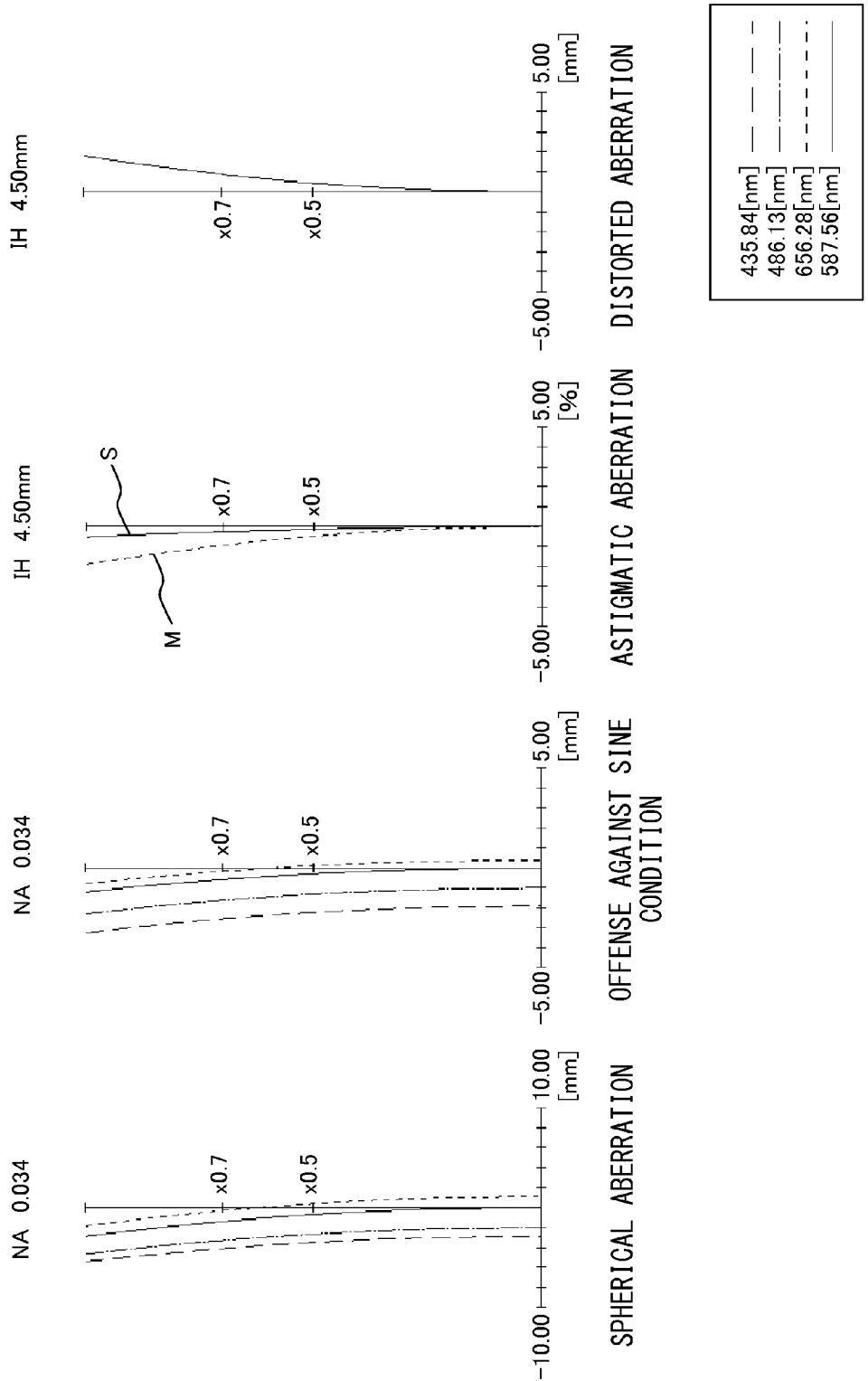
FIG. 9B illustrates an aberration of a zoom image-forming optical system in an intermediate state, which is illustrated in FIG. 8B.
Figure 9C:
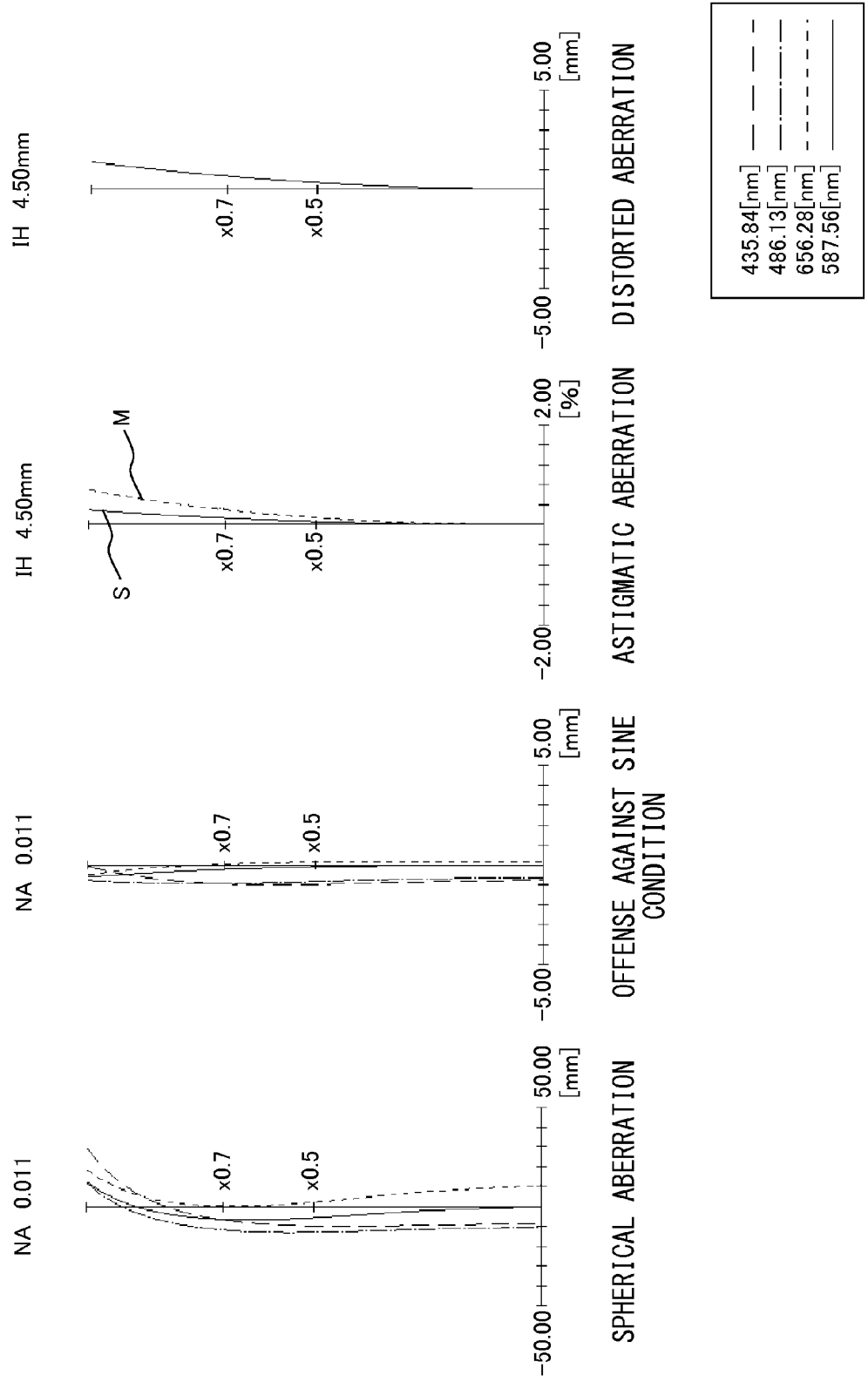
FIG. 9C illustrates an aberration of a zoom image-forming optical system in a high-power end state, which is illustrated in FIG. 8C.

FIGS. 9A, 9B, and 9C are diagrams illustrating aberrations of the zoom image-forming optical system 29 in a low-power end state illustrated in FIG. 8A, an intermediate state illustrated in FIG. 8B, and in a high-power end state illustrated in FIG. 8C, respectively. In FIGS. 9A, 9B, and 9C, aberrations in the image plane in cases where a parallel luminous flux is incident from an object side are illustrated. FIGS. 9A, 9B, and 9C illustrate a spherical aberration, an offense against the sine condition, an astigmatic aberration, and a distorted aberration, respectively, in order from left to right. It is also indicated that the aberrations are precisely corrected in any state.

<Fifth Embodiment>

FIGS. 10A through 10C are section views of a zoom image-forming optical system according to the present embodiment. FIG. 10A, FIG. 10B, and FIG. 10C illustrate a low-power end state, an intermediate state, and a high-power end state, respectively. The zoom image-forming optical system 32 illustrated in FIGS. 10A through 10C is used in combination with an infinity-correction objective lens (not illustrated), and the zoom image-forming optical system 32 includes: a tube lens 33 for condensing a luminous flux from the objective lens to form a intermediate image; and a zoom lens 34 with a zoom function for projecting the intermediate image onto an image plane.

The tube lens 33 includes a cemented lens CTL1 having a biconvex lens TL1 and a meniscus lens TL2 whose concavity is oriented toward an object side, and a cemented lens CTL2 having a biconvex lens TL3 and a biconcave lens TL4, in this order from an object side (i.e., objective lens side).

The zoom lens 34 includes a first lens group G1 with positive power, a second lens group G2 that is a movable group with positive power, an aperture stop AS that moves in the direction of an optical axis, a third lens group G3 that is a movable group with positive power, and a fourth lens group G4 with negative power, in this order from the intermediate image formed by the tube lens 33. The zoom lens 34 changes magnification of an image formed on an image plane by moving the second lens group G2 and the third lens group G3 in the direction of an optical axis.

The first lens group G1 includes a meniscus lens L1 whose concavity is oriented toward an object side, a cemented lens CL1 having a meniscus lens L2 whose concavity is oriented toward an image side and a meniscus lens L3 whose concavity is oriented toward an image side, as well as a meniscus lens L4 whose concavity is oriented toward an image side, in this order from an intermediate image side.

The second lens group G2 is movable in the direction of an optical axis, and includes a cemented lens CL2 having a biconvex lens L5 and a meniscus lens L6 whose concavity is oriented toward an object side, in this order from an intermediate image side.

The third lens group G3 is movable in the direction of an optical axis, and includes a cemented lens CL3 having a biconvex lens L7 and a biconcave lens L8, in this order from an intermediate image side.

The fourth lens group G4 includes a cemented lens CL4 having a biconcave lens L9 and a meniscus lens L10 whose concavity is oriented toward an image side, a cemented lens CL5 having a biconcave lens L11 and a biconvex lens L12, and a cemented lens CL6 having a biconcave lens L13 and a biconvex lens L14.

The various kinds of data of the zoom image-forming optical system 32 according to the present embodiment will be described. Note that the reference wavelength is the d Line (587.56 nm).

The focal length $F_{TL}$ of the tube lens 33, the compound focal length $F_{MIN}$ between the tube lens 33 and the zoom lens 34 in a low-power end state, the compound focal length $F_{MAX}$ between the tube lens 33 and the zoom lens 34 in a high-power end state, the distance $L_{PI}$ between an exit pupil position and a primary image-forming position (intermediate image position), the distance $L_{IC}$ between a primary image-forming position and a secondary image-forming position (image plane), and the distance $L_{PC}$ between an exit pupil position and a secondary image-forming position are as follows.

$F_{TL}$=59.929 mm, $F_{MIN}$=−41.1 mm, $F_{MAX}$=−657.3 mm, $L_{PI}$=102.732 mm, $L_{IC}$=192.103 mm, $L_{PC}$=294.834 mm

The stop diameter φ of an aperture stop AS and the pupil diameter φE of an objective lens in a high-power end state which is illustrated in FIG. 10C, are as follows.

φ=6.8 mm, φE=15 mm

The present embodiment relates to an image pickup device of a CCD of ⅔ inch or the like, and in which the diagonal length is 11 mm (image height IH=5.5 mm).

The lens data of the zoom image-forming optical system 32 according to the present embodiment is as follows.

ZOOM IMAGE-FORMING OPTICAL SYSTEM 32

| s | r | d | nd | vd |
|---|---|---|---|---|
| 1 | INF | 40.604 | | |
| 2 | 40.6967 | 7.619 | 1.497 | 81.54 |
| 3 | −18.8690 | 3.108 | 1.738 | 32.26 |
| 4 | −44.6316 | 0.389 | | |
| 5 | 26.9382 | 7.442 | 1.72342 | 37.95 |
| 6 | −28.0297 | 2.724 | 1.6134 | 44.27 |
| 7 | 15.4708 | 40.846 | | |
| 8 | INF | 14.500 | | |
| 9 | −226.5379 | 3.000 | 1.48749 | 70.23 |
| 10 | −27.0530 | 0.500 | | |
| 11 | 118.4971 | 2.814 | 1.72047 | 34.71 |
| 12 | 13.0007 | 4.136 | 1.48749 | 70.23 |
| 13 | 292.2744 | 0.5 | | |
| 14 | 15.3476 | 8.273 | 1.741 | 52.64 |
| 15 | 16.2906 | D15 | | |
| 16 | 115.0134 | 4 | 1.83481 | 42.71 |
| 17 | −19.9429 | 2.629 | 51.74 | 28.3 |
| 18 | −68.8759 | D18 | | |
| 19 | INF | D19 | | |
| 20 | 26.8406 | 7.500 | 1.834000 | 37.16 |
| 21 | −41.1011 | 1.881 | 1.808100 | 22.76 |
| 22 | 72.7139 | D22 | | |
| 23 | −44.4543 | 2.762 | 1.654120 | 39.68 |
| 24 | 6.6178 | 3.615 | 1.516330 | 64.14 |
| 25 | 7.0092 | 3.000 | | |
| 26 | −18.0965 | 1.500 | 1.613400 | 44.27 |
| 27 | 10.0373 | 5.500 | 1.741000 | 52.64 |
| 28 | −11.7879 | 0.500 | | |
| 29 | −434.1233 | 1.650 | 1.883000 | 40.76 |
| 30 | 69.6079 | 2.668 | 1.740000 | 28.3 |
| 31 | −205.4905 | 22.000 | | |
| 32 | INF | | | |

Here, "s" indicates a plane number, and "r" indicates a radius of curvature (mm). Moreover, "d" indicates a lens plane interval (mm), "nd" indicates an index of refraction for the d Line, and "vd" indicates an Abbe number. The planes indicated by plane numbers s1, s8, s19, and s32 indicate the exit pupil position of an objective lens, a primary image (intermediate image) position, a pupil conjugate position, and an image plane, respectively. A lens plane interval d1 indicates the distance from an exit pupil position (plane number s1) to a first plane (plane number s2) that is closest to the object lens of the tube lens 33. A lens plane interval d31 indicates the distance from the last plane (plane number s31) of the zoom lens 34 to the image plane (plane number s32). Lens plane intervals d15, d18, d19, and d22 are variables D15, D18, D19, and D22, which vary according to the zoom operation of the zoom lens 34, and they respectively indicate the distance between the first lens group G1 and the second lens group G2, the distance between the second lens group G2 and the aperture stop AS, the distance between the aperture stop AS and the third lens group G3, and the distance between the third lens group G3 and the fourth lens group G4.

The compound focal lengths of the tube lens 33 and the zoom lens 34 in a low-power end state illustrated in FIG. 10A, an intermediate state illustrated in FIG. 10B, and in a high-power end state illustrated in FIG. 10C, that is, the focal lengths (mm) of the zoom image-forming optical system 32 and the lens plane intervals (mm) of variables in the respective states, are as follows.

FOCAL LENGTH AND LENS PLANE INTERVAL OF ZOOM IMAGE-FORMING OPTICAL SYSTEM 32

| STATE | HIGH-POWER END | INTERMEDIATE | LOW-POWER END |
|---|---|---|---|
| FOCAL LENGTH | −657.3 | −106.4 | −41.1 |
| D15 | 2.795 | 43.530 | 83.838 |
| D18 | 1.000 | 20.000 | 1.000 |
| D19 | 1.000 | 24.820 | 1.157 |
| D22 | 94.197 | 10.642 | 8.996 |

The zoom image-forming optical system 32 according to the present embodiment satisfies conditional expressions (1) through (6) as expressed in expressions (51) through (56) below. The expressions (51) through (56) correspond to the conditional expressions (1) through (6), respectively. Note that the $\nu\,d_{TLP}$ and the $nd_{TLP}$ of the expression (56) are an Abbe number and an index of refraction for the d Line of a biconvex lens TL1, respectively.

$$F_{TL}/F_{MIN} = -1.46 \quad (51)$$

$$F_{TL}/F_{MAX} = -0.09 \quad (52)$$

$$\phi E/L_{PI} = 0.15 \quad (53)$$

$$L_{PC}/F_{MIN} = -7.18 \quad (54)$$

$$L_{PC}/F_{MAX} = -0.45 \quad (55)$$

$$\nu\,d_{TLP} * nd_{TLP} = 122.1 \quad (56)$$

Figure 11A:
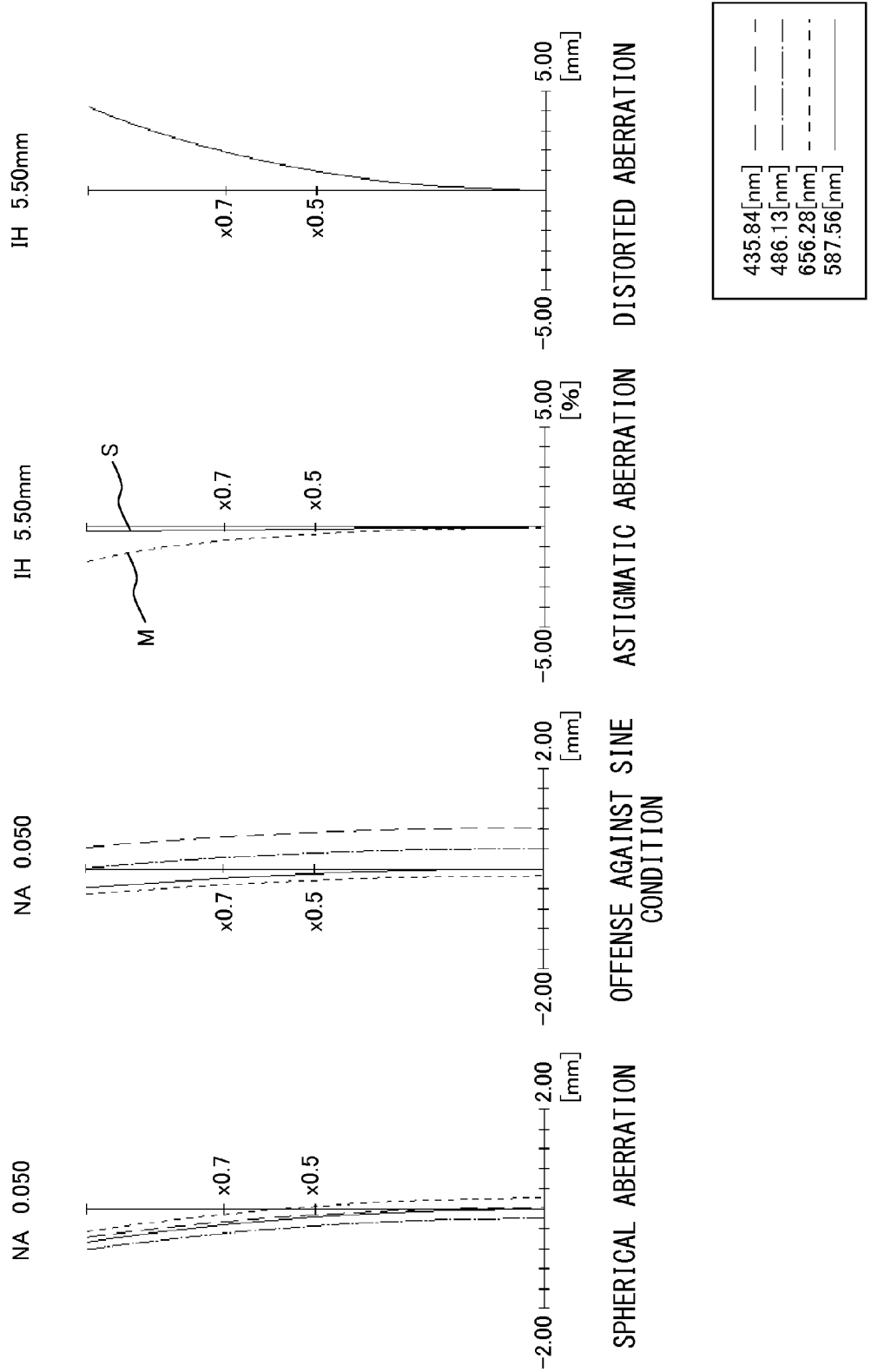
FIG. 11A illustrates an aberration of a zoom image-forming optical system in a low-power end state, which is illustrated in FIG. 10A.
Figure 11B:
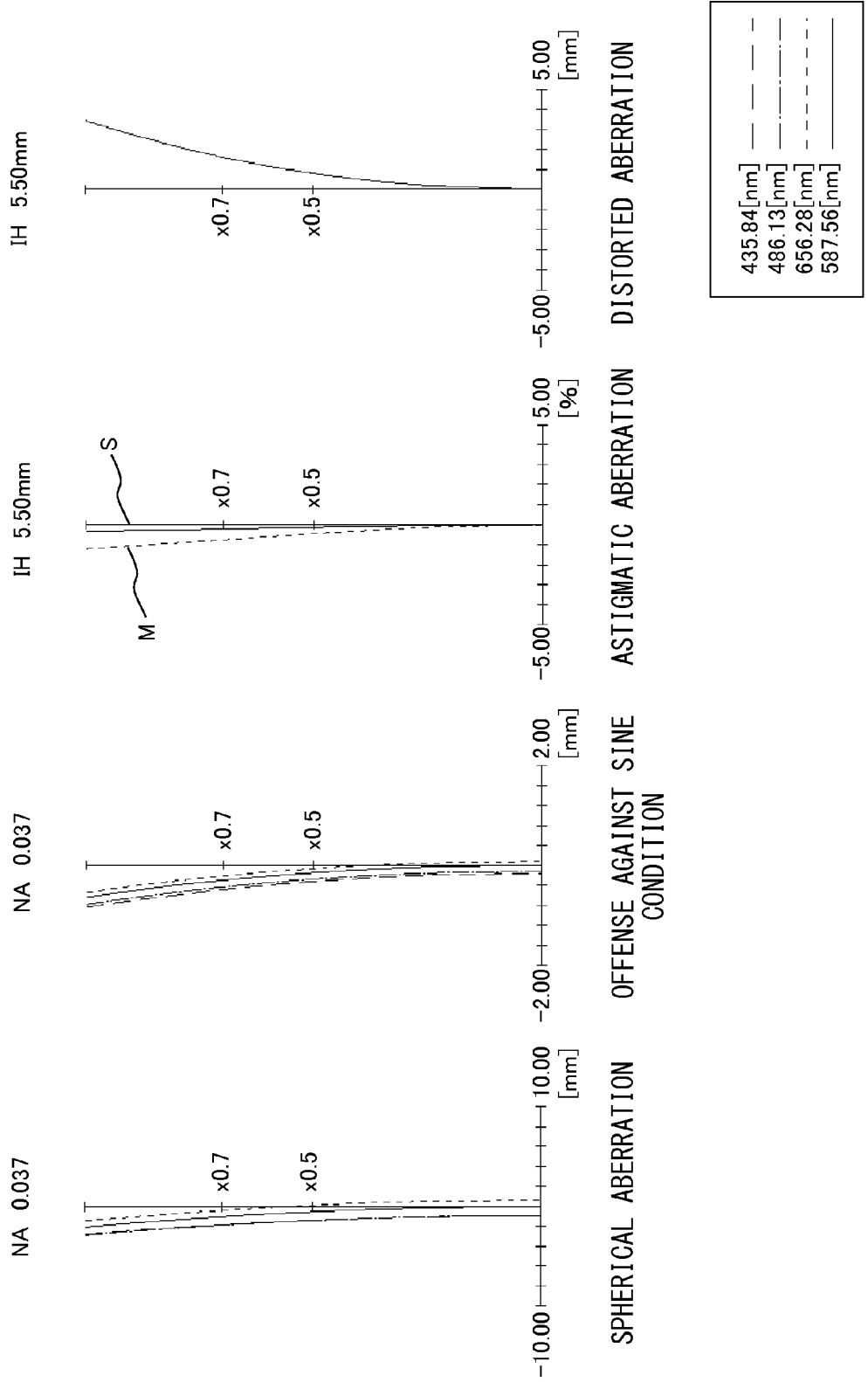
FIG. 11B illustrates an aberration of a zoom image-forming optical system in an intermediate state, which is illustrated in FIG. 10B.
Figure 11C:
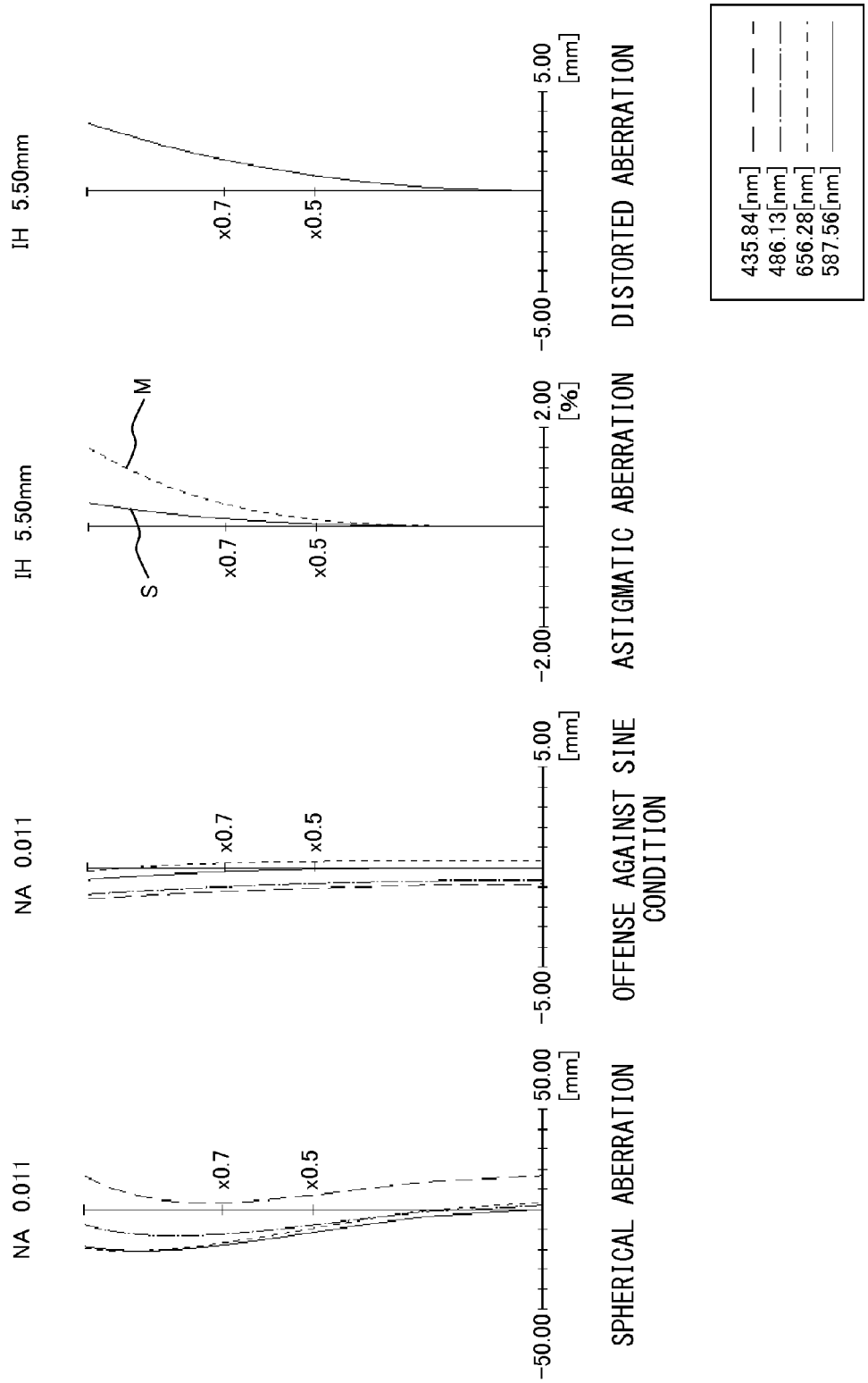
FIG. 11C illustrates an aberration of a zoom image-forming optical system in a high-power end state, which is illustrated in FIG. 10C.

FIGS. 11A, 11B, and 11C are diagrams illustrating aberrations of the zoom image-forming optical system 32 in a low-power end state illustrated in FIG. 10A, an intermediate state illustrated in FIG. 10B, and in a high-power end state illustrated in FIG. 10C, respectively. In 11A, 11B, and 11C, aberrations in the image plane in cases where a parallel luminous flux is incident from an object side are illustrated. FIGS. 11A, 11B, and 11C illustrate a spherical aberration, an offense against the sine condition, an astigmatic aberration, and a distorted aberration, respectively, in order from left to right. It is also indicated that the aberrations are precisely corrected in any state.

<Sixth Embodiment>

FIGS. 12A through 12C are section views of a zoom image-forming optical system according to the present embodiment. FIG. 12A, FIG. 12B, and FIG. 12C illustrate a low-power end state, an intermediate state, and a high-power end state, respectively. The zoom image-forming optical system 35 illustrated in FIGS. 12A through 12C is used in combination with an infinity-correction objective lens (not illustrated), and the zoom image-forming optical system 35 includes: a tube lens 36 for condensing a luminous flux from the objective lens to form an intermediate image; and a zoom lens 37 with a zoom function for projecting the intermediate image onto an image plane.

The tube lens 36 includes a cemented lens CTL1 having a biconvex lens TL1 and a meniscus lens TL2 whose concavity is oriented toward an object side, and a cemented lens CTL2 having a biconvex lens TL3 and a meniscus lens TL4 whose concavity is oriented toward an object side, in this order from an object side (i.e., objective lens side).

The zoom lens 37 includes a first lens group G1 with positive power, a second lens group G2 that is a movable group with positive power, an aperture stop AS that moves in the direction of an optical axis, a third lens group G3 that is a movable group with positive power, and a fourth lens group G4 with negative power, in this order from the intermediate image formed by the tube lens 36. The zoom lens 37 changes magnification of an image formed on an image plane by moving the second lens group G2 and the third lens group G3 in the direction of an optical axis.

The first lens group G1 includes a cemented lens CL1 having a meniscus lens L1 whose concavity is oriented toward an image side and a biconvex lens L2, and a cemented lens CL2 having a biconvex lens L3 and a biconcave lens L4, in this order from an intermediate image side.

The second lens group G2 is movable in the direction of an optical axis, and includes a cemented lens CL3 having a meniscus lens L5 whose concavity is oriented toward an image side and a biconvex lens L6, in this order from an intermediate image side.

The third lens group G3 is movable in the direction of an optical axis, and includes a cemented lens CL4 having a biconvex lens L7 and a meniscus lens L8 whose concavity is oriented toward an object side, in this order from an intermediate image side.

The fourth lens group G4 includes a meniscus lens L9 whose concavity is oriented toward an object side, a cemented lens CL5 having a biconvex lens L10 and a biconcave lens L11, as well as a cemented lens CL6 having a meniscus lens L12 whose concavity is oriented toward an image side and a biconvex lens L13.

The various kinds of data of the zoom image-forming optical system 35 according to the present embodiment will be described. Note that the reference wavelength is the d Line (587.56 nm).

The focal length $F_{TL}$ of the tube lens 36, the compound focal length $F_{MIN}$ between the tube lens 36 and the zoom lens 37 in a low-power end state, the compound focal length $F_{MAX}$ between the tube lens 36 and the zoom lens 37 in a high-power end state, the distance $L_{PI}$ between an exit pupil position and a primary image-forming position (intermediate image position), the distance $L_{IC}$ between a primary image-forming position and a secondary image-forming position (image plane), and the distance $L_{PC}$ between an exit pupil position and a secondary image-forming position are as follows.

$F_{TL}$=89.994 mm, $F_{MIN}$=−46.4 mm, $F_{MAX}$=−630.4 mm, $L_{PI}$=184.854 mm, $L_{IC}$=180.534 mm, $L_{PC}$=365.389 mm

The stop diameter $\phi$ of an aperture stop AS and the pupil diameter $\phi E$ of an objective lens in a high-power end state illustrated in FIG. 12C are as follows.

$\phi$=4 mm, $\phi E$=12 mm

The present embodiment relates to an image pickup device of a CCD of $\frac{1}{1.8}$ inch or the like, and in which the diagonal length is 9 mm (image height IH=4.5 mm).

The lens data of the zoom image-forming optical system 35 according to the present embodiment is as follows.

| ZOOM IMAGE-FORMING OPTICAL SYSTEM 35 | | | | |
| --- | --- | --- | --- | --- |
| s | r | d | nd | vd |
| 1 | INF | 87.238 | | |
| 2 | 72.5831 | 5.116 | 1.43875 | 94.93 |
| 3 | −30.5978 | 2.000 | 1.51633 | 64.14 |
| 4 | −82.3394 | 1.000 | | |
| 5 | 253.1699 | 6.000 | 1.48749 | 70.23 |
| 6 | −62.9218 | 2.000 | 1.6134 | 44.27 |
| 7 | −390.8422 | 81.501 | | |
| 8 | INF | 13.547 | | |
| 9 | 110.2050 | 1.800 | 1.58913 | 61.14 |
| 10 | 17.1162 | 5.000 | 1.51742 | 52.43 |
| 11 | −37.8128 | 0.500 | | |
| 12 | 110.1090 | 3.500 | 1.80518 | 25.42 |
| 13 | −45.0031 | 2 | 1.738 | 32.26 |
| 14 | 50.9485 | D14 | | |
| 15 | 45.5047 | 1.8 | 1.74 | 28.3 |
| 16 | 18.7324 | 4.0236 | 1.56883 | 56.36 |
| 17 | −36.6004 | D17 | | |
| 18 | INF | D18 | | |
| 19 | 36.6004 | 4.024 | 1.568830 | 56.36 |
| 20 | −18.7324 | 1.800 | 1.740000 | 28.3 |
| 21 | −45.5040 | D21 | | |
| 22 | −7.3671 | 1.100 | 1.741000 | 52.64 |
| 23 | −41.7573 | 2.601 | | |
| 24 | 12.7533 | 2.800 | 1.834000 | 37.16 |
| 25 | −8.1609 | 1.100 | 1.741000 | 52.64 |
| 26 | 11.0659 | 1.300 | | |
| 27 | 49.2067 | 1.100 | 1.720470 | 34.71 |

-continued

ZOOM IMAGE-FORMING OPTICAL SYSTEM 35

| s | r | d | nd | vd |
|---|---|---|---|---|
| 28 | 9.2020 | 2.500 | 1.487490 | 70.23 |
| 29 | −9.2522 | 40.397 | | |
| 30 | INF | | | |

Here, "s" indicates a plane number and "r" indicates a radius of curvature (mm). Moreover, "d" indicates a lens plane interval (mm), "nd" indicates an index of refraction for the d Line, and "vd" indicates an Abbe number. The planes indicated by plane numbers s1, s8, s18, and s30 indicate the exit pupil position of an objective lens, a primary image (intermediate image) position, a pupil conjugate position, and an image plane, respectively. A lens plane interval d1 indicates the distance from an exit pupil position (plane number s1) to a first plane (plane number s2) that is closest to the object lens of the tube lens 36. A lens plane interval d29 indicates the distance from the last plane (plane number s29) of the zoom lens 37 to the image plane (plane number s30). Lens plane intervals d14, d17, d18, and d21 are variables D14, D17, D18, and D21, which vary according to the zoom operation of the zoom lens 37, and they respectively indicate the distance between the first lens group G1 and the second lens group G2, the distance between the second lens group G2 and the aperture stop AS, the distance between the aperture stop AS and the third lens group G3, and the distance between the third lens group G3 and the fourth lens group G4.

The compound focal lengths of the tube lens 36 and the zoom lens 37 in a low-power end state illustrated in FIG. 12A, an intermediate state illustrated in FIG. 12B, and in a high-power end state illustrated in FIG. 12C, that is, the focal lengths (mm) of the zoom image-forming optical system 35 and the lens plane intervals (mm) of variables in the respective states, are as follows.

FOCAL LENGTH AND LENS PLANE INTERVAL OF ZOOM IMAGE-FORMING OPTICAL SYSTEM 35

| STATE | HIGH-POWER END | INTERMEDIATE | LOW-POWER END |
|---|---|---|---|
| FOCAL LENGTH | −630.4 | −140.1 | −46.4 |
| D14 | 2.424 | 30.866 | 83.838 |
| D17 | 1.000 | 20.000 | 1.000 |
| D18 | 1.000 | 24.820 | 1.157 |
| D21 | 85.232 | 11.969 | 3.660 |

The zoom image-forming optical system 35 according to the present embodiment satisfies conditional expressions (1) through (6) as expressed in expressions (61) through (66) below. The expressions (61) through (66) correspond to the conditional expressions (1) through (6), respectively. Note that the $\nu\, d_{TLP}$ and the $nd_{TLP}$ of the expression (66) are an Abbe number of a biconvex lens TL1 and an index of refraction for the d Line, respectively.

$$F_{TL}/F_{MIN} = -1.94 \quad (61)$$

$$F_{TL}/F_{MAX} = -0.14 \quad (62)$$

$$\phi E/L_{PI} = 0.06 \quad (63)$$

$$L_{PC}/F_{MIN} = -7.88 \quad (64)$$

$$L_{PC}/F_{MAX} = -0.58 \quad (65)$$

$$\nu\, d_{TLP} * nd_{TLP} = 136.6 \quad (66)$$

Figure 13A:
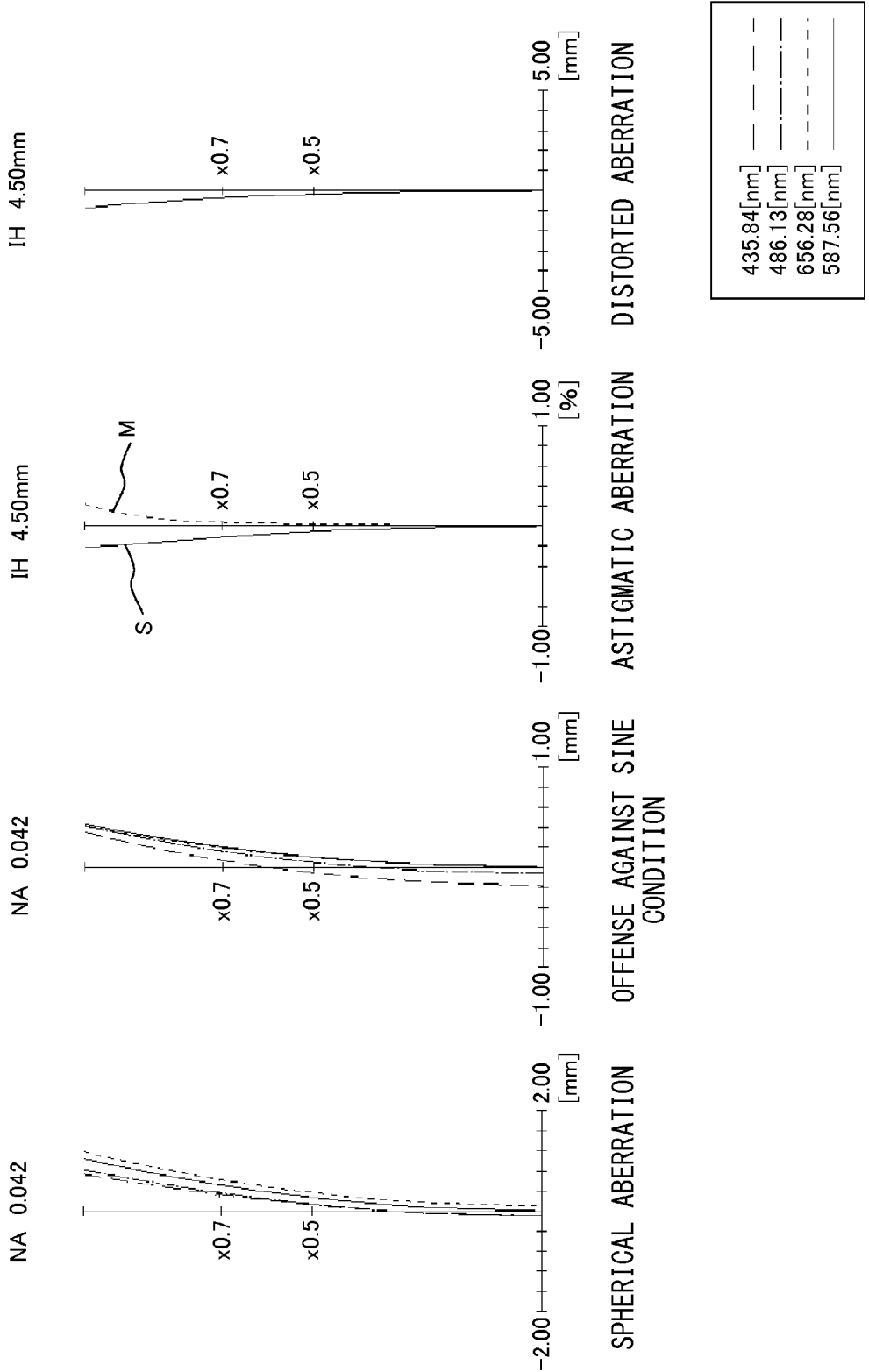
FIG. 13A illustrates an aberration of a zoom image-forming optical system in a low-power end state, which is illustrated in FIG. 12A.
Figure 13B:
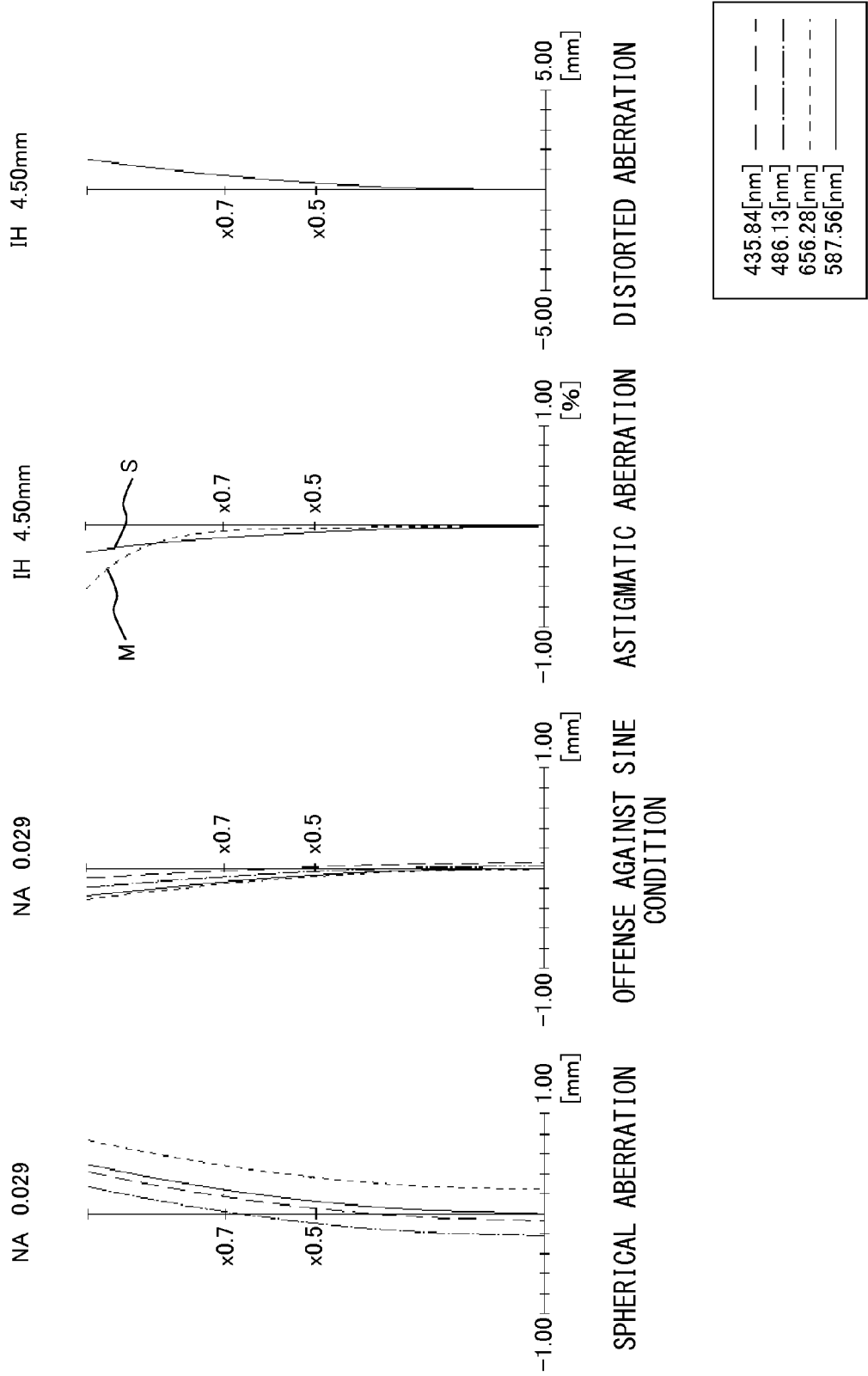
FIG. 13B illustrates an aberration of a zoom image-forming optical system in an intermediate state, which is illustrated in FIG. 12B.
Figure 13C:
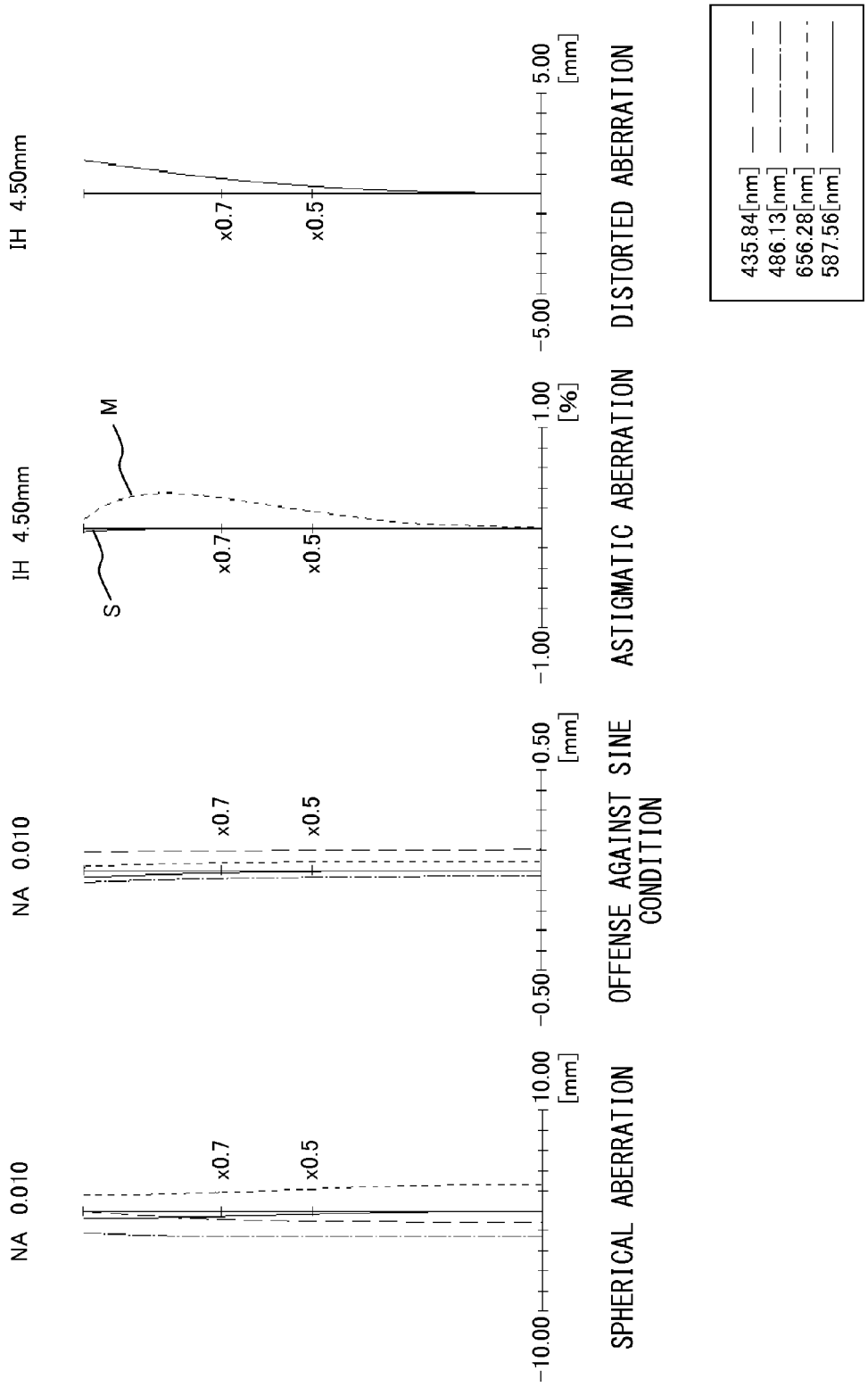
FIG. 13C illustrates an aberration of a zoom image-forming optical system in a high-power end state, which is illustrated in FIG. 12C.

FIGS. 13A, 13B, and 13C are diagrams illustrating aberrations of the zoom image-forming optical system 35 in a low-power end state illustrated in FIG. 12A, an intermediate state illustrated in FIG. 12B, and in a high-power end state illustrated in FIG. 12C, respectively. In FIGS. 13A, 13B, and 13C, aberrations in the image plane in cases where a parallel luminous flux is incident from an object side are illustrated. FIGS. 13A, 13B, and 13C illustrate a spherical aberration, an offense against the sine condition, an astigmatic aberration, and a distorted aberration, respectively, in order from left to right. It is also indicated that the aberrations are precisely corrected in any state.

<Seventh Embodiment>

FIGS. 14A through 14C are section views of a zoom image-forming optical system according to the present embodiment. FIG. 14A, FIG. 14B, and FIG. 14C illustrate a low-power end state, an intermediate state, and a high-power end state, respectively. The zoom image-forming optical system 38 illustrated in FIGS. 14A through 14C is used in combination with an infinity-correction objective lens (not illustrated), and the zoom image-forming optical system 38 includes: a tube lens 39 for condensing a luminous flux from the objective lens to form a intermediate image; and a zoom lens 40 with a zoom function for projecting the intermediate image onto an image plane.

The tube lens 39 includes a cemented lens CTL1 having a biconvex lens TL1 and a meniscus lens TL2 whose concavity is oriented toward an object side, and a cemented lens CTL2 having a biconvex lens TL3 and a meniscus lens TL4 whose concavity is oriented toward an object side, in this order from an object side (i.e., objective lens side).

The zoom lens 40 includes a first lens group G1 with positive power, a second lens group G2 that is a movable group with positive power, an aperture stop AS that moves in the direction of an optical axis, a third lens group G3 that is a movable group with positive power, and a fourth lens group G4 with negative power, in this order from the intermediate image formed by the tube lens 39. The zoom lens 40 changes magnification an image formed on an image plane by moving the second lens group G2 and the third lens group G3 in the direction of an optical axis.

The first lens group G1 includes a cemented lens CL1 having a meniscus lens L1 whose concavity is oriented toward an image side and a biconvex lens L2, and a cemented lens CL2 having a biconvex lens L3 and a biconcave lens L4, in this order from an intermediate image side.

The second lens group G2 is movable in the direction of an optical axis, and includes a cemented lens CL3 having a meniscus lens L5 whose concavity is oriented toward an image side and a biconvex lens L6, in this order from an intermediate image side.

The third lens group G3 is movable in the direction of an optical axis, and includes a cemented lens CL4 having a biconvex lens L7 and a meniscus lens L8 whose concavity is oriented toward an object side, in this order from an intermediate image side.

The fourth lens group G4 includes a meniscus lens L9 whose concavity is oriented toward an object side, a cemented lens CL5 having a biconvex lens L10 and a biconcave lens L11, as well as a cemented lens CL6 having a meniscus lens L12 whose concavity is oriented toward an image side and a biconvex lens L13.

The various kinds of data of the zoom image-forming optical system 38 according to the present embodiment will be described. Note that the reference wavelength is the d Line (587.56 nm).

The focal length $F_{TL}$ of the tube lens 39, the compound focal length $F_{MIN}$ between the tube lens 39 and the zoom lens 40 in a low-power end state, the compound focal length $F_{MAX}$ between the tube lens 39 and the zoom lens 40 in a high-power end state, the distance $L_{PI}$ between an exit pupil position and a primary image-forming position (intermediate image position), the distance $L_{IC}$ between a primary image-forming position and a secondary image-forming position (image plane), and the distance $L_{PC}$ between an exit pupil position and a secondary image-forming position are as follows.

$F_{TL}$=40.000 mm, $F_{MIN}$=−16.4 mm, $F_{MAX}$=−222.7 mm, $L_{PI}$=83.765 mm, $L_{IC}$=176.031 mm, $L_{PC}$=259.797 mm

The stop diameter φ of an aperture stop AS and the pupil diameter φE of an objective lens in a high-power end state illustrated in FIG. 14C are as follows.

φ=3.2 mm, φE=5 mm

The present embodiment relates to an image pickup device of a CCD of ⅓ inch or the like, and in which the diagonal length is 6 mm (image height IH=3 mm).

The lens data of the zoom image-forming optical system 38 according to the present embodiment is as follows.

| ZOOM IMAGE-FORMING OPTICAL SYSTEM 38 | | | | |
|---|---|---|---|---|
| s | r | d | nd | vd |
| 1 | INF | 38.772 | | |
| 2 | 27.3862 | 4.444 | 1.43875 | 94.93 |
| 3 | −11.4894 | 0.889 | 1.51633 | 64.14 |
| 4 | −31.6061 | 0.444 | | |
| 5 | 119800.0000 | 4.444 | 1.48749 | 70.23 |
| 6 | −31.1465 | 0.889 | 1.6134 | 44.27 |
| 7 | −151.4758 | 33.882 | | |
| 8 | INF | 13.547 | | |
| 9 | 110.2000 | 1.800 | 1.58913 | 61.14 |
| 10 | 17.1160 | 5.000 | 1.51742 | 52.43 |
| 11 | −37.8120 | 0.500 | | |
| 12 | 110.2000 | 3.500 | 1.80518 | 25.42 |
| 13 | −45.0030 | 2 | 1.738 | 32.26 |
| 14 | 50.9480 | D14 | | |
| 15 | 45.5040 | 1.8 | 1.74 | 28.3 |
| 16 | 18.7324 | 4.0236 | 1.56883 | 56.36 |
| 17 | −36.6004 | D17 | | |
| 18 | INF | D18 | | |
| 19 | 36.6004 | 4.024 | 1.568830 | 56.36 |
| 20 | −18.7324 | 1.8 | 1.740000 | 28.3 |
| 21 | −45.5040 | D21 | | |
| 22 | −5.8312 | 1.100 | 1.741000 | 52.64 |
| 23 | −20.0094 | 2.601 | | |
| 24 | 11.3525 | 4.000 | 1.834000 | 37.16 |
| 25 | −8.1566 | 1.100 | 1.741000 | 52.64 |
| 26 | 10.4721 | 1.300 | | |
| 27 | 54.1094 | 1.100 | 1.720470 | 34.71 |
| 28 | 7.1748 | 4.000 | 1.487490 | 70.23 |
| 29 | −7.7492 | 33.181 | | |
| 30 | INF | | | |

Here, "s" indicates a plane number, and "r" indicates a radius of curvature (mm). Moreover, "d" indicates a lens plane interval (mm), "nd" indicates an index of refraction for the d Line, and "vd" indicates an Abbe number. The planes indicated by plane numbers s1, s8, s18, and s30 indicate the exit pupil position of an objective lens, a primary image (intermediate image) position, a pupil conjugate position, and an image plane, respectively. A lens plane interval d1 indicates the distance from an exit pupil position (plane number s1) to a first plane (plane number s2) that is closest to the object lens of the tube lens 39. A lens plane interval d29 indicates the distance from the last plane (plane number s29) of the zoom lens 40 to the image plane (plane number s30). Lens plane intervals d14, d17, d18, and d21 are variables D14, D17, D18, and D21, which vary according to the zoom operation of the zoom lens 40, and they respectively indicate the distance between the first lens group G1 and the second lens group G2, the distance between the second lens group G2 and the aperture stop AS, the distance between the aperture stop AS and the third lens group G3, and the distance between the third lens group G3 and the fourth lens group G4.

The compound focal lengths of the tube lens 39 and the zoom lens 40 in a low-power end state illustrated in FIG. 14A, an intermediate state illustrated in FIG. 14B, and in a high-power end state illustrated in FIG. 14C, that is, the focal lengths (mm) of the zoom image-forming optical system 38 and the lens plane intervals (mm) of variables in the respective states, are as follows.

| FOCAL LENGTH AND LENS PLANE INTERVAL OF ZOOM IMAGE-FORMING OPTICAL SYSTEM 38 | | | |
|---|---|---|---|
| STATE | HIGH-POWER END | INTERMEDIATE | LOW-POWER END |
| FOCAL LENGTH | −222.7 | −49.5 | −16.4 |
| D14 | 2.424 | 30.866 | 83.838 |
| D17 | 1.000 | 20.000 | 1.000 |
| D18 | 1.000 | 26.820 | 1.157 |
| D21 | 85.232 | 11.969 | 3.660 |

The zoom image-forming optical system 38 according to the present embodiment satisfies conditional expressions (1) through (6) as expressed in expressions (71) through (76) below. The expressions (71) through (76) correspond to the conditional expressions (1) through (6), respectively. Note that the ν $d_{TLP}$ and the nd$_{TLP}$ of the expression (76) are an Abbe number and an index of refraction for the d Line of a biconvex lens TL1, respectively.

$$F_{TL}/F_{MIN} = -2.44 \tag{71}$$

$$F_{TL}/F_{MAX} = -0.18 \tag{72}$$

$$\phi E/L_{PI} = 0.06 \tag{73}$$

$$L_{PC}/F_{MIN} = -15.86 \tag{74}$$

$$L_{PC}/F_{MAX} = -1.17 \tag{75}$$

$$\nu\, d_{TLP} * nd_{TLP} = 136.6 \tag{76}$$

Figure 15A:
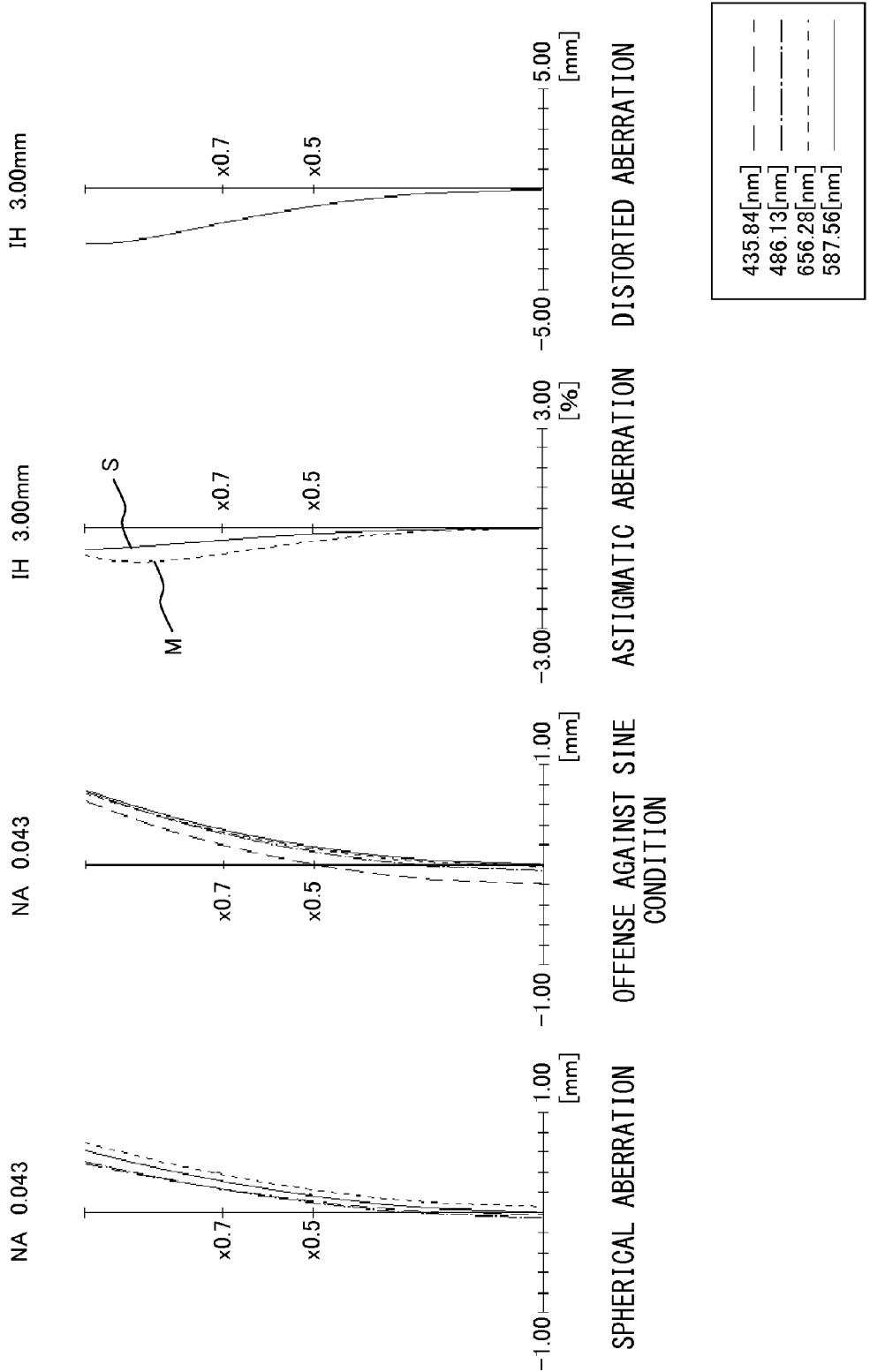
FIG. 15A illustrates an aberration of a zoom image-forming optical system in a low-power end state, which is illustrated in FIG. 14A.
Figure 15B:
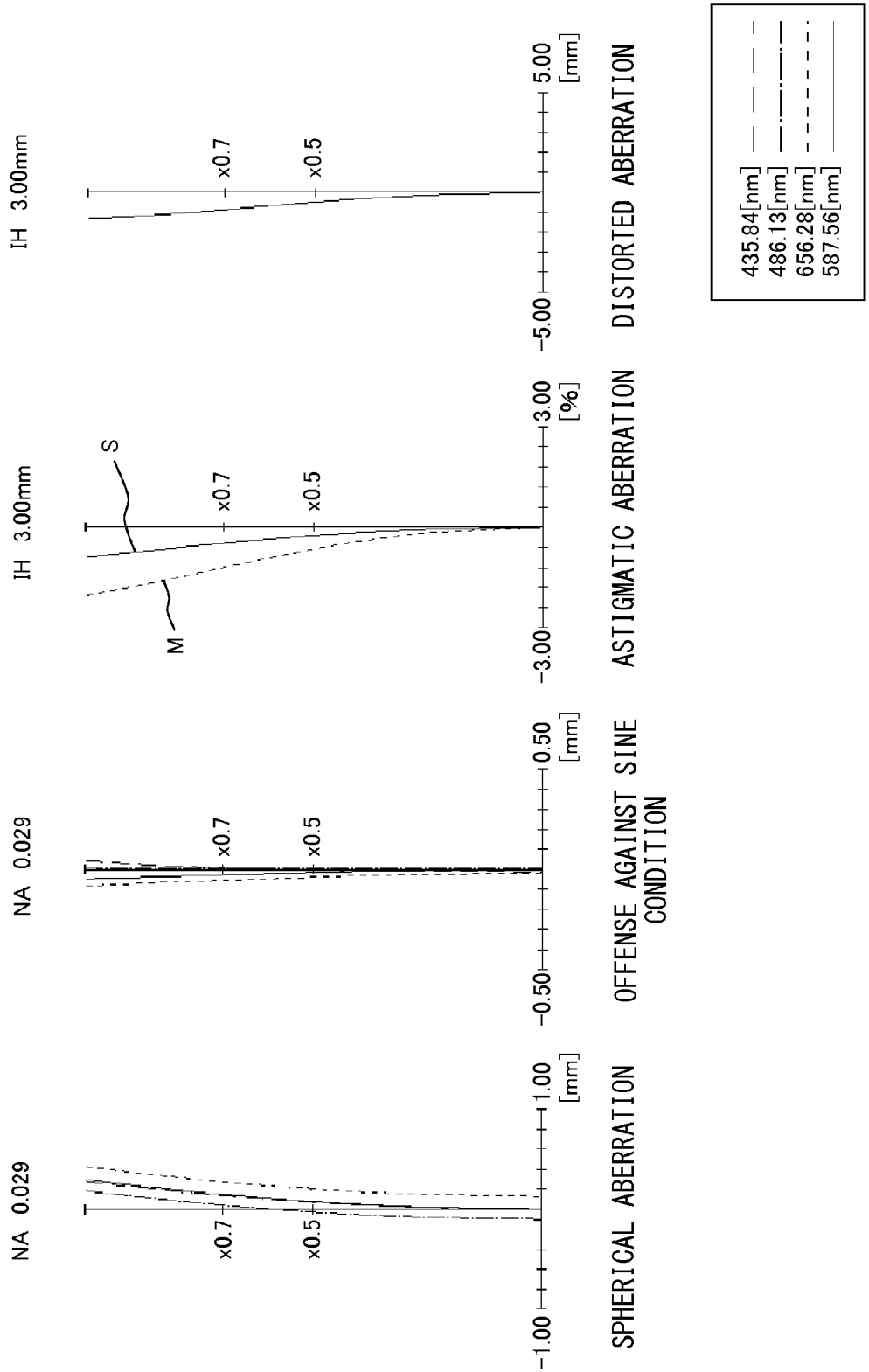
FIG. 15B illustrates an aberration of a zoom image-forming optical system in an intermediate state, which is illustrated in FIG. 14B.
Figure 15C:
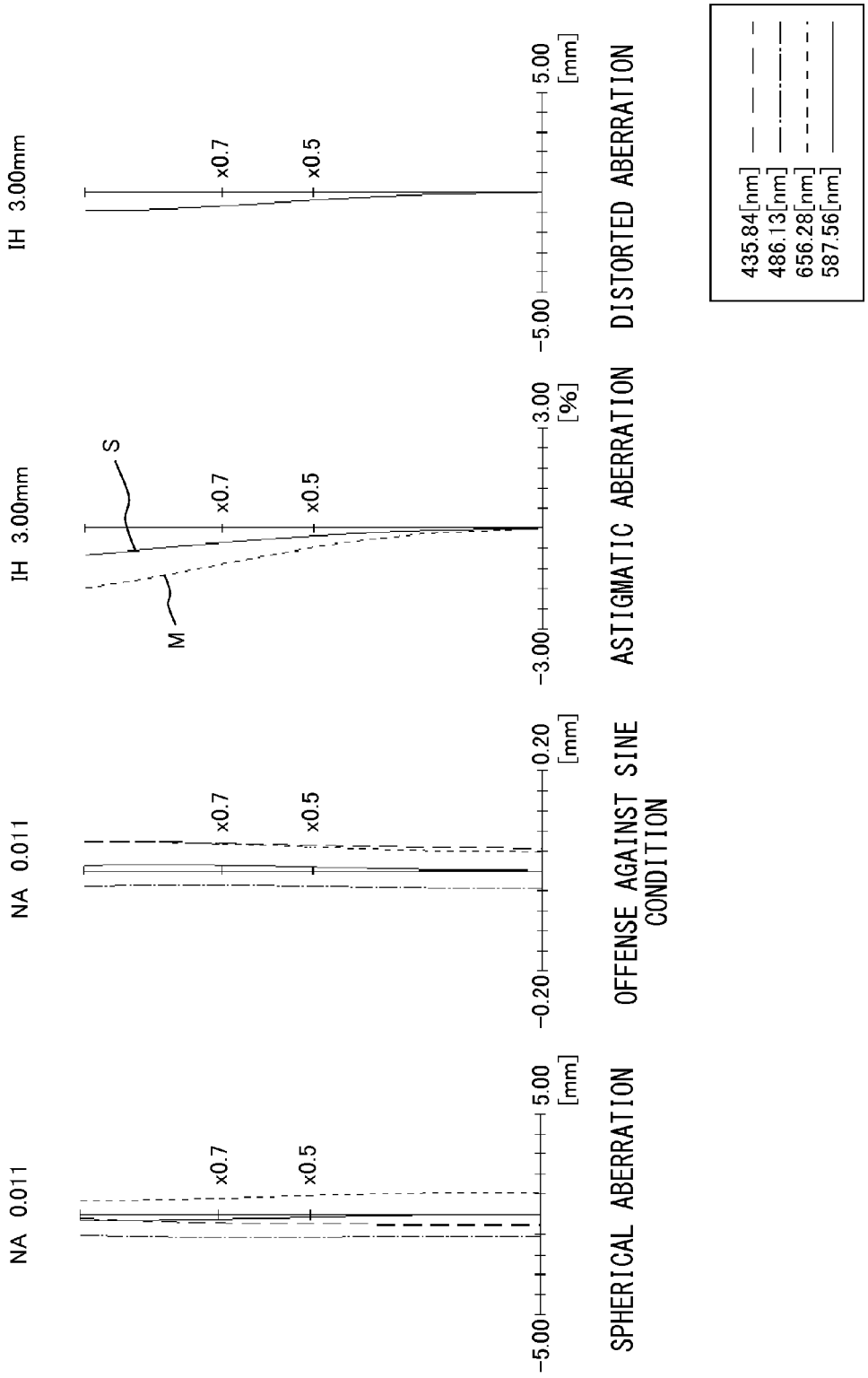
FIG. 15C illustrates an aberration of a zoom image-forming optical system in a high-power end state, which is illustrated in FIG. 14C.

FIGS. 15A, 15B, and 15C are diagrams illustrating aberrations of the zoom image-forming optical system 38 in a low-power end state illustrated in FIG. 14A, an intermediate state illustrated in FIG. 14B, and in a high-power end state illustrated in FIG. 14C, respectively. In FIGS. 15A, 15B, and 15C, aberrations in the image plane in cases where a parallel luminous flux is incident from an object side are illustrated. FIGS. 15A, 15B, and 15C illustrate a spherical aberration, an offense against the sine condition, an astigmatic aberration, and a distorted aberration, respectively, in order from left to right. It is also indicated that the aberrations are precisely corrected in any states.

<Eighth Embodiment>

FIGS. 16A through 16C are section views of a zoom image-forming optical system according to the present embodiment. FIG. 16A, FIG. 16B, and FIG. 16C illustrate a low-power end state, an intermediate state, and a high-power end state, respectively. The zoom image-forming optical system 41 illustrated in FIG. 16A is used in combination with an infinity-correction objective lens (not illustrated), and the zoom image-forming optical system 41 includes: a tube lens 42 for condensing a luminous flux from the objective lens to form a intermediate image; and a zoom lens 43 with a zoom function for projecting the intermediate image onto an image plane.

The tube lens 42 includes a cemented lens CTL1 having a biconvex lens TL1 and a meniscus lens TL2 whose concavity is oriented toward an object side, and a cemented lens CTL2 having a biconvex lens TL3 and a meniscus lens TL4 whose concavity is oriented toward an object side, in this order from an object side (i.e., objective lens side).

The zoom lens 43 includes a first lens group G1 with positive power, a second lens group G2 that is a movable group with positive power, an aperture stop AS that moves in the direction of an optical axis, a third lens group G3 that is a movable group with positive power, and a fourth lens group G4 with negative power, in this order from the intermediate image formed by the tube lens 42. The zoom lens 43 changes magnification of an image formed on an image plane by moving the second lens group G2 and the third lens group G3 in the direction of an optical axis.

The first lens group G1 includes a cemented lens CL1 having a meniscus lens L1 whose concavity is oriented toward an image side and a biconvex lens L2, and a cemented lens CL2 having a biconvex lens L3 and a biconcave lens L4, in this order from an intermediate image side.

The second lens group G2 is movable in the direction of an optical axis, and includes a cemented lens CL3 having a meniscus lens L5 whose concavity is oriented toward an image side and a biconvex lens L6, in this order from an intermediate image side.

The third lens group G3 is movable in the direction of an optical axis, and includes a cemented lens CL4 having a biconvex lens L7 and a meniscus lens L8 whose concavity is oriented toward an object side, in this order from an intermediate image side.

The fourth lens group G4 includes a meniscus lens L9 whose concavity is oriented toward an object side, a cemented lens CL5 having a meniscus lens L10 whose concavity is oriented toward an image side and a meniscus lens L11 whose concavity is oriented toward an image side, as well as a cemented lens CL6 having a biconvex lens L12 and a biconcave lens L13.

The various kinds of data of the zoom image-forming optical system 41 according to the present embodiment will be described. Note that the reference wavelength is the d Line (587.56 nm).

The focal length $F_{TL}$ of the tube lens 42, the compound focal length $F_{MIN}$ between the tube lens 42 and the zoom lens 43 in a low-power end state, the compound focal length $F_{MAX}$ between the tube lens 42 and the zoom lens 43 in a high-power end state, the distance $L_{PI}$ between an exit pupil position and a primary image-forming position (intermediate image position), the distance $L_{IC}$ between a primary image-forming position and a secondary image-forming position (image plane), and the distance $L_{PC}$ between an exit pupil position and a secondary image-forming position are as follows.

$F_{TL}$=40.000 mm, $F_{MIN}$=−38.2 mm, $F_{MAX}$=−518.9 mm, $L_{PI}$=83.326 mm, $L_{IC}$=188.758 mm, $L_{PC}$=272.083 mm

The stop diameter $\phi$ of an aperture stop AS and the pupil diameter $\phi E$ of an objective lens in a high-power end state illustrated in FIG. 16C are as follows.

$\phi$=3.2 mm, $\phi E$=10 mm

The present embodiment relates to an image pickup device of a CCD of 1/1.8 inch or the like, and in which the diagonal length is 9 mm (image height IH=4.5 mm).

The lens data of the zoom image-forming optical system 41 according to the present embodiment is as follows.

| ZOOM IMAGE-FORMING OPTICAL SYSTEM 41 | | | | |
|---|---|---|---|---|
| s | r | d | nd | vd |
| 1 | INF | 38.333 | | |
| 2 | 27.3862 | 4.444 | 1.43875 | 94.93 |
| 3 | −11.4894 | 0.889 | 1.51633 | 64.14 |
| 4 | −31.6061 | 0.444 | | |
| 5 | 119800.0000 | 4.444 | 1.48749 | 70.23 |
| 6 | −31.1465 | 0.889 | 1.6134 | 44.27 |
| 7 | −151.4758 | 33.881 | | |
| 8 | INF | 13.547 | | |
| 9 | 110.2000 | 1.800 | 1.58913 | 61.14 |
| 10 | 17.1160 | 5.000 | 1.51742 | 52.43 |
| 11 | −37.8120 | 0.500 | | |
| 12 | 110.2000 | 3.500 | 1.80518 | 25.42 |
| 13 | −45.0030 | 2 | 1.738 | 32.26 |
| 14 | 50.9480 | D14 | | |
| 15 | 45.5040 | 1.8 | 1.74 | 28.3 |
| 16 | 18.7324 | 4.0236 | 1.56883 | 56.36 |
| 17 | −36.6004 | D17 | | |
| 18 | INF | D18 | | |
| 19 | 36.6004 | 4.024 | 1.568830 | 56.36 |
| 20 | −18.7324 | 1.8 | 1.740000 | 28.3 |
| 21 | −45.5040 | D21 | | |
| 22 | −14.9733 | 1.100 | 1.741000 | 52.64 |
| 23 | −26.9230 | 2.601 | | |
| 24 | 24.4003 | 2.800 | 1.834000 | 37.16 |
| 25 | 6.3612 | 1.100 | 1.741000 | 52.64 |
| 26 | 15.8988 | 1.300 | | |
| 27 | 36.2466 | 1.100 | 1.720470 | 34.71 |
| 28 | −7.6950 | 2.500 | 1.487490 | 70.23 |
| 29 | 11.4988 | 48.606 | | |
| 30 | INF | | | |

Here, "s" indicates a plane number and "r" indicates a radius of curvature (mm). Moreover, "d" indicates a lens plane interval (mm), "nd" indicates an index of refraction for the d Line, and "vd" indicates an Abbe number. The planes indicated by plane numbers s1, s8, s18, and s30 indicate the exit pupil position of an objective lens, a primary image (intermediate image) position, a pupil conjugate position, and an image plane, respectively. A lens plane interval d1 indicates the distance from an exit pupil position (plane number s1) to a first plane (plane number s2) that is closest to the object lens of the tube lens 42. A lens plane interval d29 indicates the distance from the last plane (plane number s29) of the zoom lens 43 to the image plane (plane number s30). Lens plane intervals d14, d17, d18, and d21 are variables D14, D17, D18, and D21, which vary according to the zoom operation of the zoom lens 43, and they respectively indicate the distance between the first lens group G1 and the second lens group G2, the distance between the second lens group G2 and the aperture stop AS, the distance between the aperture stop AS and the third lens group G3, and the distance between the third lens group G3 and the fourth lens group G4.

The compound focal lengths of the tube lens 42 and the zoom lens 43 in a low-power end state illustrated in FIG. 16A, an intermediate state illustrated in FIG. 16B, and in a high-power end state illustrated in FIG. 16C, that is, the focal lengths (mm) of the zoom image-forming optical system 41 and the lens plane intervals (mm) of variables in the respective states, are as follows.

| FOCAL LENGTH AND LENS PLANE INTERVAL OF ZOOM IMAGE-FORMING OPTICAL SYSTEM 41 | | | |
|---|---|---|---|
| STATE | HIGH-POWER END | INTERMEDIATE | LOW-POWER END |
| FOCAL LENGTH | −518.9 | −115.3 | −38.2 |
| D14 | 2.424 | 30.866 | 83.838 |
| D17 | 1.000 | 20.000 | 1.000 |

FOCAL LENGTH AND LENS PLANE INTERVAL OF ZOOM
IMAGE-FORMING OPTICAL SYSTEM 41

| STATE | HIGH-POWER END | INTERMEDIATE | LOW-POWER END |
|---|---|---|---|
| D18 | 1.000 | 26.820 | 1.157 |
| D21 | 85.232 | 11.969 | 3.660 |

The zoom image-forming optical system 41 according to the present embodiment satisfies conditional expressions (1) through (6) as expressed in expressions (81) through (86) below. The expressions (81) through (86) correspond to the conditional expressions (1) through (6), respectively. Note that the $\nu d_{TLP}$ and the $nd_{TLP}$ of the expression (86) are an Abbe number and an index of refraction for the d Line of a biconvex lens TL1, respectively.

$$F_{TL}/F_{MIN} = -1.05 \quad (81)$$

$$F_{TL}/F_{MAX} = -0.08 \quad (82)$$

$$\phi E/L_{PI} = 0.12 \quad (83)$$

$$L_{PC}/F_{MIN} = -7.13 \quad (84)$$

$$L_{PC}/F_{MAX} = -0.52 \quad (85)$$

$$\nu d_{TLP} * nd_{TLP} = 136.6 \quad (86)$$

Figure 17A:
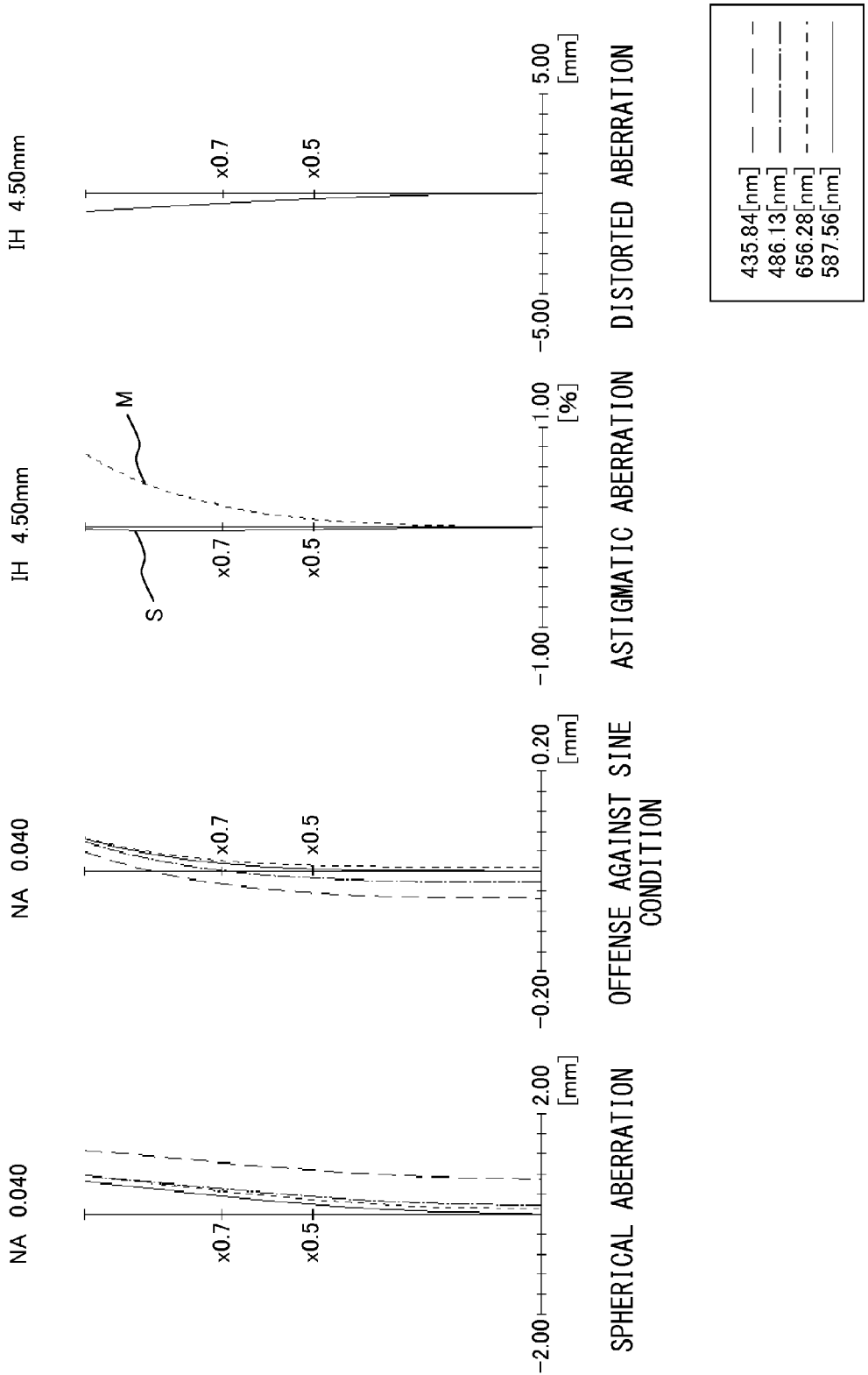
FIG. 17A illustrates an aberration of a zoom image-forming optical system in a low-power end state, which is illustrated in FIG. 16A.
Figure 17B:
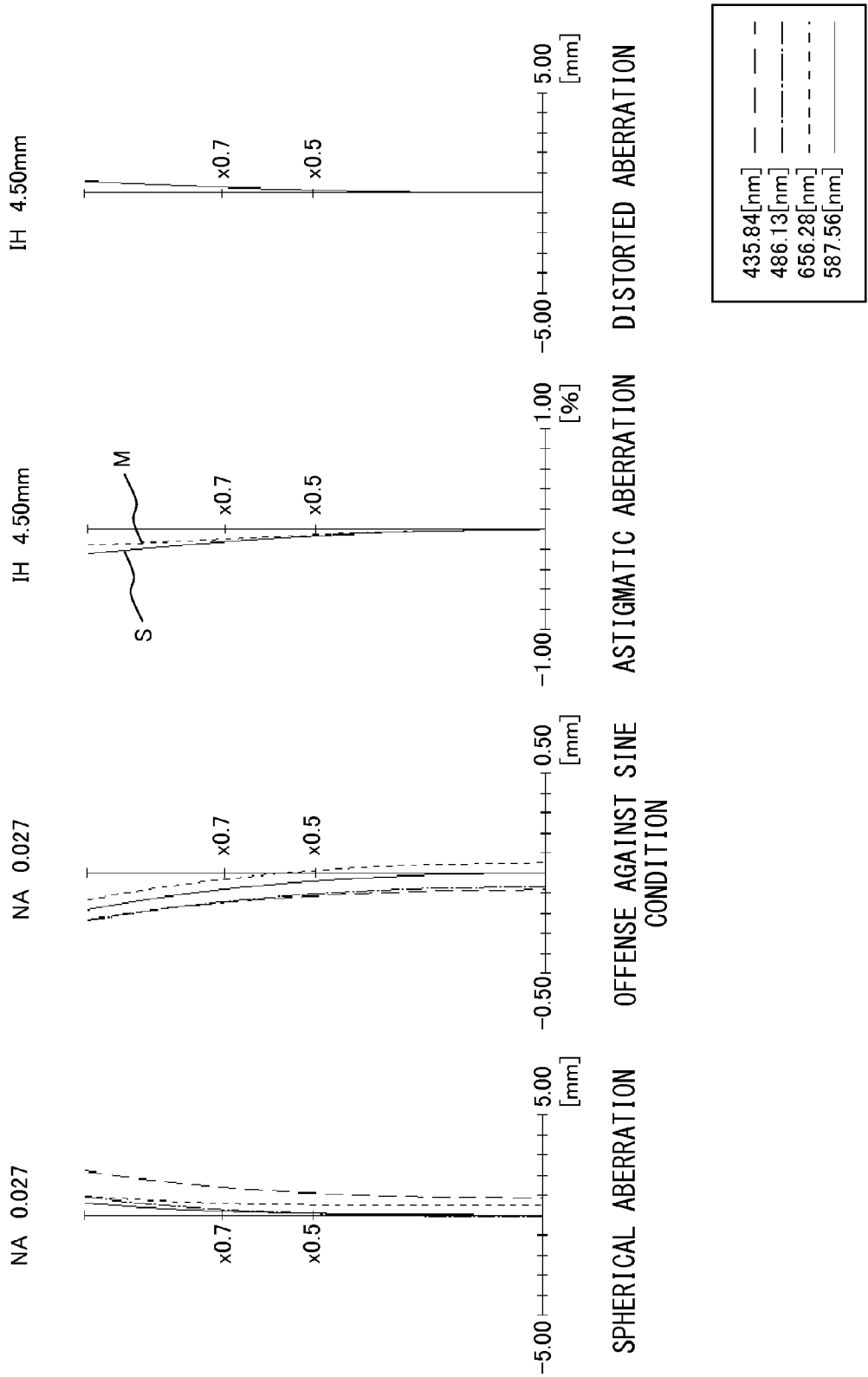
FIG. 17B illustrates an aberration of a zoom image-forming optical system in an intermediate state, which is illustrated in FIG. 16B.
Figure 17C:
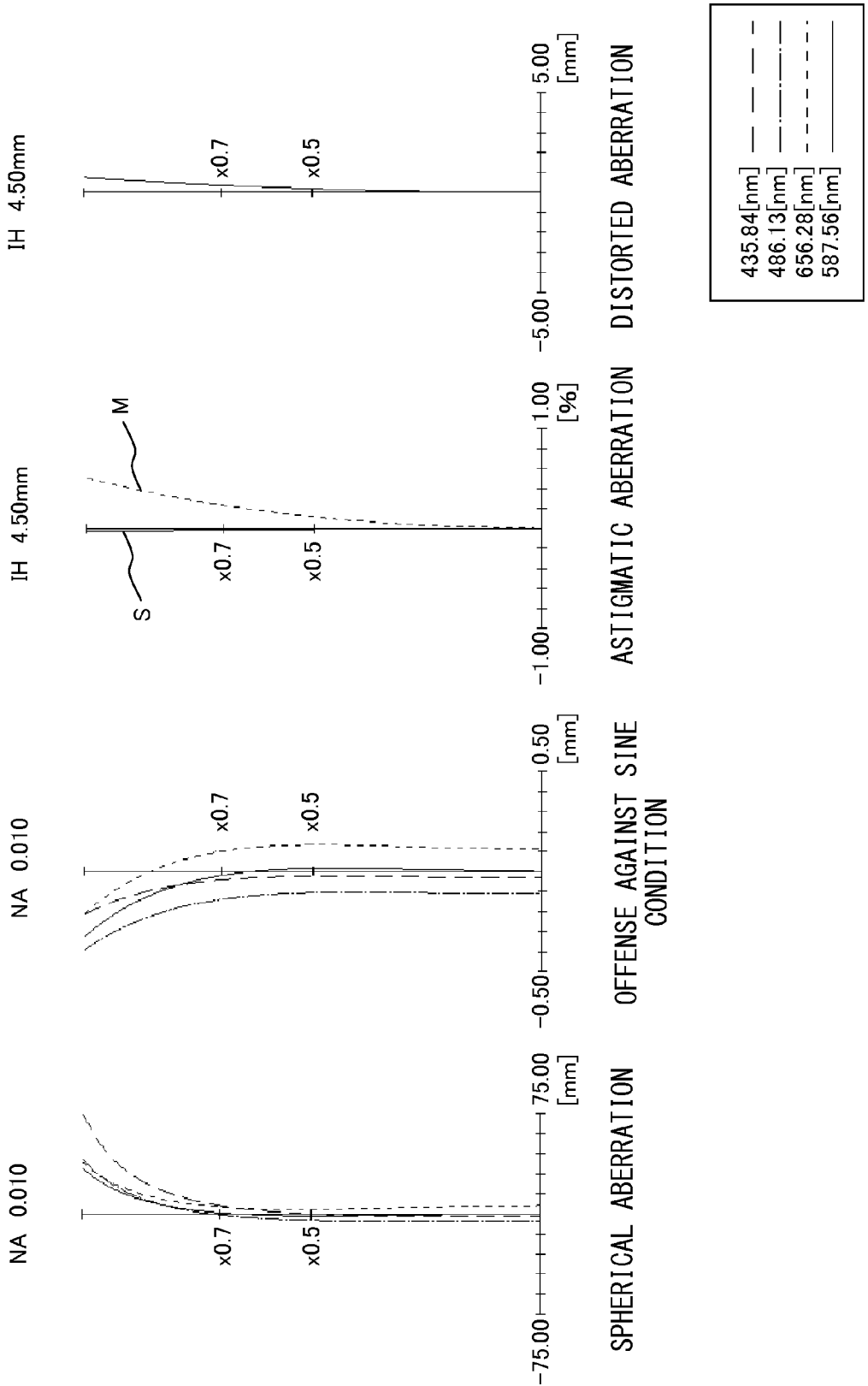
FIG. 17C illustrates an aberration of a zoom image-forming optical system in a high-power end state, which is illustrated in FIG. 16C.

FIGS. 17A, 17B, and 17C are diagrams illustrating aberrations of the zoom image-forming optical system 41 in a low-power end state illustrated in FIG. 16A, an intermediate state illustrated in FIG. 16B, and in a high-power end state illustrated in FIG. 16C, respectively. In FIGS. 17A, 17B, and 17C, aberrations in the image plane in cases where a parallel luminous flux is incident from an object side are illustrated. FIGS. 17A, 17B, and 17C illustrate a spherical aberration, an offense against the sine condition, an astigmatic aberration, and a distorted aberration, respectively, in order from left to right. It is also indicated that the aberrations are precisely corrected in any state.

What is claimed is:

1. A zoom image-forming optical system used in combination with an infinity-correction objective lens, the zoom image-forming optical system comprising:
    a tube lens for condensing a luminous flux from the objective lens to form an intermediate image; and
    a relay lens with a zoom function for projecting the intermediate image onto an image plane,
    wherein:
    lenses of the relay lens consist of: (i) a first lens group with positive power; (ii) a second lens group that is a movable group with positive power; (iii) a third lens group that is a movable group with positive power; and (iv) a fourth lens group with negative power, in this order from a side of the intermediate image, and
    the relay lens changes its magnifying power by moving the second lens group and the third lens group in an optical axis direction.

2. The zoom image-forming optical system according to claim 1, wherein:
    the relay lens includes an aperture stop between the second lens group and the third lens group, the aperture stop moving in a direction of an optical axis, and
    the aperture stop is arranged at an optically conjugated position with reference to an exit pupil position of the objective lens, or in close proximity to the optically conjugated position.

3. The zoom image-forming optical system according to claim 2, wherein:
    a conditional expression $$-2.7 < F_{TL}/F_{MIN} < -0.9$$

is satisfied, where $F_{TL}$ indicates a focal length of the tube lens, and $F_{MIN}$ indicates a compound focal length between the tube lens and the relay lens in a low-power end state.

4. The zoom image-forming optical system according to claim 2, wherein:
    a conditional expression $$-0.16 < F_{TL}/F_{MAX} < -0.07$$

is satisfied, where $F_{TL}$ indicates a focal length of the tube lens, and $F_{MAX}$ indicates a compound focal length between the tube lens and the relay lens in a high-power end state.

5. The zoom image-forming optical system according to claim 2, wherein:
    a conditional expression $$0.05 < \phi E/L_{PI} < 0.17$$

is satisfied, where $\phi E$ indicates a pupil diameter of the objective lens in a high-power end state, and $L_{PI}$ indicates a distance from the exit pupil position of the objective lens to a primary image-forming position at which the intermediate image is formed by the tube lens.

6. The zoom image-forming optical system according to claim 2, wherein:
    conditional expressions $$-17 < L_{PC}/F_{MIN} < -5$$

$$-1.3 < L_{PC}/F_{MAX} < -0.3$$

are satisfied, where $F_{MIN}$ indicates a compound focal length between the tube lens and the relay lens in a low-power end state, $F_{MAX}$ indicates a compound focal length between the tube lens and the relay lens in a high-power end state, and $L_{PC}$ indicates a distance from the exit pupil position of the objective lens to a secondary image-forming position at which an image is formed by the relay lens.

7. The zoom image-forming optical system according to claim 2, wherein:
    the tube lens includes a convex lens, and
    a conditional expression $$120 < \nu d_{TLP} * nd_{TLP} < 140$$

is satisfied, where $\nu d_{TLP}$ indicates an Abbe number of the convex lens, and $nd_{TLP}$ indicates an index of refraction for a d Line of the convex lens.

8. The zoom image-forming optical system according to claim 2, wherein the aperture stop is a variable stop in which a stop diameter is variable.

9. A microscope including the zoom image-forming optical system according to claim 2.

10. A zoom image-forming optical system used in combination with an infinity-correction objective lens, the zoom image-forming optical system comprising:
    a tube lens for condensing a luminous flux from the objective lens to form an intermediate image; and
    a relay lens with a zoom function for projecting the intermediate image onto an image plane, wherein:
the relay lens includes: (i) a first lens group with positive power; (ii) a second lens group that belongs to a movable group with positive power; (iii) a third lens group that belongs to a movable group with positive or negative power; and (iv) a fourth lens group with negative power, in this order from a side of the intermediate image,
the relay lens changes its magnifying power by moving the second lens group and the third lens group in an optical axis direction,
the relay lens includes an aperture stop between the second lens group and the third lens group, the aperture stop moving in a direction of an optical axis,
the aperture stop is arranged at an optically conjugated position with reference to an exit pupil position of the objective lens, or in close proximity to the optically conjugated position, and
a conditional expression $$-2.7 < F_{TL}/F_{MIN} < -0.9$$

is satisfied, where $F_{TL}$ indicates a focal length of the tube lens, and $F_{MIN}$ indicates a compound focal length between the tube lens and the relay lens in a low-power end state.

11. A zoom image-forming optical system used in combination with an infinity-correction objective lens, the zoom image-forming optical system comprising:
a tube lens for condensing a luminous flux from the objective lens to form an intermediate image; and
a relay lens with a zoom function for projecting the intermediate image onto an image plane,
wherein:
the relay lens includes: (i) a first lens group with positive power; (ii) a second lens group that belongs to a movable group with positive power; (iii) a third lens group that belongs to a movable group with positive or negative power; and (iv) a fourth lens group with negative power, in this order from a side of the intermediate image,
the relay lens changes its magnifying power by moving the second lens group and the third lens group in an optical axis direction,
the relay lens includes an aperture stop between the second lens group and the third lens group, the aperture stop moving in a direction of an optical axis,
the aperture stop is arranged at an optically conjugated position with reference to an exit pupil position of the objective lens, or in close proximity to the optically conjugated position, and
a conditional expression $$-0.16 < F_{TL}/F_{MAX} < -0.07$$

is satisfied, where $F_{TL}$ indicates a focal length of the tube lens, and $F_{MAX}$ indicates a compound focal length between the tube lens and the relay lens in a high-power end state.

12. A zoom image-forming optical system used in combination with an infinity-correction objective lens, the zoom image-forming optical system comprising:
a tube lens for condensing a luminous flux from the objective lens to form an intermediate image; and
a relay lens with a zoom function for projecting the intermediate image onto an image plane,
wherein:
the relay lens includes: (i) a first lens group with positive power; (ii) a second lens group that belongs to a movable group with positive power; (iii) a third lens group that belongs to a movable group with positive or negative power; and (iv) a fourth lens group with negative power, in this order from a side of the intermediate image,
the relay lens changes its magnifying power by moving the second lens group and the third lens group in an optical axis direction,
the relay lens includes an aperture stop between the second lens group and the third lens group, the aperture stop moving in a direction of an optical axis,
the aperture stop is arranged at an optically conjugated position with reference to an exit pupil position of the objective lens, or in close proximity to the optically conjugated position, and
a conditional expression $$0.05 < \phi E/L_{PI} < 0.17$$

is satisfied, where $\phi E$ indicates a pupil diameter of the objective lens in a high-power end state, and $L_{PI}$ indicates a distance from the exit pupil position of the objective lens to a primary image-forming position at which the intermediate image is formed by the tube lens.

13. A zoom image-forming optical system used in combination with an infinity-correction objective lens, the zoom image-forming optical system comprising:
a tube lens for condensing a luminous flux from the objective lens to form an intermediate image; and
a relay lens with a zoom function for projecting the intermediate image onto an image plane,
wherein:
the relay lens includes: (i) a first lens group with positive power; (ii) a second lens group that belongs to a movable group with positive power; (iii) a third lens group that belongs to a movable group with positive or negative power; and (iv) a fourth lens group with negative power, in this order from a side of the intermediate image,
the relay lens changes its magnifying power by moving the second lens group and the third lens group in an optical axis direction,
the relay lens includes an aperture stop between the second lens group and the third lens group, the aperture stop moving in a direction of an optical axis,
the aperture stop is arranged at an optically conjugated position with reference to an exit pupil position of the objective lens, or in close proximity to the optically conjugated position, and
conditional expressions $$-17 < L_{PC}/F_{MIN} < -5$$

$$-1.3 < L_{PC}/F_{MAX} < -0.3$$

are satisfied, where $F_{MIN}$ indicates a compound focal length between the tube lens and the relay lens in a low-power end state, $F_{MAX}$ indicates a compound focal length between the tube lens and the relay lens in a high-power end state, and $L_{PC}$ indicates a distance from the exit pupil position of the objective lens to a secondary image-forming position at which an image is formed by the relay lens.

14. A zoom image-forming optical system used in combination with an infinity-correction objective lens, the zoom image-forming optical system comprising:
a tube lens for condensing a luminous flux from the objective lens to form an intermediate image; and
a relay lens with a zoom function for projecting the intermediate image onto an image plane,
wherein:
the relay lens includes: (i) a first lens group with positive power; (ii) a second lens group that belongs to a movable group with positive power; (iii) a third lens group that belongs to a movable group with positive or negative power; and (iv) a fourth lens group with negative power, in this order from a side of the intermediate image, the relay lens changes its magnifying power by moving the second lens group and the third lens group in an optical axis direction, the relay lens includes an aperture stop between the second lens group and the third lens group, the aperture stop moving in a direction of an optical axis, the aperture stop is arranged at an optically conjugated position with reference to an exit pupil position of the objective lens, or in close proximity to the optically conjugated position, the tube lens includes a convex lens, and a conditional expression $$120 < vd_{TLP} * nd_{TLP} < 140$$

is satisfied, where $vd_{TLP}$ indicates an Abbe number of the convex lens, and $nd_{TLP}$ indicates an index of refraction for a d Line of the convex lens.

* * * * *